US010655070B2

(12) United States Patent
Wheeler et al.

(10) Patent No.: US 10,655,070 B2
(45) Date of Patent: May 19, 2020

(54) HYBRID THERMAL PROCESS TO SEPARATE AND TRANSFORM CONTAMINATED OR UNCONTAMINATED HYDROCARBON MATERIALS INTO USEFUL PRODUCTS, USES OF THE PROCESS, MANUFACTURING OF THE CORRESPONDING SYSTEM AND PLANT

(71) Applicant: Envirollea Inc., Calgary (CA)

(72) Inventors: Lucie B. Wheeler, Calgary (CA); Louis Bertrand, Outremont (CA)

( * ) Notice: Subject to any disclaimer, the term of this patent is extended or adjusted under 35 U.S.C. 154(b) by 424 days.

(21) Appl. No.: 14/416,423

(22) PCT Filed: Feb. 13, 2013

(86) PCT No.: PCT/CA2013/050111
§ 371 (c)(1),
(2) Date: Jan. 22, 2015

(87) PCT Pub. No.: WO2014/015423
PCT Pub. Date: Jan. 30, 2014

(65) Prior Publication Data
US 2016/0053184 A1    Feb. 25, 2016

(30) Foreign Application Priority Data
Jul. 23, 2012    (CA) .................................... 2783608

(51) Int. Cl.
*C10G 7/00*    (2006.01)
*C10G 9/00*    (2006.01)
(Continued)

(52) U.S. Cl.
CPC ............ *C10G 7/006* (2013.01); *B01D 3/143* (2013.01); *B01D 3/346* (2013.01); *B01J 4/002* (2013.01);
(Continued)

(58) Field of Classification Search
CPC .... B01J 2208/00504; B01J 2219/00254; B01J 2208/00867; B01J 2208/0084;
(Continued)

(56) References Cited

U.S. PATENT DOCUMENTS 1,518,938 A    12/1924    Nielsen
1,877,987 A *   9/1932    Schonberg ............... C10G 7/06
                                                            196/114
(Continued)

FOREIGN PATENT DOCUMENTS

| CA | 1099507 | 4/1981 |
|---|---|---|
| CA | 1120418 | 3/1982 |
| CA | 1129195 | 8/1982 |
| CA | 1221047 | 4/1987 |
| CA | 1316344 | 4/1993 |

(Continued)

OTHER PUBLICATIONS

English Abstract of SU889089 (A1), "Apparatus for obtaining magnesium compounds", published on Dec. 15, 1981.
(Continued)

*Primary Examiner* — Ali Z Fadhel
(74) *Attorney, Agent, or Firm* — Bereskin & Parr LLP/S.E.N.C.R.L., s.r.l.

(57) ABSTRACT

Process for reclaiming useful products from a waste oil, comprising a thermal separation step performed in a vessel at conditions, of temperature and pressure, allowing to substantially avoid cracking of the waste oil and to assure the separation of said heated waste oil into a first heavy oil fraction and into a second light oil fraction having, in comparison with the waste oil, a low content in solids and/or in other contaminants that are different from water and from inert gas. The process is further characterized in that while, during the thermal separation treatment, the waste oil is heated to a temperature about the boiling temperature of the heavy oil fraction, and below the cracking temperature of the waste oil, and at a pressure that is preferably below the
(Continued)

atmospheric pressure, the heavy oil fraction of the vapours existing the vessel, in contact with a cooler surface, condenses and falls back into the vessel, while the second fraction, in a gaseous state, is eventually submitted to at least one further separation treatment. When water is present in the waste oil, said water is used to improve the amount of recovered light oils; and/or when no water is present in the waste oil, water or at least one inert gas or at least one component that may become an inert gas by heating may be added to the waste oil or to the thermal separation unit. Uses of the process for environmental applications and for treating used oils and to prepare oil products. Systems for reclaiming useful products from waste oils comprising at least one rotating kiln and at least one self-refluxing condenser and/or at least one dephlegmator.

17 Claims, 18 Drawing Sheets

(51) Int. Cl.

| | |
|---|---|
| C10G 1/10 | (2006.01) |
| C10G 3/00 | (2006.01) |
| C10B 55/00 | (2006.01) |
| C10B 47/30 | (2006.01) |
| C10G 1/02 | (2006.01) |
| B01J 4/00 | (2006.01) |
| B01J 19/28 | (2006.01) |
| B01J 8/08 | (2006.01) |
| C10B 31/12 | (2006.01) |
| B01J 8/10 | (2006.01) |
| B01J 8/00 | (2006.01) |
| B01J 19/00 | (2006.01) |
| C10G 31/06 | (2006.01) |
| C10G 7/06 | (2006.01) |
| B01D 3/34 | (2006.01) |
| B01D 3/14 | (2006.01) |
| C10G 55/04 | (2006.01) |

(52) U.S. Cl.
CPC ............ *B01J 8/002* (2013.01); *B01J 8/0055* (2013.01); *B01J 8/085* (2013.01); *B01J 8/087* (2013.01); *B01J 8/10* (2013.01); *B01J 19/006* (2013.01); *B01J 19/28* (2013.01); *C10B 31/12* (2013.01); *C10B 47/30* (2013.01); *C10B 55/00* (2013.01); *C10G 1/02* (2013.01); *C10G 1/10* (2013.01); *C10G 3/40* (2013.01); *C10G 7/003* (2013.01); *C10G 7/06* (2013.01); *C10G 9/00* (2013.01); *C10G 31/06* (2013.01); *C10G 55/04* (2013.01); *B01J 2208/0084* (2013.01); *B01J 2208/00504* (2013.01); *B01J 2208/00761* (2013.01); *B01J 2208/00867* (2013.01); *B01J 2208/00902* (2013.01); *B01J 2219/0077* (2013.01); *B01J 2219/00157* (2013.01); *B01J 2219/00247* (2013.01); *B01J 2219/00254* (2013.01); *B01J 2219/00768* (2013.01); *B01J 2219/00777* (2013.01); *B01J 2219/187* (2013.01); *C10G 2300/1007* (2013.01); *Y02P 30/20* (2015.11)

(58) Field of Classification Search
CPC .... B01J 2208/00761; B01J 2208/00902; B01J 2219/00247; B01J 2219/187; C10G 7/06
See application file for complete search history.

(56) References Cited

U.S. PATENT DOCUMENTS

| | | | |
|---|---|---|---|
| 2,023,942 A | 12/1935 | Wescott | |
| 2,785,115 A | 3/1957 | Borch | |
| 3,807,936 A | 4/1974 | Vering | |
| 4,014,643 A | 3/1977 | Musha et al. | |
| 4,039,130 A | 8/1977 | Hogan | |
| 4,131,418 A | 12/1978 | Kramm et al. | |
| 4,180,455 A | 12/1979 | Taciuk | |
| 4,280,879 A | 7/1981 | Taciuk | |
| 4,285,773 A | 8/1981 | Taciuk | |
| 4,381,992 A * | 5/1983 | Wood | B01D 3/14 208/179 |
| 4,411,074 A | 10/1983 | Daly | |
| 4,427,637 A | 1/1984 | Iwashita et al. | |
| 4,439,209 A | 3/1984 | Wilwerding et al. | |
| 4,473,464 A | 9/1984 | Boyer et al. | |
| 4,475,886 A | 10/1984 | Tyler | |
| 4,512,873 A | 4/1985 | Escher et al. | |
| 4,591,362 A | 5/1986 | Yudovich et al. | |
| 4,746,420 A | 5/1988 | Darian et al. | |
| 4,846,677 A | 7/1989 | Crivelli et al. | |
| 4,872,954 A | 10/1989 | Hogan | |
| 4,931,171 A | 6/1990 | Piotter | |
| 4,961,391 A | 10/1990 | Mak et al. | |
| 5,194,069 A | 3/1993 | Someus | |
| 5,316,743 A | 5/1994 | Leblanc et al. | |
| 5,366,595 A | 11/1994 | Padgett et al. | |
| 5,423,891 A | 6/1995 | Taylor | |
| 5,821,396 A | 10/1998 | Bouziane | |
| 6,203,765 B1 | 3/2001 | Taciuk et al. | |
| 6,589,417 B2 | 7/2003 | Taciuk et al. | |
| 7,354,462 B2 | 4/2008 | O'Rear | |
| 7,550,063 B2 | 6/2009 | Gawad | |
| 7,943,014 B2 | 5/2011 | Berruti et al. | |
| 8,298,406 B2 | 10/2012 | Coates et al. | |
| 8,394,240 B2 | 3/2013 | Rinker | |
| 8,999,147 B2 | 4/2015 | Wheeler | |
| 9,089,803 B2 | 7/2015 | Stroeder et al. | |
| 9,200,162 B2 | 12/2015 | Taylor | |
| 9,243,191 B1 * | 1/2016 | Wombles | C10G 7/06 |
| 2002/0029996 A1 * | 3/2002 | Taciuk | B01J 6/008 208/126 |
| 2002/0055657 A1 * | 5/2002 | Ina | B01J 8/20 568/344 |
| 2003/0009068 A1 * | 1/2003 | Platz | C10G 1/10 585/241 |
| 2004/0231237 A1 | 11/2004 | Boer et al. | |
| 2005/0167337 A1 | 8/2005 | Bunger et al. | |
| 2008/0173531 A1 * | 7/2008 | Kesler | C10G 7/003 203/39 |
| 2008/0197012 A1 | 8/2008 | Berruti et al. | |
| 2009/0250331 A1 | 10/2009 | Hopkins et al. | |
| 2010/0077711 A1 | 4/2010 | Weigelt et al. | |
| 2010/0293853 A1 | 11/2010 | Feerer et al. | |
| 2010/0294700 A1 | 11/2010 | Coates et al. | |
| 2011/0011719 A1 | 1/2011 | Rinker | |
| 2011/0035998 A1 | 2/2011 | Badger et al. | |
| 2011/0259795 A1 * | 10/2011 | Yin | C10G 7/003 208/184 |
| 2012/0006669 A1 | 1/2012 | Bronshtein et al. | |
| 2012/0055775 A1 | 3/2012 | Manderson et al. | |
| 2012/0285080 A1 * | 11/2012 | Despen | C01B 31/02 44/500 |
| 2012/0318716 A1 | 12/2012 | Wheeler | |
| 2013/0068587 A1 | 3/2013 | Wheeler | |
| 2014/0155661 A1 * | 6/2014 | Frediani | C10B 19/00 585/241 |
| 2015/0368564 A1 | 12/2015 | Wheeler et al. | |
| 2015/0368567 A1 | 12/2015 | Wheeler | |

FOREIGN PATENT DOCUMENTS

| | | |
|---|---|---|
| CA | 1334129 | 1/1995 |
| CA | 2151792 | 12/1995 |
| CA | 2200525 | 10/1997 |

(56) References Cited

FOREIGN PATENT DOCUMENTS

| CA | 2315774 | 9/1999 |
|---|---|---|
| CA | 2799751 | 11/2011 |
| CA | 2750129 | 2/2013 |
| CA | 2783608 | 1/2014 |
| EP | 1106672 | 6/2001 |
| GB | 1534302 | 11/1978 |
| GB | 2150271 | 6/1985 |
| JP | 5729510 | 2/1982 |
| WO | 9746843 | 12/1997 |
| WO | 2011143770 | 11/2011 |
| WO | 2012069501 | 5/2012 |

OTHER PUBLICATIONS

Fortuna et al., "Pilot-scale experimental pyrolysis plant: Mechanical and operational aspects", Journal of Analytical and Applied Pyrolysis, vols. 40-41 (May 1997), pp. 403-417.

English Abstract of JP2007040615, "Rotary Kiln", published on Feb. 15, 2004.

English Abstract of JP2008122043, "Rotary Kiln Furnace", published on May 29, 2005.

Lois J. Gwcwender et al., "Liquid Lubricants and Lubrication", Modern Tribology Handbook, Chapter 10, 2001 by CRC Press LLC, whole document. (The year of publication is sufficiently earlier than the effective U.S. filing date so that the particular month of publication is not an issue).

English Translation of JPS5729510(A), "Method for Producing Iron by Reducing Semi-Reduced Molten Iron Oxide", published on Feb. 17, 1982.

Cabinet Nuss, European Patent Application No. 13822153.6, Response to Rules 70(2) and 70a(2) EPC filed on Jan. 13, 2017.

European Patent Application No. 13822153.6, "Office Communication and Extended Search Report", dated Feb. 25, 2016.

\* cited by examiner

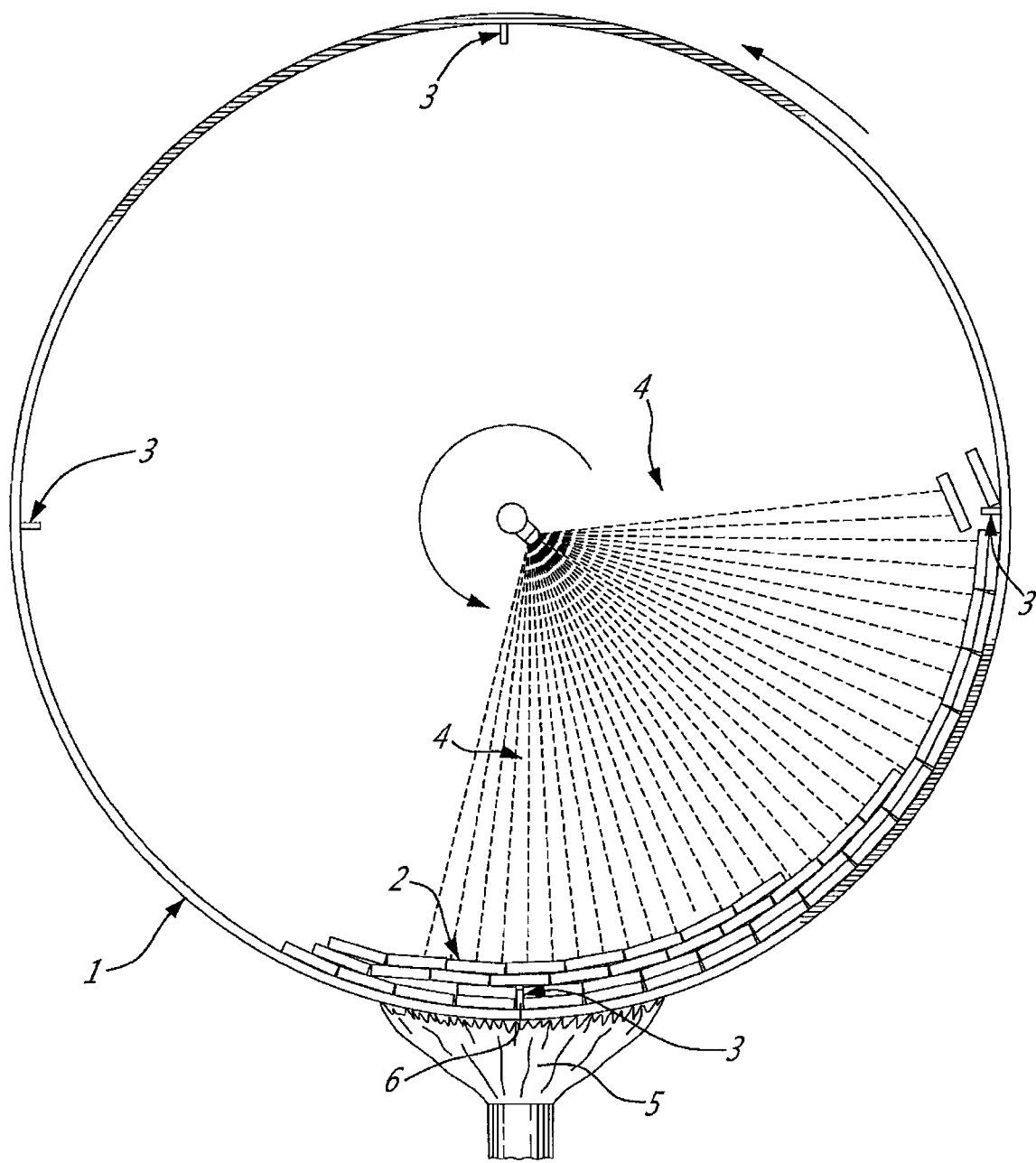

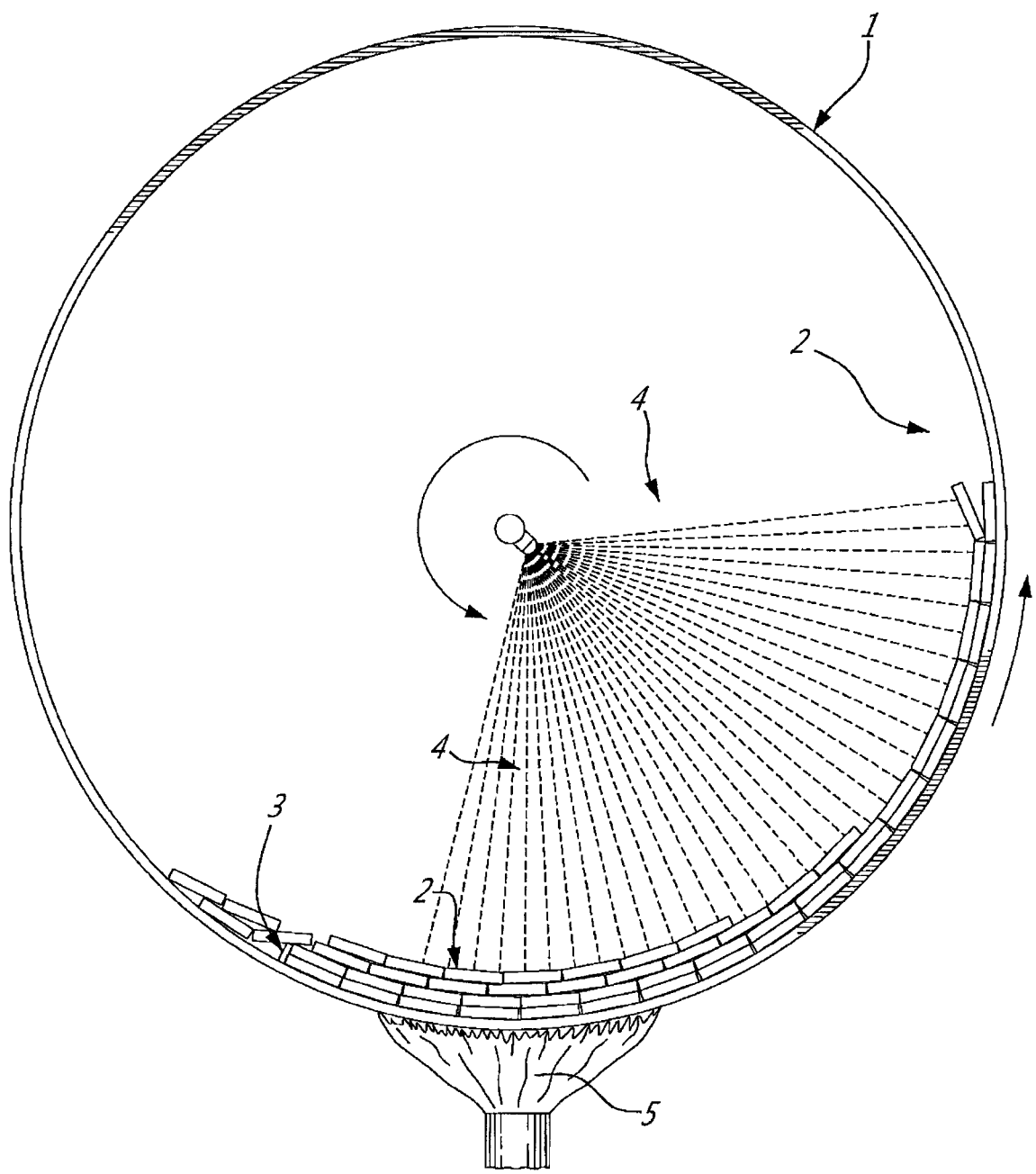

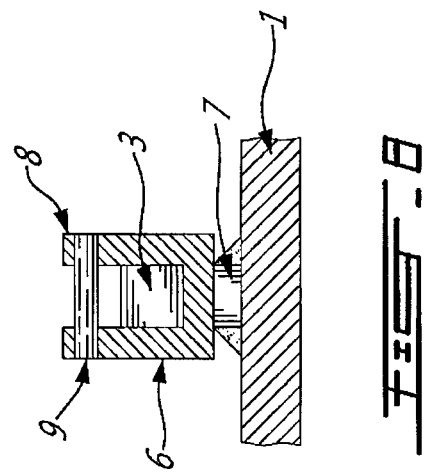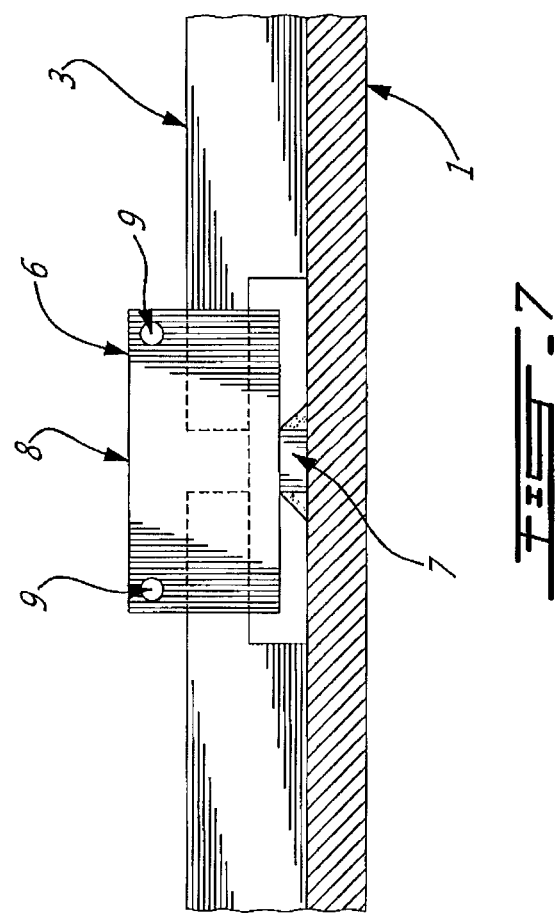

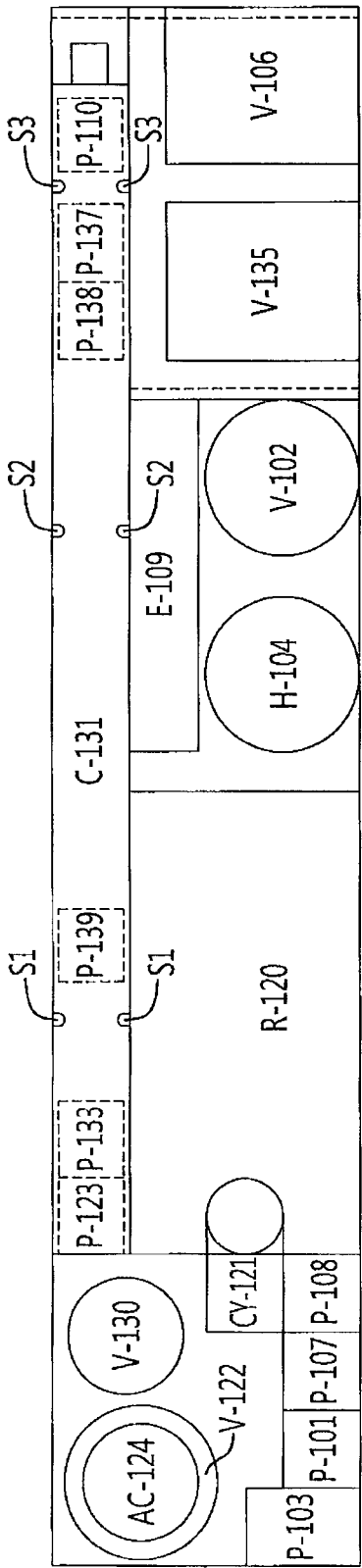
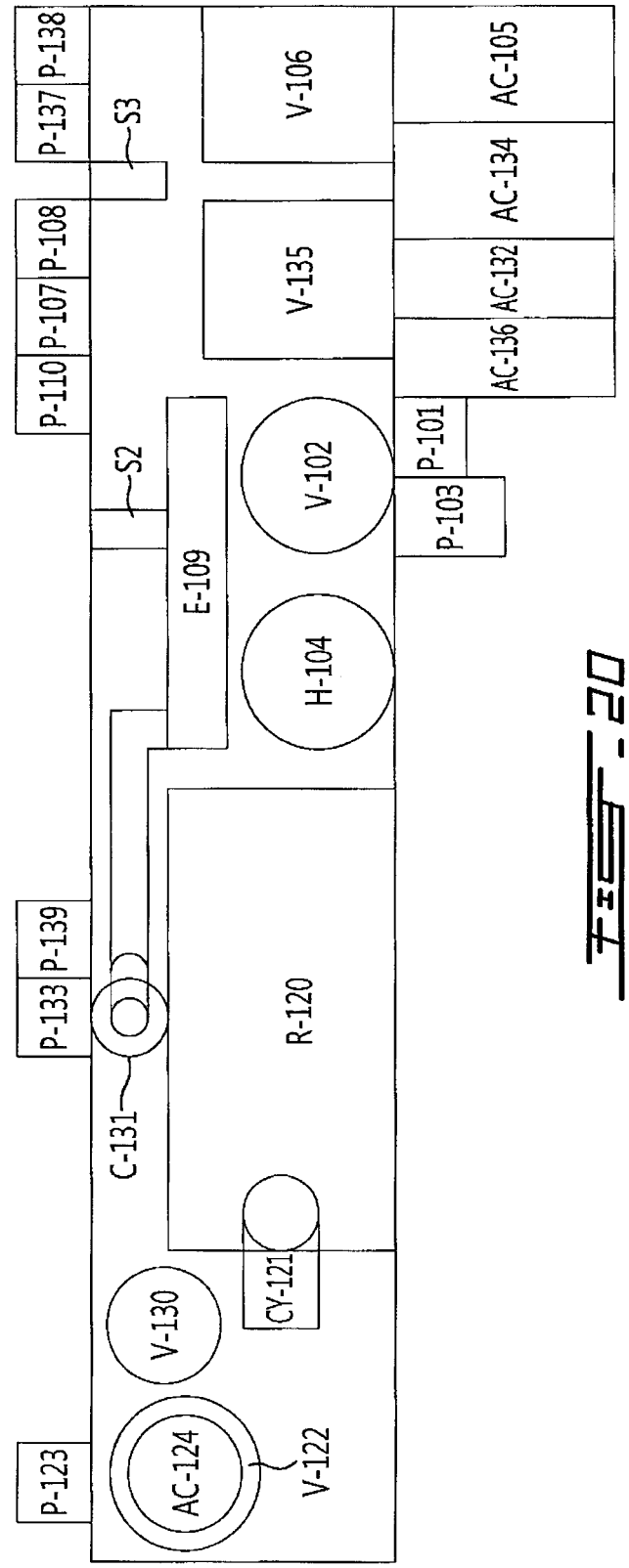

HYBRID THERMAL PROCESS TO SEPARATE AND TRANSFORM CONTAMINATED OR UNCONTAMINATED HYDROCARBON MATERIALS INTO USEFUL PRODUCTS, USES OF THE PROCESS, MANUFACTURING OF THE CORRESPONDING SYSTEM AND PLANT

CROSS REFERENCE TO PRIOR APPLICATION(S)

The present application is a 35 USC 371 national stage entry of PCT/CA2013/050111 filed on Feb. 13, 2013 and which claims the benefit of Canadian patent application No. 2,783,608 filed 23 Jul. 2012 which is hereby incorporated by reference in its entirety.

FIELD OF THE INVENTION

The invention relates to hybrid processes allowing the separation, from waste oil, of useful products and the cracking and/or transformation of the remaining part of the separation into valuable products.

The invention relates to a process to thermally treat contaminated or uncontaminated feed materials such as contaminated or uncontaminated feed oils, more particularly such as used lubricating oils, waste oils, oily tank bottoms, heavy oils, marpol or bitumen, preferably by using a rotating kiln operating under pressure and/or with the injection of a gas, and/or preferably with injection of a sweep gas into the reactor or into its feed stream.

Waste material can also be simultaneously treated with the feedstock and/or the feedstock is submitted to a preliminary treating resulting in the recovery of lubrication elements present in the feedstock.

The process may be performed in a mobile or in a fixed plant (non-mobile), eventually by using a rotating kiln.

The invention also relates to systems allowing to efficiently recover valuable products present in waste oils.

BACKGROUND OF THE INVENTION

Waste oils, especially used lubricating oils (ULO), are considered a threat to the environment, and is classified as a hazardous product in most jurisdictions. The Environment Protection Agency (EPA) states that: "One gallon of used lubricating oil can pollute a million gallons of water." There is a need for a viable and flexible process that can destroy the hazardous components of ULO and produce useful products with little or no by-products to dispose of in industrial landfills or incinerators.

There are many processes to treat waste oils. Up until the December 2001 report to the European Commission of the Environment by Taylor Nelson Sofres titled "Critical review of existing studies and life cycle analysis on the regeneration and incineration of waste oils", and the 19 Nov. 2008 European union directive, there was priority given to re-refining processes recycling waste oils into lubricating oils in the European Union as well as in the rest of the World. Consequently many re-refining processes were invented and used. The commercial re-refining processes used in Europe are described in the Taylor Nelson Sofres report. These and others are described in a book by Francois Audibert titled "Waste Engine Oils, Re-refining and Energy Recovery", (Elsevier, Amsterdam, 2006). Among the processes that regenerate ULO into lubricating oil base-stocks, some, such as the acid clay processes, were abandoned or legislated out because of the disposal costs, both financial and environmental, of the by-products such as spent acid and clays.

Lube oil regeneration processes, using solvent extraction or vacuum distillation as their primary process, require a finishing step, such as hydrotreating, which entails the purchase of hydrogen or building a hydrogen unit. Usually, the quality of their feedstock determines the quality of their products. Waste oil compositions are variable, and can change even within a shipment. Re-refining processes usually require extensive laboratory analyses of both the waste oil entering the plant, to determine the amount of chemicals to add in their pre-treatment processes, and of the product lubricating oils to ensure consistent product quality. Because of their high capital and operating costs, these plants must be close to large population centre and/or serve a large collection area, and usually require government subsidies to be viable.

When the used oil is to be used as fuel, chemical treatment of ULO to extract heavy metals, sulphur and chlorides is legislated and requires considerable laboratory analyses because of the constant variations in feedstock compositions.

In some very specific and rare applications, ULO is cleaned, dewatered, tested and its additive package is topped-off, before the lube oil is used again without leaving the plant site. Again, these applications require extensive laboratory analyses.

There is a need for a viable, safe and flexible process that can destroy the hazardous components in used oil while making products and by-products that are all environmentally friendly.

The re-refining processes alluded to in the previous section aim to recover lubricating oils from the used oil feed streams. There are processes that want to destroy the metal-containing additives in waste oils, and make environmentally acceptable products such as fuels:

Many of these patents propose stationary reactors, operating at atmospheric pressure:

Canadian Patents Nos. 1,309,370, and 2,112,097, and 5,271,808 and 5,795,462 (Shurtleff) disclose an apparatus and a method that are provided reclaiming a useful oil product from waste oil, such as used lubricating oil. The apparatus comprises an oil feed means, a boiler, a heater and a separating means. The heater is used to heat the waste oil in the boiler to a temperature such that heavier hydrocarbons remain unvolatilized, trapping contaminants therewith. The separating means separates the volatilized lighter hydrocarbons from the unvolatilized heavier hydrocarbons and contaminants.

U.S. Pat. No. 5,871,618 and Canadian Patent No. 2,225,635 (Kong at al.) disclose an apparatus and a process for reclaiming fuel oil from waste oil. The apparatus comprises a thermal cracking unit for cracking the high boiling hydrocarbon material into lighter, lower boiling, material so as to separate hydrocarbon vapor products from viscous materials; a condenser/heat exchanger for condensing the hydrocarbon vapour products to the liquid state; a fuel stabilization unit for chemically treating the condensates so as to give an oil product and solid sediment; and a polishing unit for forming a high quality fuel oil by physically removing solid contaminants. According to the present invention, high quality fuel oil can be obtained together with an environmentally innocuous solid ash cake, through a simple and efficient process.

U.S. Pat. No. 5,362,381 (Brown et al.) discloses a process in which waste lubricating oil is reprocessed into commercially usable diesel fuel and naphtha by thermocracking. A thermocracker unit is fired with sludge removed from the principal pool of oil undergoing vaporization. The vapours are separated from liquids in a primary distillation tower with precisely controlled heating. Resultant vapours are partially condensed. Resultant liquids flow downward through a secondary distillation tower into a reboiler which is heated by a flue gas bypass with an auxiliary burner. Vapours leaving the secondary distillation tower are partially condensed and resultant fluids are passed to a light ends flash tank. Gases from the flash tank fuel the auxiliary burner. Liquids are collected and stored for selling as naphtha. Hot liquids are withdrawn from the reboiler and are immediately cooled to atmospheric conditions. Liquids within specification are stored in a diesel storage tank for further use and sale. Off-specification products are stored in a reflux storage tank and are pumped and heated and sprayed downward in the primary distillation tower for washing the tower and for reprocessing in the thermocracking unit. Some light ends are mixed with sludge in a storage tank. The mixture is pumped as sludge fuel to the burner in a fire tube in the thermocracking unit.

U.S. Pat. No. 5,885,444 (Wansborough et al.) discloses a process for thermally cracking waste motor oil into a diesel fuel product is provided. The thermal cracking process uses low temperature cracking temperatures from 625 degrees Fahrenheit to 725 degrees Fahrenheit with ambient pressure to generate a column distilled fraction of diesel fuel mixed with light ends, the light ends being flashed off to produce a high quality #2 diesel fuel. The process further provides for removal from the cracking vessel an additional product stream which, when filtered, is suitable for use as a #3 fuel oil and that can be further blended with a bunker oil to yield a #5 fuel product.

Canadian Patent No. 2,242,742 (Yu) discloses a process and apparatus for the reclaiming and re-refining of waste oils. The process comprises raising a temperature of a feed mixture of fresh waste oil and a recycled non-volatile residue to a range of 400 degrees Celsius to 490 degrees Celsius for a time sufficient to cause pyrolysis of said heavy hydrocarbons contained in the feed mixture, but insufficient to permit substantial undesired polymerization, oxidation and dehydrogenation reactions to take place in said feed mixture; cooling the resulting pyrolyzed waste oil mixture to a temperature in the range of 300 degrees Celsius to 425 degrees Celsius, and maintaining said temperature while allowing volatile components in the pyrolyzed waste oil mixture to evaporate, leaving a non-volatile residue containing said contaminants; condensing the evaporated volatile components to form a reclaimed oil product; and mixing the non-volatile residue with fresh waste oil to form more of said feed mixture and repeating said temperature raising, cooling, evaporation and mixing steps on a continuous basis, while continuing to condense volatile components evaporated from said pyrolyzed waste oil mixture. The apparatus comprises a heating unit, a container, a condenser and pumping equipment and piping. The process and apparatus of the present invention generate #2 diesel fuel, gasoline and coke from waste oil. In this patent, the reactor operates under positive pressure.

Among the problems common to stationary reactors in waste oil applications are coking of the reactor walls, which impedes heat transfer from the heat source to the oil to be treated, and fouling of the equipment, not only in the reactor but also upstream and downstream of the reactor.

U.S. Pat. No. 6,589,417 and Canadian Patent No. 2,314,586 (Taciuk et al.) disclose a process by which used oil is treated in a reactor to remove contaminants. The reactor comprises a rotating vessel housed within a heating chamber. The inside of the vessel is indirectly heated by conduction through the vessel walls. The vessel contains a permanently resident charge of non-ablating, coarse granular solids. Within the vessel, the oil is vaporized and pyrolyzed, producing a hydrocarbon vapour. Coke is formed as a by-product. Contaminants, such as metals and halides become associated with the coke. The coarse granular solids scour and comminute the coke to form fine solids. The fine solids are separated from the coarse solids and are removed from the vessel. The hydrocarbon vapours are separated from any fine solids and are routed to a vapour condensation system for producing substantially contaminant-free product oil. The contaminant-rich solids are collected for disposal. This process operates at a negative pressure in the reactor.

Rotating kilns, operating under vacuum, are suggested in processes designed to thermally crack bitumen, heavy oil, rubber tires, oil shale and oil sands, coal or refinery distillation column bottoms.

Canadian Patent No. 1,334,129 (Klaus) discloses an invention that relates to a process and apparatus for the pyrolysis of bitumen. The process involves spraying preheated bitumen into a generally horizontal cylindrical rotating reactor which is heated from the outside and which contains grinding bodies. The bitumen is heated to the pyrolysis temperature and thereby forms a gaseous product and a solid pyrolyzed coke. The solid pyrolyzed coke is removed from the reactor walls by the grinding bodies and the resulting small particles are continuously removed from the reactor through ports in the reactor wall.

U.S. Pat. No. 4,473,464 (Boyer et al.) discloses a method for producing a distillable hydrocarbonaceous stream and carbonaceous agglomerates from a heavy crude oil by charging the crude oil and finely divided carbonaceous solids to a rotary kiln with the crude oil and carbonaceous solids being charged in a weight ratio from about 0.6 to about 1.5; tumbling the crude oil and finely divided carbonaceous solids in the rotary kiln at a temperature from about 850 degrees Fahrenheit to about 1000 degrees Fahrenheit for up to about 30 minutes to produce a vaporous stream and agglomerate particles containing a residual portion of the crude oil and finely divided carbonaceous solids; separating the agglomerate particles into a product portion of a desired particle size range and a recycle portion; grinding the recycle portion to produce the finely divided carbonaceous solids and heating the finely divided carbonaceous solids prior to recycling the carbonaceous solids to mixture with the crude oil, an improvement comprising: supplying at least a major portion of the heat required in said rotary kiln by heating the crude oil charged to the rotary kiln thereby eliminating the heating of the finely divided carbonaceous solids prior to recycling.

U.S. Pat. No. 4,439,209 (Wilwerding) discloses an apparatus for the continuous non-oxidative thermal decomposition of heat-dissociable organic matter to a solid carbon residue, particularly activated carbon, and a mixture of gaseous products, without substantial coking or tar formation. The apparatus involve a cylindrical rotating drum in a substantially horizontal position, into which feed material is introduced at one end and products recovered at the other end. An axial temperature gradient, increasing in the direction of flow, is maintained within the drum, enabling the exercise of a high degree of control over the reaction to fully convert the feed into the desired products.

Indirectly fired rotating kilns are usually considered inefficient means to convey heat into a reactor. Some propose heating the reactor feed with a hot stream. The hot stream can be circulating gas, liquid or solids.

U.S. Pat. No. 5,423,891 (Taylor) proposes a direct gasification of a high BTU content fuel gas from a hydrocarbon content solid waste material W which may include some glass content is effected by preheating heat carrier solids HCS in a flash calciner to a temperature capable of thermally cracking the hydrocarbon content of the solid waste material W directly into the high BTU content fuel gas. The HCS are separated from the products of combustion and fed into a gas sealed refractory lined horizontal axis rotary kiln retort concurrently with the solid waste W. Momentary contact and mixing of the solid waste W with the HCS in the rotary kiln in the absence of oxygen is sufficient to directly thermally crack the solid waste material into the high BTU gas product. Separated HCS are returned to the flash calciner for reheating. A trommel, coupled directly to the output of the rotary kiln retort and having a trommel screen with mesh openings smaller than glass agglomerates, but sized larger than the HCS, permits separation of the HCS and discharging of glass agglomerates from the downstream end of the trommel screen to prevent shut down of the direct gasification unit. Direct gasification of steel industry waste water treatment plant sludge, automobile shredded refuse ASR, municipal solid waste MSW and refuse derived fuel RDF and oil mill scale is effectively achieved, irrespective of glass content contaminant.

U.S. Pat. No. 4,512,873 (Escher) discloses a process in which the residues obtained in the hydrogenation of oil, especially heavy oil, or of coal are subjected to low temperature carbonization in a drum, preferably a rotary drum, at temperatures between approximately 400 degrees Celsius and approximately 600 degrees Celsius, by means of a carbonization gas after the separation of the condensable portions and heating to temperatures between approximately 600 degrees Celsius and approximately 950 degrees Celsius, which is introduced into the low temperature carbonization drum. The gas is heated to temperatures between approximately 600 degrees Celsius and approximately 950 degrees Celsius indirectly by flue gases arising from the combustion of oil or gas, for example, of excess carbonization gas. The residue to be carbonized at low temperature is introduced into the hot gas in a finely dispersed state and preferably atomized.

U.K. Patent No. GB253489 discloses a separate heater and evaporator apparatus. In distilling hydrocarbon oils by the method of heating the oil by passage through a tube furnace, and discharging the heated oil into vapour-separating chambers, the chambers and the subsequent dephlegmators and condensers are maintained under high vacuum. Oil from a container 1 is passed by a pump 2 through a tube furnace 4, and discharged into a vaporizing chamber 5 in which the liquid runs down the walls, and to which steam is passed by a pipe 6. Vapours pass through a rectifier 14, a dephlegmator 19, and condenser 21 leading to a condensate tank 22 evacuated by a vacuum pump. Unvaporized residue is withdrawn through a cooler 8 to a container 9 connected by a pipe 10 to a vacuum pump, or the hot residue is forced by a pump through a second pipe coil in the furnace and into a second vaporizing chamber, the residue from which is passed through a third coil. The vapours from the second and third vaporizing chambers are treated in separate rectifiers, dephlegmators and condensers.

U.K. Patent No. GB249,801 (Kramer et al.) discloses speak of separate heater and evaporator apparatus.—In a continuous process for distilling petroleum oils to obtain lubricating oils, topped oil is forced by a pump 8 through a tubular still 1 and through a pressure-reducing valve 14 into a vapour separating chamber 2 in which it passes down a series of trays. The residual oil from the chamber 2 passes through a still 4 which supplies additional vapours to the chamber 2. Vapours pass from the chamber 2 through a dephlegmator 3 to a water or air-cooled condenser 5 which is evacuated by a steam jet ejector 6, a water jet condenser 7, and a vacuum pump 12. The dephlegmator 3, chamber 2 and still 4 may be maintained under an absolute pressure as low as 1 mm. of mercury. Steam is passed into the oil, through a pipe 19 at the entrance to the still 1, through a pipe 20 at the exit and through a pipe 45 into the still 4.

European Patent Application EP-A1-0826762 (Lee Sung et al.) discloses an apparatus and a process for reclaiming fuel oil from waste oil. The apparatus comprises a thermal cracking unit for cracking the high boiling hydrocarbon material into lighter, lower boiling, material so as to separate hydrocarbon vapor products form viscous materials; a condenser/heat exchanger for condensing the hydrocarbon vapor products to the liquid state; a fuel stabilization unit for chemically treating the condensates so as to give an oil product and solid sediment; and a polishing unit for forming a high quality fuel oil by physically removing solid contaminants. According to the present invention, high quality fuel oil can be obtained together with an environmentally innocuous solid ash cake, through a simple and efficient process.

From a practical point of view, it is difficult to ensure the integrity of the seals of both the main reactor and the coke incinerator when there is a circulating stream of solids. When produced gas is circulated to heat the reactor feed oil to cracking temperatures, large amounts of circulating gas is required, compared to the fresh feed stream.

There was therefore a need for a system allowing the efficient separation of the heavy fraction and of the lighter fraction present in a waste oil, such process being at least free of one of the drawbacks of the prior art process.

There was additionally a need for high recovering rate of the valuable products present in the waste oils.

There was additionally a need for an economic and flexible system allowing the efficient separation the heavy fraction and of the lighter fraction of waste oil, such a system being free of at least one of the drawbacks of the prior art systems and that can destroy the harmful components in waste oils while making products and by-products that are useful and environmentally friendly.

There was therefore a need for a new process allowing an efficient separation of the heavy fraction and of the lighter fraction of waste oil, such process being at least free of one of the drawbacks of the prior art process.

There was additionally a need for a flexible and viable process that addresses the drawbacks of existing technologies and that can destroy at least part of the harmful components in waste oils while making products and by-products that are useful and environmentally friendly.

SUMMARY

Process for reclaiming useful products from a waste oil, comprising a thermal separation step performed in a vessel at conditions, of temperature and pressure, allowing to substantially avoid cracking of the waste oil and to assure the separation of said heated waste oil into a first heavy oil fraction and into a second light oil fraction having, in comparison with the waste oil, a low content in solids and/or in other contaminants that are different from water and from inert gas. The process is further characterized in that while, during the thermal separation treatment, the waste oil is heated to a temperature about the boiling temperature of the heavy oil fraction, and below the cracking temperature of the waste oil, and at a pressure that is preferably below the atmospheric pressure, the heavy oil fraction of the vapours existing the vessel, in contact with a cooler surface, condenses and falls back into the vessel, while the second fraction, in a gaseous state, is eventually submitted to at least one further separation treatment. When water is present in the waste oil, said water is used to improve the amount of recovered light oils; and/or when no water is present in the waste oil, water or at least one inert gas or at least one component that may become an inert gas by heating may be added to the waste oil or to the thermal separation unit. Uses of the process for environmental applications and for treating used oils and to prepare oil products. Systems for reclaiming useful products from waste oils comprising at least one rotating kiln and at least one self-refluxing condenser and/or at least one dephlegmator.

BRIEF DESCRIPTION OF THE DRAWINGS

FIG. 5 represents a cross section, according to a plan perpendicular to the horizontal axis, of a reactor and the charge of metal plates and the shelves tacked on the kiln walls of a reactor according to a second embodiment of the present invention wherein the reactor cross section has only 4 shelves, each pushing two layers of enough plates to cover at least a quarter of the reactor wall.

FIG. 6 represents a cross section, according to a plan perpendicular to the horizontal axis, of a reactor and the charge of metal plates and the shelves tacked on the kiln walls of a reactor according to a third embodiment of the present invention, as described in the "Preferred Mode" section of this application, wherein the reactor has only one shelf.

FIG. 7 represents a cross section of a bracket as present in the reactor represented in FIG. 5 with sections of shelves, seen from the top.

FIG. 8 represents the bracket of FIG. 7 shown from an end.

FIG. 19 is a simplified diagram illustrating a version of the process according to the present invention in the case of the mobile plant, when the plant is in transit.

FIG. 20 is a simplified diagram illustrating a version of the process according to the present invention in the case of the mobile plant, when the plant is operating.

DESCRIPTION OF THE INVENTION

Preliminary Definitions

Figure 1:
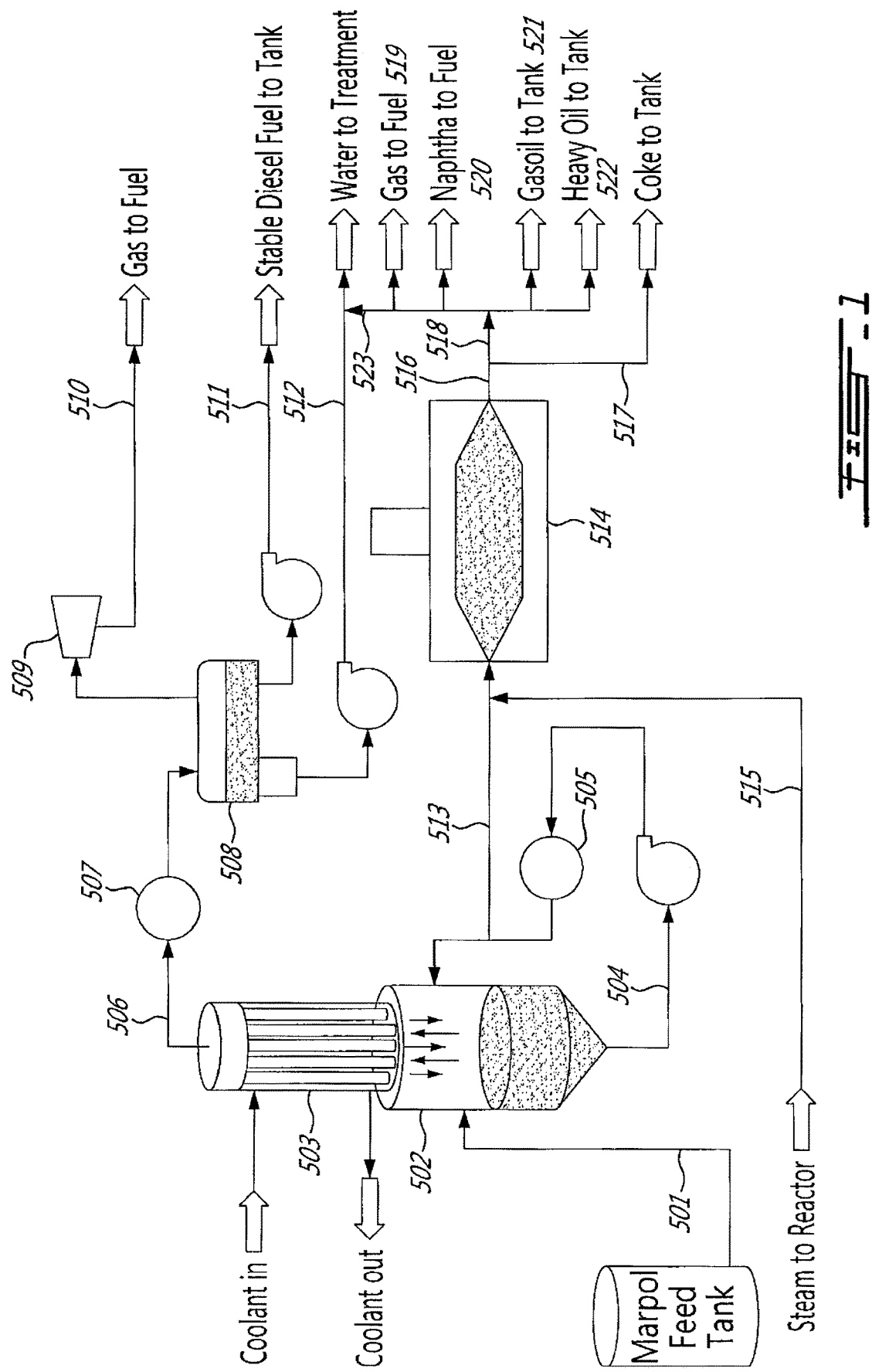
FIG. 1 is a simplified flow diagram illustrating a version of the process according to the present invention in the case of the treatment of a marpol with a dephlegmator and a rotating kiln of the type described in following FIGS. 4 to 17.

For the purpose of this document, the following definitions are adopted:

"Hybrid process": means a process including the separation, from waste, of useful products and the cracking and/or transformation of the remaining part into valuable products.

"Feed material": contaminated or uncontaminated feed materials such as contaminated or uncontaminated feed oils, more particularly such as used lubricating oils, waste oils, oily tank bottoms, heavy oils, marpol, waxes and bitumen. Solid feedstocks could include oil sands, oil shales, and wastes such as rubber, plastics, asphalts and other hydrocarbons.

"Sweep gas": is any non-reactive or substantially non-reactive gas, preferably it is an inert gas such nitrogen, recycled reactor non-condensable gas or water steam. It was surprisingly found that such gas not only have as sweeping effect in the reaction zone of rotating operating reactor, but may create a suppression, may increase the safety in plant operations, may help control the reactions in said reactor and globally may improve the efficiency of the process. For example, the sweep gas is a gas stream that may additionally serve in various the following functions such as:

- when injected into the reactor feed line, the sweep gas changes the density of the total feed stream; it changes the flow regimes within the feed line and/or nozzles, which results in lower incidence of fouling and plugging of the piping and spray nozzles, and in improved spray patterns; further, the sweep gas favours atomization of the oil stream before the oil reaches the reaction sites on the hot plates, and/or
- if introduced into the liquid feed at temperatures above that of the hydrocarbon liquid stream, it will increase the feed stream temperature and reduce the energy, or heat, provided by the kiln, and/or
- it reduces the oil's residence time in the reactor, by sweeping the hydrocarbon vapours out of the reactor soon after they are formed, thereby reducing the incidence of secondary reactions, or over-cracking, resulting in higher liquid yields and more stable liquid product oils, and/or
- the sweep gas present in the reactor reduces the liquid oil's partial pressure, and favours the vaporization of the lighter oil fractions, such as the gasoil and naphtha, in the feed and products; this also reduces over cracking in the gasoil fraction and increases the stability of the hydrocarbon liquid products, and/or
- the sweep gas helps to stabilize the pressure in the reactor, and/or
- when steam or nitrogen are used, the sweep gas reduces the risk of fires in the event of a leak in the reactor or in the downstream equipment; it will disperse the oil escaping and, hopefully, keep the oil from igniting, even if it is above its auto-ignition point, and/or
- it can also be part of the stripping gas stream in the product distillation unit.

"Inert gas": a gas that does not substantially interferes with the main reaction and that improves the performance of the reaction and/or transformation wherein said inert gas is present, among inert gas such nitrogen, recycled reactor non-condensable gas or water steam.

"Contaminants": in waste oils, the most common contaminant is water. Other contaminants include, but are not limited to, sand, clay, engine wear products, and decomposition products from oils, greases and/or additives.

"Diesel", "gasoil" or "fuel oil": in the context of this process are oils mainly made up of hydrocarbons with boiling points between 100 degrees Celsius and 500 degrees Celsius, according to ASTM D-86.

"Naphtha": light oil with a 90% point (ASTM D-86) around 160 degrees Celsius, and a specific gravity between 0.65 and 0.8.

"Used Lubricating Oil" (ULO): oils or greases that were used as lubricants, usually in engines, and were discarded. Examples would include car engine oils, compressor oils, and diesel engine oils among others. Lubricating oils generally contain additives, which are carefully engineered molecules added to base oils to improve one or more characteristic of the lubricating oil for a particular use. Used lubricating oil is classified as a hazardous product in many jurisdictions because of its additives and contaminants.

"Substantially non-reactive gas": is a gas such as nitrogen, recycled reaction gas or water steam that does not affect or enter into the thermal processing or that does not substantially affect the thermal processing in a temperature range up to 700, preferably up to 400 degrees Celsius.

"Waste oils": Oils or greases that are discarded. They include ULO as well as a wide range of other oils such as marpol, refinery tank bottoms, form oils, metal working oils, synthetic oils and PCB-free transmission oils, to name a few.

"Light oil": is the fraction of the waste oil having 90% Volume distilled at 450 degrees Celsius, as measured according to ASTM D-1160.

Heavy oil: is the fraction of the waste oil having 15% volume distilled at 450 degrees Celsius as per the ASTM D-1160 method.

"Consistent shapes": means shapes so they can stay on the narrow shelves and/or each other, while protecting the reactor wall from direct contact with the relatively cold feed.

"Thermal processing": is preferably any change in phase and/or composition, and/or reactions initiated or facilitated by the application, or withdrawal, of heat and/or temperature. Examples of thermal processing include evaporating, cracking, condensing, solidifying, drying, pyrolizing and thermocleaning.

"The height of a shelve": is the distance between the attachment point of the shelve on the reactor wall and the end of the shelve directed to the center of the reactor.

"The width of a shelve": is the measurement of the distance between the two sides of the shelve on a direction perpendicular to the height of the shelve.

DETAILED DESCRIPTION OF THE INVENTION

In this process, the feed oil, which may have been chemically pre-treated, is heated and its water removed preferably in a flash evaporator. The dewatered oil may be heated again to a temperature close to, but below, its initial thermal cracking temperature. This heating step is accomplished either by heat exchange with a hot oil stream, by the injection of a hot gas, by direct contact with a hotter oil stream, or by a combination of these methods. The resulting reactor feed stream is sprayed unto metal plates in a rotating kiln, where it is thermally cracked and/or vaporized. The reactor operates under positive pressure. The reaction products, hydrocarbon vapours and solid coke, are swept out of the reactor as soon as possible to prevent secondary reactions. Most of the coke is removed from the hydrocarbon stream, before the oil is condensed, usually in cyclones. The residual coke is washed out for the hydrocarbon vapours preferably in a wash column or in a dephlegmator. The hydrocarbon product stream is condensed and separated into specified products. The non-condensable gas, heated or non-heated gas and possibly the naphtha is (are) used as fuel on site.

More specifically, the first objet of the present invention are thermal processes for reclaiming useful products from a waste oil, said process comprising a thermal separation step performed in a vessel at conditions, of temperature and pressure, allowing to substantially avoid cracking of the waste oil and to assure the separation of said heated waste oil into a first heavy oil fraction and into a second light oil fraction having, in comparison with the waste oil, a low content in solids and/or in other contaminants that are different from water and from inert gas, and said process being further characterized in that:

while, during the thermal separation treatment, the waste oil is heated to a temperature about the boiling temperature of the heavy oil fraction, and below the cracking temperature of the waste oil, and at a pressure that is preferably below the atmospheric pressure; the heavy oil fraction of the vapours existing the vessel, in contact with a cooler surface, condenses and falls back into the vessel, while the second fraction, in a gaseous state, is also separated and eventually submitted to at least one further separation treatment; and/or when water is present in the waste oil, said water is used to improve the amount of recovered light oils, in such a case the water content is preferably of at least 1%, preferably between 1 and 10% weight of the waste oil; and/or when no water is present in the waste oil, water or at least one inert gas or at least one component that may become an inert gas by heating, is added, in the waste oil and/or in the vessel, in an amount that represents preferably 1 to 10% weight, and in the case of water more preferably from 3 to 7% weight, of the waste oil.

According to preferred embodiment of the invention:

in a first optional step (Step I), the waste oil, when contaminated with solid materials, that are not soluble is said waste oil, is submitted to a mechanical separation of the solid materials that are thereby present, such solid materials are for example sand, dirt or inorganic salts;

in a second step (Step II), the waste oil is preheated, preferably up to 90 degrees, in a third step (Step III) the preheated waste oil, obtained in Step II, is submitted to a second heating, at a temperature below the cracking point (under the conditions of Step III) of the waste oil, Step III allowing to recover:

a bottom fraction, also named first fraction, mainly constituted of heavy oils, additives and contaminants;

and a light fraction, also called second fraction, mainly free of heavy oils;

in a fourth distillation step (Step IV), said light fraction is cooled and separated in a gaseous fraction, for example mainly constituted by non-condensable gas, water or steam and in a liquid fraction, for example mainly constituted by naphtha, diesel or lubricating oil base stock, and minor amount of heavy oil that may have eventually mixed into the vessel feed stream; and preferably at least one of steps II, III or IV is performed under vacuum, and more preferably at least of steps II, III or IV is performed at a negative pressure comprised between 0.1 and 0.95 atmosphere, Preferably:

in Step I, the solid separation is performed with filters, decanters and/or centrifuges; and/or in Step II, the preheated treatment is performed in a tank, heater and/or heat flash drum operating under vacuum; and/or in Step III, the light oil and heavy oil fractions are separated by evaporation of the light oil from the feed oil. The light oil contains most of the recoverable oils, while the heavy oil contains most of the contaminants and additives in the feed oil. Step III takes place in a heated vessel.

In step IV, the heavy oil and solids, entrained in the light oil vapours produced in step III, come in contact with a cooler surface, are condensed and are returned to the heated vessel. Step IV takes place in a self-refluxing condenser, a dephlegmator, a vertical or slanted cooler, and/or a distillation column.

In step V, the light oil vapours and other gases are totally or partially condensed and separated into products such as water, gas, naphtha, gasoil, lubricating oil and a heavier oil fraction. Step V takes place in one or more of heat exchangers, phase separators or accumulators, thin or wiped film evaporators, distillation columns, preferably a vacuum column.

The processes of the invention are particularly suited for treating:

a feed oil, that is more preferably selected in the group constituted by contaminated oils and/or by uncontaminated oils, wherein said oil is advantageously a synthetic oil, a natural oil, a vegetable oil, an animal fat oil, marpol, heavy oil, oily tank bottoms, used lubricating oil, an oily water and/or an emulsions, greases, tires and any waste oil, oily emulsion and/or a mixture of at least two of these; and/or a liquid oil feed mainly containing a limited amount of solid material that may advantageously be selected in the group constituted by oil sands, shale oil, tires, plastics, contaminated soils, oily beaches, solids containing oil, asphalts and tars, and/or the mixtures of solids and oil.

According to a preferred embodiment: the absolute pressure in:

the flash drum is preferably between 0.05 atmosphere and 0.95 atmosphere, more preferably between 0.1 and 0.5 atmosphere, more preferably about 0.2 or 0.3 atmosphere; at the inlet to the self-refluxing condenser and/or in the dephlegmator; and/or the self-refluxing condenser and/or in the dephlegmator drum is preferably between 0.05 atmosphere and 0.95 atmosphere, more preferably between 0.1 and 0.5 atmosphere, more preferably about 0.2 or 0.3 atmosphere; and/or the distillation means is drum is preferably between 0.05 atmosphere and 0.95 atmosphere, more preferably between 0.1 and 0.5 atmosphere, more preferably about 0.2 or 0.3 atmosphere.

According to a preferred embodiment, the liquid flash drum is heated to temperatures below its initial thermal cracking temperature, preferably between 5 degrees Celsius and 50 degrees Celsius, more preferably between 5 degrees Celsius and 20 degrees Celsius, more preferably about 10 degrees Celsius below its liquid cracking temperature. The suitable means for heating the flash drum are:

a. a circulating liquid stream through an external heater or heat exchange with a hotter stream; and/or b. combustion gas and/or flame heating the flash drum walls; and/or c. Direct contact with a hot gas, liquid or solids stream; and/or d. Any combination of two or more of these methods.

The self-refluxing condenser is advantageously mounted directly above the flash drum. The self-refluxing condenser is installed in any manner that allows the liquid exiting the self-refluxing condenser to return to the flash drum. Advantageously, the self-refluxing condenser is cooled by circulating air, cooling water, and/or by heat exchange with cooler feed stream, and/or a cooler circulating fluid.

The product separation means, in a preferred embodiment, include:

a. a cooler and/or reboiler; and/or b. a phase separator; and/or c. a distillation column; and/or d. a combination of them.

According to a further preferred embodiment, the recovered heavy oil fraction is directly commercially used or is treated in a rotating kiln.

The heavy oily part recovered in step IV is advantageously submitted to an additional treatment that is of the thermal cracking nature, this additional treatment is preferably performed in a rotating kiln in a stationary or in a mobile unit, preferably equipped with plates.

According to a further preferred embodiment of the processes of the:

a) the rotating kiln operates under positive pressure that is preferably of at least 1 psig and for producing the following components: coke and non-condensable gas and/or heavy oils and/or wide range diesel oils and/or naphtha, each of those produced components being recovered separately or in the form of mixtures of at least two of these components, wherein in said process a sweep gas, that is an inert gas or a substantially non-reactive gas, is injected into the rotating kiln or in the oily feed stream entering the rotating operating kiln; or b) the rotating kiln operates under a positive pressure that is preferably of at least 1 psig and for producing the following components: coke and non-condensable gas and/or heavy oils and/or wide range diesel oils and/or naphtha, each of those produced components being recoverable separately or in the form of mixtures of at least two of these components; or c) the rotating kiln operates for producing the following components: coke and non-condensable gas and/or heavy oils and/or wide range diesel oils and/or naphtha, each of those produced elements being recoverable separately or in the form of mixtures of at least two of these components, and wherein in said process a sweep gas, that is an inert gas or a substantially non-reactive gas, is injected into the rotating kiln or in the feed stream entering the rotating operating kiln.

The rotating kiln advantageously used is one of those that have been made the subject matter of international patent application number WO 2011/143770 A1. WO 2011/143770 A1 and more particularly the subject-matter of the claims, the objects and the content of the examples are thereby incorporated by reference.

The processes of the invention further allows added material such as solids with high hydrocarbon and/or organic chemical content are added in the heavy oil fraction before being treated in the rotating kiln.

Solids with high hydrocarbon content are waste materials such as matter solid at room temperature and may be mixed in the feed material for example by dissolving in the feeding material when the feed material is heated.

Alternatively, the added material are organic liquids and/or solids as part of the feedstock, providing that they are soluble in the waste oil feed at the reactor feed conditions, that they contribute little to the plugging of the process equipment, and that they are either destroyed, cracked and/or vaporized in the reactor.

Alternatively, the waste organic liquids or solids is/are introduced into the process before, or directly into, the dehydration unit, or mixed with the waste oil feed to the reactor, or as a second feedstock directly into the reactor, providing that they are either destroyed or vaporized in the reactor.

Advantageously, the added material that may be added to the feed material in a proportion representing in weight up to 70% of the feed material, in the case of PVC for example the proportion ranges form of 1%, up to 60% weight.

The addition of added material is advantageously performed in the feed material at a temperature ranging from 10 to 450 Celsius, and the feed material itself is preferably preheated before the addition of the added material at a temperature sufficient to rapidly dissolved the majority of the added material, more preferably in the case wherein the added material is PVC the added material is added in a feed material that is an used oil preheated at a temperature that is preferably comprised between 20 degrees Celsius and 390 degrees Celsius.

According to a preferred embodiment, the addition of the added material is performed in the feed material before feeding in a rotating kiln or after a pre-treatment of the feed material, said pre-treatment of the feed material being for example aimed to extract the lubricating part of the feed material, before its feed into a rotating kiln that may affect the integrity of the lubricating fraction of the feed material.

The added material is advantageously constituted by non-biodegradable compounds and the process thus reduces the amount of garbage that must be stored in dumps or disposed of in incinerators:

The added material is for example: plastic bags, preferably such as non PVC plastic bags, tar, shingle, coal, spent clays and/or shredded and demetalized tires and PVC plastic bags or containers.

According to a preferred embodiment of the invention, the stationary or mobile plant, for thermally treating the feed stream, comprises:

i. a first unit designed for heating and/or dehydrating and/or degasing said feed stream (Unit I) and/or recovering valuable products from the waste oil stream (Unit I);

ii. a second unit (Unit II) comprising a rotating reactor designed to perform the thermal processing (such as pyrolizing) of the feed stream entering said rotating reactor and a vapour solid separator (Unit II); and iii. a third unit (Unit III) that is a product separation unit and that is or not configured for recycling at least part of the treated feed stream (heavy oil), recovered in Unit III, into Unit I and/or into Unit II, wherein the first unit and/or the second unit is (are) configured for injecting a sweep gas in said feed oil and/or in said rotating reactor, and/or wherein the second unit is configured in a way that the rotating reactor may work under positive pressure.

The first unit advantageously contains no sub-unit for chemically treating said feed stream; advantageously said first unit contains no sub-unit for purifying said feeding stream before its injection into Unit II.

In Unit I and/or in Unit III, a chemical treatment, such as the injection of an anticorrosive agent, may be performed.

Unit I is advantageously designed to remove the light oil from the feed oil, when water is present in said feed stream (oil).

The processes of the invention may be performed in a continuous or semi-continuous mode.

The heavy oil fraction that is treated in the rotating kiln may advantageously comprise organic compounds having the following thermodynamic and physical features: a specific gravity as per ASTM D-4052 between 0.65 and 1.5, and/or distillation temperatures, as per ASTM D-1160, between −20 degrees Celsius and 4000 degrees Celsius, preferably between 20 degrees Celsius and 950 degrees Celsius.

The average residence time in the rotating kiln is advantageously between 5 seconds to 10 hours, preferably between 30 seconds and 2 hours, and more preferably is between 90 seconds and 10 minutes.

The average residence time in the rotating kiln is, when:

a positive pressure is present in the rotating kiln, comprised between 0.5 seconds to 2 hours; or a sweep gas is injected in the feed stream or in the rotating reactor, comprised between 1 and 10 minutes for used lubricating oils, and between 2 and 15 minutes for heavier oils.

The sweep gas is nitrogen and is injected in the feed stream in an amount that is up to 15% weight, preferably up to 10% weight, more preferably about 5%.

The residence time of the sweep gas is advantageously comprised between 5 seconds and 15 minutes, preferably between 8 and 10 minutes.

The sweep gas is preferably water stream and is injected in the feed stream in an amount that is up to 10% weight, preferably up to 5% weight.

The residence time in the reactor may be comprised between 0.5 and 15 minutes, and is preferably between 4 and 5 minutes.

The heating temperature in the rotating kiln may ranges from 250 degrees Celsius to 750 degrees Celsius, preferably the heating temperature in the rotating kiln ranges from 500 degrees Celsius to 520 degrees Celsius, and is advantageously about 505 degrees Celsius, more preferably about 510 degrees Celsius particularly when shredded tires, bitumen, heavy oils, plastics, contaminated soils or oil sands or soil contaminated with heavy oils are treated.

The rotation speed of the rotating reactor advantageously ranges from 0.5 rpm to 10 rpm.

The rotation speed of the rotating reactor depends upon the size of the reactor and on the process requirements, may advantageously range from ranges from 1 to 10 rpm, preferably from 2 to 5 rpm and the rotation speed is more advantageously about 3 rpm, for example in the case of a reactor treating 300 barrels of used oil per day or for example in the case of a reactor treating 400 barrels of used oil per day.

Another family of processes of the invention for thermally treating a feed material, preferably an oily feed, in a fixed i.e. in a non-mobile reactor or in a mobile plant for thermally treating a feed stream, is constituted by those d processes comprising:

a) a rotating kiln operating under positive pressure that is preferably of at least 1 psig and for producing the following components: coke and non-condensable gas and/or heavy oils and/or wide range diesel oils and/or naphtha, each of those produced components being recovered separately or in the form of mixtures of at least two of these components, wherein in said process a sweep gas, that is an inert gas or a substantially non-reactive gas, is injected into the rotating kiln or in the oily feed stream entering the rotating operating kiln; or b) a rotating kiln operating under a positive pressure that is preferably of at least 1 psig and for producing the following components: coke and non-condensable gas and/or heavy oils and/or wide range diesel oils and/or naphtha, each of those produced components being recoverable separately or in the form of mixtures of at least two of these components; or c) a rotating kiln operating for producing the following components: coke and non-condensable gas and/or heavy oils and/or wide range diesel oils and/or naphtha, each of those produced elements being recoverable separately or in the form of mixtures of at least two of these components, and wherein in said process a sweep gas, that is an inert gas or a substantially non-reactive gas, is injected into the rotating kiln or in the feed stream entering the rotating operating kiln; or d) a thermally treating of a feed material not involving a rotating kiln; and in option A) wherein in process a) or b) or c) or d), the feed material has been at least partially submitted to a preliminary treatment before being introduced in the rotating kiln or in a thermally treating zone not involving a rotating kiln, said preliminary treatment comprising a primary separation step and a distillation step, in the case where used lubricating oil is part of the feedstock to the process, a lubricating oil cut is produced before the oil is injected into the reactor, in a preferred mode of operation, used lubricating oils, and/or waxes, are fed to a dehydration unit, either mixed with other waste oils or not, the dehydration unit preferably includes a vessel and means to heat the contents of the vessel, partially or totally vaporizing the lubricating oil cut of the feedstock, the dehydration vessel preferably operates under vacuum and is advantageously equipped with a self-refluxing condenser, it performs a first separation of the feedstock, allowing the lubricating oil portion to exit the dehydrator along with lighter oils and the water usually found in used oils as collected, the heavier oils and most of the additives and other impurities in the plant feed, remain advantageously in the dehydration vessel, and are fed to the thermal cracking reactor, the vapours exiting the self-refluxing condenser are routed to a distillation column, preferably operating under vacuum, water, gas and light oils preferably exit at the top of the distillation column, lubricating oils are drawn as a side cut, while column bottoms are advantageously fed to the thermal cracking reactor, the lubricating oil fraction above may be advantageously separated into several lubricating oil products, and/or in option B) wherein in process a) or b) or c) or d), the feed material contains added material, preferably waste materials such as matter solid at room temperature and that may be dissolved or not dissolved in the feed material. For example by dissolving in the feeding material when the feed material is heated, the thermal cracking unit can also accept organic liquids and/or solids as part of the feedstock, providing that they are soluble in the waste oil feed at the reactor feed conditions, that they contribute little to the plugging of the process equipment, and that they are either destroyed or vaporized in the reactor. The waste organic liquids or solids can be introduced into the process before, or directly into, the dehydration unit, or mixed with the waste oil feed to the reactor, or as a second feedstock directly into the reactor, providing that they are either destroyed or vaporized in the reactor.

In a preferred mode of operation, waste oils, and other organic waste materials, either solids or liquids, are fed to a dehydration unit, the dehydration unit advantageously includes a vessel and means to heat the contents of the vessel, if used lubricating oils are part of the feedstock, they are partially or totally vaporized. The dehydration vessel advantageously operates under vacuum and is equipped with a self-refluxing condenser. It performs a first separation of the feedstock, allowing the lubricating oil portion to exit the dehydrator along with lighter oils and the water usually found in used oils as collected. The heavier oils and most of the additives and other impurities in the plant feed, remain in the dehydration vessel, and are fed to the thermal cracking reactor. The vapours exiting the self-refluxing condenser are preferably routed to a distillation column, advantageously operating under vacuum. The water, gas and light organic compounds exit at the top of the distillation column, lubricating oils are drawn as a side cut, while column bottoms are fed to the thermal cracking reactor. The lubricating oil fraction above may be separated into several lubricating oil products. The gas and light organic compounds are advantageously used as fuel in the plant.

If there is little or no used lubricating oil in the feedstock, the dehydration unit can be operated under a positive absolute pressure usually less than 2 atmospheres, the light oils and organic compounds exiting the dehydrator with the steam are used as fuel in the plant, while the liquid at the bottom of the dehydrator becomes reactor feedstock. The gas and light organic compounds from the dehydrator and those produced in the thermal cracking unit are preferably used as fuel in the plant.

According to a preferred embodiment, the added material may be added to the feed material in a proportion representing in weight up to 70% of the total feed material, in the case of flexible PVC for example. In the case of rigid PVC up to 70% weight, if it is in a powder or very small pieces, may be added in the feed material. The addition is preferentially performed in the feed material at a temperature ranging from 20 degrees Celsius to 350 degrees Celsius, and the feed material itself is preferably preheated before the addition of the added material at a temperature sufficient to rapidly dissolve the majority of the added material. More preferably in the case wherein the added material is PVC the added material is added in a feed material that is an used oil preheated at a temperature that is preferably comprised between 20 degrees Celsius and 90 degrees Celsius. The addition of the added material can be made in the feed material before is fed to the dehydration unit, or directly in the feed to a rotating kiln or after a pre-treatment of the feed material, said pre-treatment of the feed material being for example aimed to extract the lubricating part of the feed material, before its feed into a rotating kiln that may affect the integrity of the lubricating fraction of the feed material.

The various fractions generated by the thermal processing are recovered as follow:
  the liquid fraction is recovered by distillation;
  the gaseous fraction is recovered by distillation; and
  the solid fraction is recovered for example in cyclones, a solids recovery box, a scrubber, a wash column and/or a self-refluxing condenser and/or a dephlegmator.

The amount of the recovered liquid fraction represents between 85% and 100% weight of the organic reactor feed; and/or the amount of the recovered gaseous fraction represents between 0% weight and 10% weight of the reactor feed; and/or the amount of the recovered solid fraction represents between 0% weight and 5% weight, when the feedstock is used lubricating oil.

Heavy oils thereby obtained are at least partially polarized hydrocarbons and/or non-polarized hydrocarbons or mixtures of latter, and in those mixtures mainly made of hydrocarbons wherein at least part of the mixture of hydrocarbons includes polarized hydrocarbons, are of a particular interest.

Heavy oils thereby obtained and wherein the polarized hydrocarbons are advantageously selected in the family constituted by the polarized hydrocarbons have, according to ASTM method number D 1160, a boiling point range between 160 degrees Celsius and 800 degrees Celsius, more preferably between 300 and 500 degrees Celsius, are also of a particular interest.

Among those heavy oils, those having a density, according to ASTM method number D4052, at 20 degrees Celsius, that ranges from 0.9 and 1.2 grams per milliliter, are advantageous and those containing less than 10% weight of solids are more preferred.

Another family of heavy oil thereby obtained are those wherein the solids are selected in the family constituted by:
  i. carbon residues, corresponding to a carbon coke ASTM D189 that is preferably lower than 5%, more preferably lower than 3%;
  ii. sulphurous compounds wherein the sulphur content of said heavy oil is, according to ASTM D5291, lower or equal to 5%, above usually in the order of 1.5% wt.

A second object of the present invention is constituted by non-environmental and by environmental uses of the processes defined in the first object of the present invention.

Among those uses, those:
  treating wastes oils such as used lubricating oils, form oils, metal treating oils, refinery or transportation oil tank bottoms; and/or
  destroying hazardous and/or toxic products; and/or
  reusing waste products in an environmentally acceptable form and/or way; and/or
  cleaning contaminated soils or beaches; and/or
  cleaning tar pit; and/or
  recovering energy and/or fuels from used tires and/or plastics;
  recovering energy and/or fuels from wood chips and/or paper;
  use in coal-oil co-processing; and/or
  recovering oil from oil spills; and/or
  PCB free transformed oils,
are of a particular interest.

Those for treating used oils and to prepare:
  a fuel, or a component in a blended fuel, such as a home heating oil, a low sulphur marine fuel, a diesel engine fuel, a static diesel engine fuel, power generation fuel, farm machinery fuel, off road and on road diesel fuel; and/or
  a cetane index enhancer; and/or
  a drilling mud base oil or component; and/or
  a solvent or component of a solvent; and/or
  a diluent for heavy fuels, bunker or bitumen; and/or
  a light lubricant or component of a lubricating oil; and/or
  a cleaner or a component in oil base cleaners; and/or
  a flotation oil component; and/or
  a wide range diesel; and/or
  a clarified oil; and/or
  a component in asphalt blends,
  are also of a particular interest.

A third object of the present invention is constituted by the family of systems for reclaiming useful products from waste oils comprising at least one self-refluxing condenser and/or at least one dephlegmator and at least one rotating kiln and wherein the at least one self-refluxing condenser and/or at least one dephlegmator are configured in order to perform the separation of the waste oil into a light oil fraction and into a heavy oil fraction containing most of the additives and contaminants and wherein the rotating kiln is configured in order to recover a diesel with a low contaminant content.

Those systems advantageously comprise preheating means configured to reduce the viscosity the waste oil and to improve the efficiency in the self-refluxing condenser and/or at least one dephlegmator.

The systems of the invention may also advantageously comprise distillation means in order to separate the various fractions constituting of the light oil fraction.

The heavy oils obtained by a process defined in the first object of the present invention or by the use of a heavy oil defined in the third object of the present invention are:
- a fuel oil;
- a component of flotation oils or cleaning oils for equipment;
- a diluent for asphalt;
- a secondary refinery feed (preferably in a hydrocracking unit) to produce diesel and other fuels;
- a transformer oil without PCB;
- a water repellent additive in asphalt and/or cement;
- a cleaner to remove dirt containing polarized particles such as, asphalts and/or resins and/or metal particles attached to equipment walls, in such a use said used oil is preferably heated at temperature ranging preferably from 0 to 400 degrees Celsius, and more preferably below its ignition points (advantageously 20 degrees Celsius under its ignition point), and has a total hash metal content that is advantageously below 3% weight, preferably below 1 000 ppm wt., more preferably below 600 ppm wt. more preferably below 60 ppm wt.;
- as substitute to creosol, particularly in the preventive treatment of supporting railways wood beam; and
- in the same application than the original use of the oil before its contamination.

Detailed Description of a Preferred Embodiment of the Hybrid Process and of the Corresponding System The process of the invention preferably includes the following features:

Step I: In step I, the waste oil is optionally heated to a temperature below its initial boiling point;

Step II: In step II, solids and other contaminants and/or excess water are optionally either partially or totally removed from the waste oil by filtration, decantation, centrifuging, decantation and/or chemical treatment.

Step III: In step III the waste oil is heated and separated preferably into two fractions: a light oil fraction in vapour phase, and a heavy oil fraction in liquid phase. Step III takes place in a heated vessel.

Step IV: In step IV, the heavy oil and solids, entrained in the light oil vapours and other gases, a contacted with a cooler surface, they condense and return to the heated vessel of step III. Step III takes place preferably in a dephlegmator or self-refluxing condenser, a distillation column, or a heat exchanger.

Step V: In step V, the light oil vapours are partially or totally condensed and separated into products such as gas, naphtha, gasoil, lubricating oil, vacuum gasoil and/or heavy oil. Other gases, such as steam, can also be condensed and separated from the hydrocarbons in step V. Step V takes place in heat exchangers, phase separators, including two or three phase accumulators, distillation columns, including thin film or wiped film evaporators.

Step VI: In step VI, the heavy oil fraction, produced in step III, is preferably routed to a rotating kiln, where it will be thermally processed. It will either be thermally cracked and/or vaporized. Alternatively, the heavy oil fraction can be sold as heavy fuel. The rotating kiln is preferably of the type described in patent application number WO 2011/143770 A1.

Step VII: In step VII, the reactor products are preferably treated in one or more vapour-solid separators wherein the coke and solids are removed from the reactor product stream.

Step VIII: In step VIII, the reactor products are cooled and separated into gas, naphtha, gasoil or diesel fuel, and a heavy product oil. The heavy product oil can be preferably sold as fuel or cleaning fluid, or recycled back to step III.

The processes of the invention when used with a mobile or fixed pyrolysis plant advantageously have the following features:
i. a first step wherein the feed stream is heated and/or dehydrated and/or degased (Step I);
ii. a second step wherein the heated feed stream is thermally processed (preferably pyrolyzed) and the resulting thermally processed stream is treated by a vapour solid separator (Step II); and
iii. a third step (Step III) that is a product separation step, wherein, preferably, part of the treated feed stream (preferably of the treated heavy oil), recovered in step II is recycled, into Step I and/or into Step II;
wherein the first unit and or the second unit is (are) configured to allow for the injection of a sweep gas in said feed stream and/or in said rotating reactor, and/or wherein the second unit is configured in a way that the rotating reactor may work under positive pressure.

For thermally treating a feed material, advantageously:
a) said rotating kiln operates under a positive pressure that is preferably of at least 1 psig and for producing the following components: coke and non-condensable gas and/or heavy oils and/or wide range diesel oils and/or naphtha, each of those produced components being recovered separately or in the form of mixtures of at least two of these components, wherein in said process a sweep gas, that is an inert gas or a substantially non-reactive gas, is injected into the rotating kiln or in the oily feed stream entering the rotating operating kiln; or
b) said rotating kiln operates under a positive pressure that is preferably of at least 1 psig and for producing the following components: coke and non-condensable gas and/or heavy oils and/or wide range diesel oils and/or naphtha, each of those produced components being recoverable separately or in the form of mixtures of at least two of these components; or
c) said rotating kiln operates for producing the following components: coke and non-condensable gas and/or heavy oils and/or wide range diesel oils and/or naphtha, each of those produced elements being recoverable separately or in the form of mixtures of at least two of these components, and wherein in said process a sweep gas, that is an inert gas or a substantially non-reactive gas, is injected into the rotating kiln or in the feed stream entering the rotating operating kiln.

The oily feed is advantageously selected among: contaminated or uncontaminated oils, waste oils, used lubricating oils, oily tank bottoms, marpol, heavy oils, bitumen and other heavy oils, coal, oil sands, asphalts, chemically pre-treated oils or mixtures of at least two of the latter.

The vapours and the solids exiting the kiln are preferably routed to vapour solid separation means, such as a coke box and/or a cyclone and/or a wash column, and/or a self-refluxing condenser.

Advantageously, the vapour solid separation means are a stationary box and/or a heated cyclone for the heavier solid and/or cyclone(s) to separate most of the solids present in said vapours exiting the rotating kiln from the vapours; the cyclone treatment following advantageously the treatment by one or several cyclones.

The solids present in said vapours exiting the rotating kiln are usually selected among: coke, metals, sand, dirt, asphaltens, preasphaltens, sulphurous compounds, heavy polymers such as gums and/or resin, salts, cokes containing various compounds such as sulphur, halogen and metal; each of these solid component being alone or in mixture with at least one of these component.

The vapour-solid separation equipment, preferably the separation box and/or the cyclones, is (are) preferably heated, at a temperature that is (are) above the temperature of the vapours existing the kiln, preferably this temperature is up to about 300 degrees Celsius, more preferably up to 200 degrees Celsius, advantageously up to about 20 degrees Celsius, more preferably up to 10 degrees over the temperature of the vapours exiting the kiln.

The vapour solid separation equipment are preferably the cyclones and/or the separation box, are heated at a temperature that is at least 10, and preferably at least 20, degrees below the cracking temperature of the vapour; wherein the solid exiting the rotating kiln is a dry coke, i.e. this coke preferably contains less than 2 weight percent oil and wherein most, preferably more than 50% weight, more preferably more than 90% weight, of the coke is removed from the vapours exiting the rotating kiln, and, in the case wherein the feed oil is an used oil, up to 99.5% weight. of the coke is removed from said vapour exiting the rotating kiln.

The vapours exiting the vapour solid separating equipment, such as cyclone(s), are advantageously partially condensed in a self-refluxing condenser and/or in a wash tower, to complete the solids removal from the reactor products.

The vapours exiting the last step wherein solids are usually eliminated, preferably this step takes place at the top of the condenser and/or on the wash tower, are routed to product separation, while the recovered heavy oil containing the residual solids exits at the bottom.

The heavy oil, containing the residual solids, are recycled preferably to the dewatering step, when present, and/or in the oil feed entering at the beginning of the process, and/or in the oil feed entering the rotating kiln.

The recovered heavy oil and the fractionators bottoms oil positioned in the product separation section can also be used as flushing oils to clean fouled equipment.

The positive pressure, in the rotating kiln, ranges from 1 to 4 atmospheres; preferably this pressure ranges from 1.2 to 1.5 atmospheres.

The feed oil before the feed oil enters said rotating operating reactor, heated, preferably at a temperature that is at least 20 degrees Celsius under the cracking temperature of the feed oil.

The water present is removed from the feed oil before the feed oil enters the reactor, preferably in a flash evaporator, from the feed oil, before the feed oil enter the rotating kiln.

The feed oil is an oil, which according to its history and/or according to its origin, may, before entering the rotating kiln, be chemically treated, or slightly chemically treated, to reduce its metal content, preferably the feed oil is treated by at least one acid and by at least one base, the acid being advantageously a sulphur acid and/or a phosphoric and/or a phosphoric acid.

A process wherein the heating step(s) is (are) accomplished in a heater and/or by heat exchange with a hot oil stream, a hot thermal fluid, by the injection of a hot gas, by direct contact with a hotter oil stream, or by a combination of at least two of these methods.

The reactor feed stream resulting from the heating of the feed oil is, preferably sprayed unto metal plates in a rotating kiln that contains metal plates, wherein it is thermally cracked and/or vaporized.

The reaction products that exit the rotating kiln comprise hydrocarbon, organic and/or inorganic vapours, present in the reaction zone of the rotating operating kiln and solid coke, sand, metals, dirt, and/or other solid particles.

The reaction products exiting the rotating operating kiln are advantageously swept out of the rotating operating reactor as soon as possible, preferably in 5 seconds to 60 minutes, more preferably in about 5 minutes; the residence time is a function of at least one of the following parameters: feed oil composition, the reaction pressure, the temperature and/or the desired product slates.

The reaction products, when swept out of the rotating, are advantageously heated at a temperature that is advantageously slightly over the temperature at the exit of the reactor.

In a preferred embodiment, most of the coke is removed from the hydrocarbon stream exiting the rotating kiln, before the oil is condensed preferably in a vapour/solid separator and then advantageously in cyclones and/or in a wash tower or in a self-refluxing condenser.

The hydrocarbon product stream is advantageously at least partially condensed and separated into specified products.

In another preferred embodiment:
at least part, and preferably all, the non-condensable gas produced in the rotating operating kiln is used as fuel on site; or
at least part, and preferably all, the naphthas present in the feed oil and/or produced in the rotating kiln is used as fuel on site.

Advantageously, the sweep gas is superheated steam. Preferably, the sweep gas represents in weight up to 30% of the weight of the feed oil, preferably up to 10%, and more preferably between 0.5 and 5% of the weight of the feed oil.

The cyclones when used are advantageously outside of said rotating operating reactor but inside a second heated enclosure, said second enclosure is communicating or not with the first fire box, in order to benefit of a warm hot flue gas flow surrounding said cyclones.

At least part of the purified oils thereby recovered may be used on the site and/or sold to clean heat exchanger(s) or other fouled equipment.

The residence time in the reactor is variable and may depends on the reactor feed stream, the sweep gas, the reactor temperature and pressure and the desired product slate.

The residence time in the rotating kiln usually ranges from less than a minute to 15 hours, and this time preferably range between 2 minutes and 30 minutes.

An increase of 10 to 15 degrees centigrade may advantageously reduce by half the residence time.

The demetalisation rate of the total liquid oil products (heavy oil, wide range diesel and naphtha) recovered during said process may be of at least 90%, preferably of at least 95% and more preferably of at least 99% and/or the total recovered oil may contain less than 60 PPM of metal.

The metals mainly present in the recovered total oil products are usually mainly copper, iron and zinc, the other metals being at a level that is inferior to 1 PPM each.

Chrome, vanadium, cadmium, nickel and lead, originally present in the feed stream, being during said process mainly concentrated in the recovered coke, the concentration may reach up to 99% weight.

The gas recovered from the rotating kiln is mainly composed of hydrocarbons. The gas and the naphtha produced are preferably used as fuel on the site to satisfy the energy self sufficiency of the plant in function.

The recovered oil is usually characterized in that is has no sulphurous content or has less than 3000 ppm of the sulphur in the mixture.

The process is of a particular interest when marpol is injected in the feed oil that is preferably of the type present in the bottom of ship fuel tanks.

Marpol is advantageously injected in a limited amount representing from 10 to 95% of the weight of the feed oil and/or the feed oil may be replaced by a marpol.

The limited amount of water present in the oily products represent up to 98% weight of the feed oil, provided the oil is at a temperature lower than its vaporisation temperature at line pressure. The limited amount of oily products usually contain up to 99% weight of the feed oil.

The rotating kiln contains a charge of plates and at least part of the surface of said plates is used to perform the thermal treating. Advantageously, thermal processing is performed on at least part of the surface of said plates in movement. Preferably, thermal processing is performed on at least 5%, preferably on at least 10% of the surface of said plates and/or on at least 5%, preferably on at least 10% of the plates.

The plates when moving inside said reactor clean the walls of said reactor, and avoid reactor wall failures and during the thermal processing of a mixture, wherein said plates protect at least part of the walls of said reactor and contribute to the uniformity of temperatures conditions in said reactor.

The plates also contribute to the heat transfer taking place from the heated walls to the surface of said plates, particularly to the heat transfer taking place on the surfaces of those plates wherein thermal processing occurs.

EXAMPLES

The following examples are given as a matter of illustration only, and should not be constructed as representing any limitation of the invention in its broadest meaning.

Example 1—Marpol

FIG. 1 illustrates the process when marpol is treated. Marpol, or waste oil from ship fuel tank bottoms, is introduced at 90 degrees Celsius with about 3% weight water (501) into the flash drum (502). It operates under vacuum and is kept at temperatures below the oil's initial thermal cracking temperature. The flash drum can be heated by circulating (504) the bottom oil through a heat exchanger (505), as illustrated here. It can also be heated through a heater or direct heating of the flash drum walls. The oil and water vapours escape the flash drum into the tubes of a self-refluxing condenser, or dephlegmator, (503). Some of the vapours condense in the tubes of the dephlegmator and fall back into the flash drum. The vapours exiting the top of the dephlegmator (506) are cooled in a heat exchanger (507), and the water, oil and gas phases are separated in a phase separator vessel (508). The vacuum is established with a vacuum pump, a compressor or ejectors (509). The gases are used as fuel on site (510). The gasoil fraction (511) is sold. The water (512) is cleaned in a treatment plant. The oil from the bottom of flash drum (513) can be vaporized and/or thermally cracked in a rotating kiln (514). Steam or another inert gas (515) is injected into the reactor. The coke and solids (517) are removed from the reactor products (516), while still in the vapour phase. The reactor product vapours (518) are condensed and separated into non-condensable gas (519), and naphtha (520) both used as fuel on site, the water (523) is treated and the product gasoil (521) and heavy oil (522) go to storage.

Marpol, oil from the bottom of ship fuel tanks, is introduced in the plant at the rate of 400 kg/hr. and temperature of 90 degrees Celsius. The feed oil contains 3% wt. water. It is introduced in a flash drum, operating at 350 degrees Celsius and 35 KPa(a). The oil is partially vaporized. The oil vapours, about 145 kg/hr., exit the top of the flash drum with the steam (12 kg/hr.). They enter the bottom of the dephlegmator (or self-refluxing condenser), where the vapours are cooled to 290 degrees Celsius. The heavier oily vapours (about 45 Kg/hr.) condense and slip along the tubes back into the flash drum. The lighter oil vapours and steam are cooled enter a phase separator, where the gasoil (100 kg/hr.) is separated from the water. The flash drum bottoms can be routed to the thermal cracking unit.

Example of Dephlegmator Sizing:

The sizing of a dephlegmator depends on a number of factors such as the amount and kind of feed oil entering the flash drum, the amount of water in the feed oil, the temperature in the drum, the pressures in and out of the dephlegmator, the temperature of the vapours exiting the tubes (determine the 90% point of the diesel or lube oil cut), the fouling factors used, the nature and amount of the cooling fluid and its temperatures in and out of the exchanger to name a few.

Assumptions: Air cooled dephlegmator
Feed to the Flash Drum: 100 t/d of Used Lubricating Oil
Water in the Feed oil: 4% wt.
Over-all heat transfer (Q): 142 500 K Cal/hr.
Absolute pressure in the flash drum: 0.35 atmosphere
Pressure drop in the dephlegmator tubes: 0.05 atmosphere
Temperatures:
Vapours in: 350 degrees Celsius
Vapours out: 315 degrees Celsius
Air in: 20 degrees Celsius
Air out: 50 degrees Celsius
Over-all heat transfer coefficient (U): 150 W/(m$^2$*° K)
Nominal tube size: 25 mm (diameter)
Results:

Heat transfer area $A=Q/(U*\text{LMTD})$ where
LMTD=Logarithmic mean temperature difference
A=3.75 m$^2$ or about 20 tubes, each 2 m long.

Example 2—Used Lubricating Oil

Figure 2:
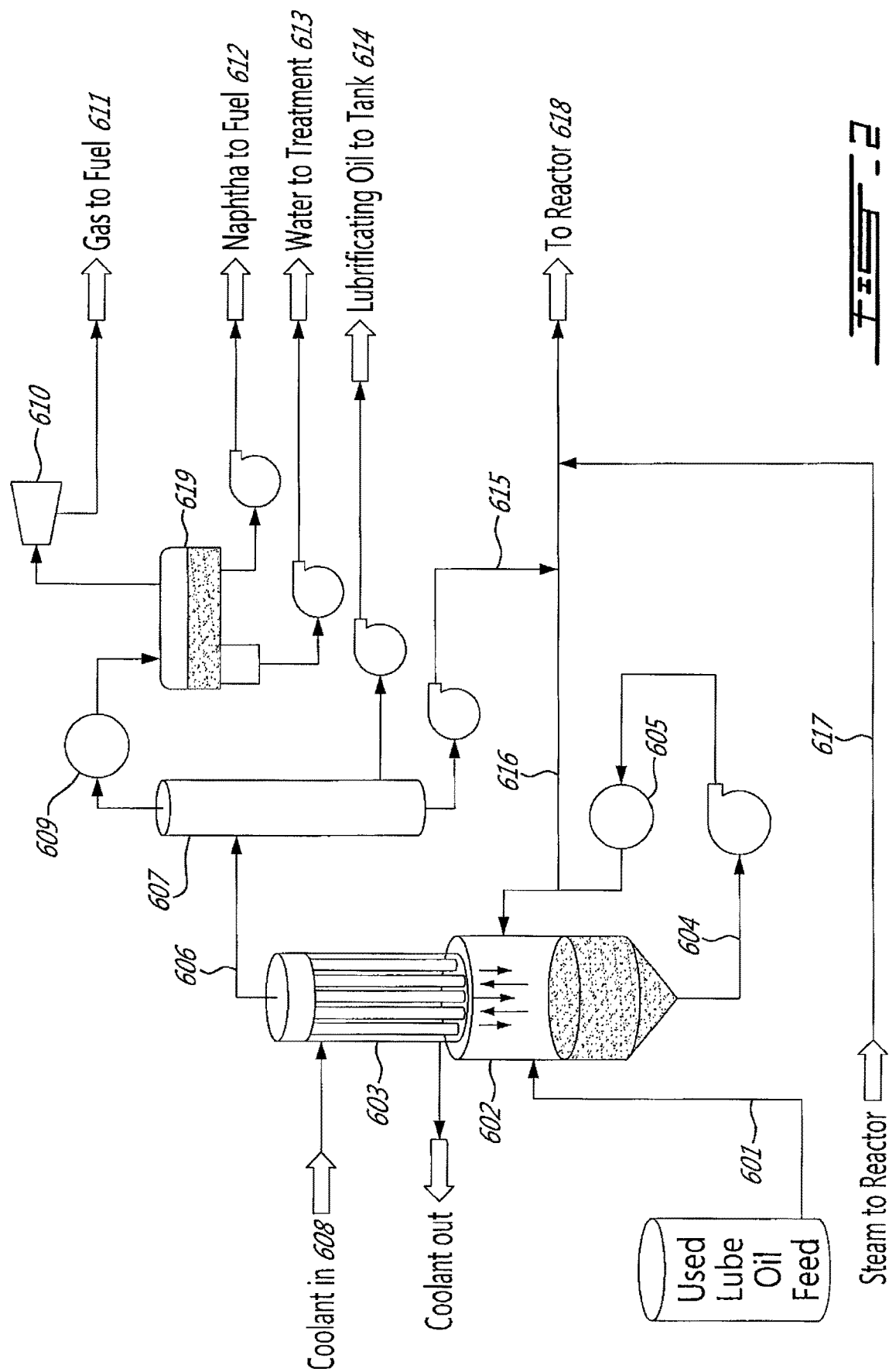
FIG. 2 is a simplified flow diagram illustrating a version of the process according to the present invention in the case of the treatment of a used lube oil with a dephlegmator and a distillation column.
Figure 3:
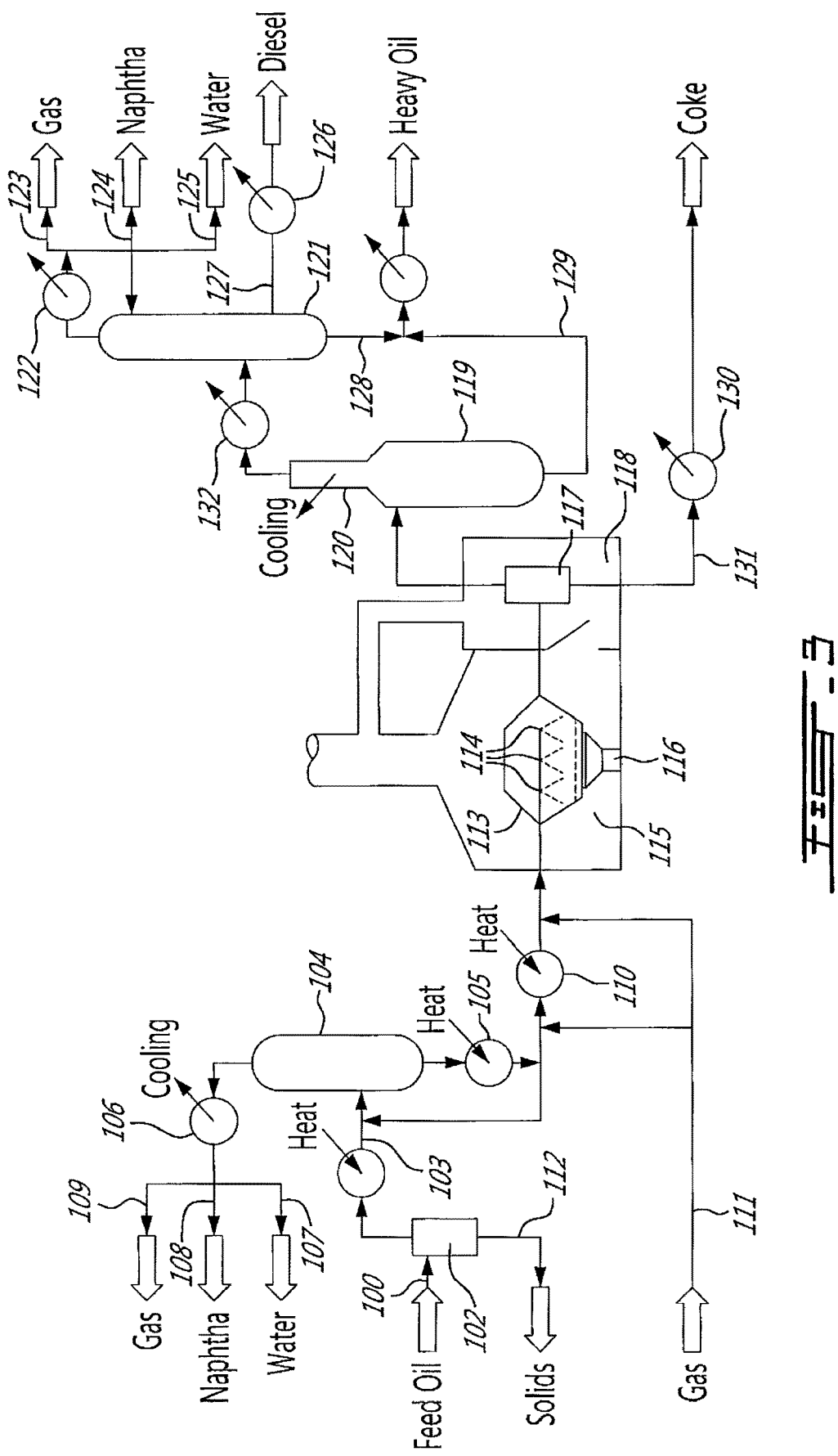
FIG. 3 is a simplified flow diagram illustrating a version of the process according to the present invention in the case wherein a sweep gas is used.

FIG. 2 illustrates the process when used lubricating oil is treated. Used lubricating oil (601), containing about 5% wt. water, is heated to 90 degrees Celsius and introduced into the flash drum (602). It operates under vacuum and is kept at temperatures below the oil's initial thermal cracking temperature. The flash drum can be heated by circulating (604) the bottom oil through a heat exchanger (605), as illustrated here. It can also be heated through a heater, direct heating of the flash drum walls or by the injection of a hot fluid into the flash drum. The oil and water vapours escape the flash drum into the tubes of a self-refluxing condenser, or dephlegmator, (603). The dephlegmator is cooled with a coolant (608) such as air, water, a cooler oil, or feed oil. Some of the vapours condense in the tubes of the dephlegmator and fall back into the flash drum. The vapours exiting the top of the dephlegmator (606) are routed to a product separation system, shown here as a distillation column (607). The vapours from the top of the column are cooled (609) and partially condensed into an accumulator (619). The vacuum is established with a vacuum pump, a compressor or ejectors (610). The non-condensable gas (611) and naphtha (612) are used as fuel on site. The water (613) is treated on site. The lubricating oil (614) product is sold. The oil from the bottom of distillation column (615) can be vaporized and/or thermally cracked in a rotating kiln (618), sent back to the flash drum or sold as fuel. Steam or another inert gas (617) is injected into the reactor. The oil from the bottom of the flash drum (616) can be vaporized and/or thermally cracked in a rotating kiln (618).

Used lubricating oil, collected mostly from service stations, is introduced in the plant at the rate of 400 kg/hr. The feed oil contains 4% wt. water. The oil is heated in a heat exchanger to 90 degrees Celsius and introduced in a flash drum, operating at 350 degrees Celsius and 35 KPa(a). The oil is partially vaporized. The oil vapours, about 360 kg/hr., exit the top of the flash drum with the steam (16 kg/hr.). They enter the bottom of the dephlegmator (or self-refluxing condenser), where the vapours are cooled to 315 degrees Celsius. The heavier oily vapours (about 110 Kg/hr.) condense and slip along the tubes back into the flash drum. The lighter oil vapours and steam enter a distillation unit. The gas (8 kg/hr.), water (16 kg/hr.) and naphtha (7 kg/hr.) exit at the top of the column. The lubricating oil base stock exits the column as a side cut (210 kg/hr.). A heavy oil exits the bottom of the column (about 25 Kg/hr.). It is combined with the flash drum bottoms and can be routed to the thermal cracking unit.

Examples 3

Mobile Plant for Thermally Treating a Feed Oil, that is a Contaminated Oil

Figure 15:
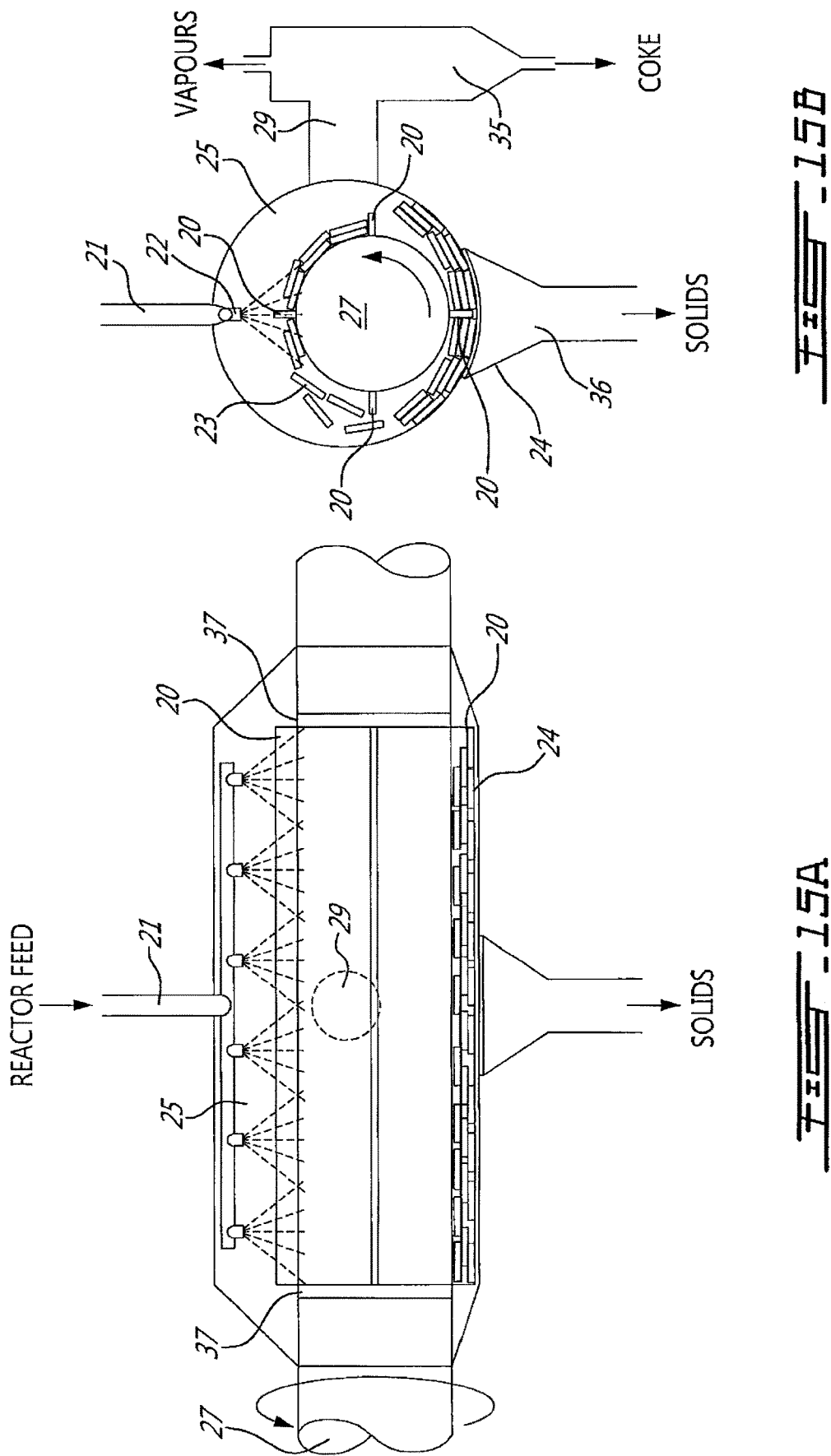
FIGS. 15A and 15B are a further alternate embodiment of the rotating reactor of the invention wherein heating is performed inside the reactor.

The mobile plant represented on FIG. 15, has a capacity of 50 barrels per day (BPD) for thermally treating waste oils, and making useful products without environmentally harmful by-products.

The mobile plant includes a rotating reactor having the following specifications:

Reactor cylinder internal diameter: 5'

Reactor cylinder length: 20'

Heat released: 0.5 MMBtu/hr.

Conic section heights: 2.5'

Housing external size: 7' high 6' wide and 26' long

Following are examples of thermal cracking tests performed in rotating kilns:

Examples 4, 5, and 6 were tests performed using dry waste oil drawn from the same drums to eliminate test result differences due to variations in feed oil quality as much as possible.

Example 4 was performed with the injection of 5% weight. water added to the 16 l/hr. reactor feed oil.

Example 5 kept the same oil feed rate and operating conditions as in example 4 but without water injection into the reactor.

In example 6, the oil feed rate was increased by 50% to 24 l/hr, again without water in the reactor feed.

Example 7 was performed on the same kiln but with a different oil sample.

Example 4 refers to Table 1—Example 4 for a summary of the operating conditions and feed and products rates and analyses. The waste oil streams tested contained used lubricating oils as well as other oily streams such as metal working oils, transmission fluids, greases, form oils, and any number of unknown waste oil streams.

TABLE 1

| Example 4 | |
|---|---|
| Reactor Size: | L = 1.07 m, Diameter 0.47 m |
| Reactor Temperature: | 490 C. |
| Reactor Pressure: | 124 KPa(a) |
| Sweep Gas: | Steam @ 5% Weight on Feed |
| Heavy Oil Recycle: | None |
| Oil Feed Rate: | 16 L/h |

| Test | Method | Units | Feed Oil | Gas | Naphtha | Gasoil | Heavy Oil | Coke & Solids |
|---|---|---|---|---|---|---|---|---|
| Weight % on Oil Feed | | | 100 | 5.3 | 8.0 | 56.5 | 20.6 | 9.6 |
| Density @ 15 C. | ASTM D4052 | g/ml | 0.89 | | 0.758 | 0.866 | 0.933 | 1.4 |
| Molecular Weight | | g/mole | | 36.7 | | | | |
| Water (1) | STM D1533 | Volume % | 5.7 | 0.7 | | | | |
| Metals | Digestion & ICP-IS | ppm Weight | 2160 | | | 3 | 240 | 25550 |
| Sulphur | LECO S32 | Weight % | 0.63 | 0.0037 | 0.05 | 0.26 | 0.91 | 2.63 |
| Halogens | Oxygen Bomb Combustion | ppm Weight | 470 | | 192 | 84.3 | 5 | 219 |
| Viscosity @ 40 C. | ASTM D445 | cSt | 33.6 | | | 2.11 | 77.1 | |
| Copper Strip Corrosion | ASTM D120 | | | | | 1a | | |
| Sediments | ASTM D2276 | mg/ml | | | | 0.5 | 0.05 | |
| Flash Point | ASTM D92 | C. | 128 | | | 48 | <100 | |
| CCR | D189 | Weight % | 3.34 | | | 1.01 | | |
| Ash | ASTM D4422 & ASTM D482 | Weight % | 0.4 | | | 0.01 | 0.05 | 7.43 |
| pH | | | | | | | | |
| Distillation | ASTM D2887 | Weight % | | | | | | |
| IBP | | C. | 162 | 30 | 110 | 338 | | |
| 10% | | C. | 246 | 47 | 156 | 374 | | |
| 50% | | C. | 414 | 98 | 255 | 436 | | |

TABLE 1-continued

| Example 4 | | | | | |
|---|---|---|---|---|---|
| 90% | C. | 528 | 133 | 355 | 525 |
| EP | C. | 592 | 157 | 419 | 589 |

Note:
The oil feed is 95% weight of the reactor feed, while the water entering the kiln makes up the other 5% weight. All the product yields are calculated on a dry feed oil basis.

A dewatered waste oil stream of 16 L/min is injected in an indirectly fired rotating kiln, containing metal shavings at 490 degrees Celsius reactor exit temperature.

The seals on the kiln were changed to permit pressures above atmospheric in the reaction zone. Steam was also injected into the reactor at the rate of 5% weight on dry oil feed.

As shown on Table 5, a 72% conversion of the 350° C.+ fraction into lighter oils, gas and coke was observed. Over 95% of the metals entering the reactor exits with the coke.

Example 5: Please Refer to Table 2—Example 5 for a Summary of the Operating Conditions and Feed and Products Rates and Analyses

TABLE 2

| Example 5 | |
|---|---|
| Reactor Size: | L = 1.07 m, Diameter 0.47 m |
| Reactor Temperature: | 500 C. |
| Reactor Pressure: | 125 KPa(a) |
| Sweep Gas: | None |
| Heavy Oil Recycle: | None |
| Oil Feed Rate: | 16 L/h |

| Test | Method | Units | Feed Oil | Gas | Naphtha | Gasoil | Heavy Oil | Coke & Solids |
|---|---|---|---|---|---|---|---|---|
| Weight % on Feed | | | 100 | 9.8 | 11.2 | 46.8 | 22.6 | 9.6 |
| Density @ 15 C. | ASTM D4052 | g/ml | 0.893 | | 0.758 | 0.865 | 0.933 | 1.4 |
| Molecular Weight | | g/mole | | 37.4 | | | | |
| Water | STM D1533 | Volume % | 0.7 | | | | | |
| Metals | Digestion & ICP-IS | ppm Weight | 2160 | | | 3 | | 25510 |
| Sulphur | LECO S32 | Weight % | 0.63 | | 0.05 | 0.26 | 0.91 | 2.63 |
| Halogens | Oxygen Bomb Combustion | ppm Weight | 470 | | 192 | 85 | 5 | 219 |
| Viscosity @ 40 C. | ASTM D445 | cSt | 33.6 | | | 2.1 | 77.1 | |
| Copper Strip Corrosion | ASTM D120 | | | | | 1a | | |
| Sediments | ASTM D2276 | mg/ml | | | | 0.5 | 0.05 | |
| Flash Point | ASTM D92 | C. | 128 | | <0 | 48 | | |
| CCR | ASTM D189 | Weight % | 3.34 | | | 1.01 | | |
| Ash | ASTM D4422 & ASTM D482 | Weight % | 0.4 | | | 0.01 | 0.05 | 7.43 |
| pH | | | | | | | | |
| Distillation | ASTM D2887 | Weight % | | | | | | |
| IBP | | C. | 162 | | 30 | 150 | 338 | |
| 10% | | C. | 246 | | 47 | 178 | 374 | |
| 50% | | C. | 414 | | 98 | 255 | 436 | |
| 90% | | C. | 528 | | 133 | 343 | 525 | |
| EP | | C. | 592 | | 157 | | 589 | |

The waste oil streams tested contained used lubricating oils as well as other oily streams such as metal working oils, transmission fluids, greases, form oils, and any number of unknown waste oil streams.

A dewatered waste oil stream of 16 L/hr. is injected in an indirectly fired rotating kiln, containing metal shavings at 490 degrees Celsius. This stream was drawn from the same barrel as in Example 3. The seals on the kiln had been changed to permit pressures above atmospheric in the reaction zone. There was no steam injection into the reactor for this test.

As shown on Table 2, Example 5, a 69% conversion of the 350° C.+ fraction into lighter oils, gas and coke was observed. Over 95% of the metals entering the reactor exits with the coke.

The main difference between these two examples is in the gasoil make: in example 4, the gasoil in the products was 56.5% weight, a gain of 30.5% weight on feed oil. In example 5, the gasoil make was 46.8% weight of the products, a gain of only 20.8% weight on feed oil. The injection of steam into the reactor may have impeded the secondary reactions in which the gasoil present in the reactor is cracked, producing naphtha and gas. The operation of the reactor during example 4 was more stable than for example 5 in that temperatures and pressure swings were calmed. The wide range diesel oil produced was lighter in colour and more stable in example 4 than for example 5.

Example 6 refers to Table 3—Example 6 for a summary of the operating conditions and feed and products rates and analyses:

TABLE 3

Example 6

| | | |
|---|---|---|
| Reactor Size: | | L = 1.07 m, Diameter 0.47 m |
| Reactor Temperature: | | 495 C. |
| Reactor Pressure: | | 125 KPa(a) |
| Sweep Gas: | | None |
| Heavy Oil Recycle: | | None |
| Oil Feed Rate: | | 24 L/h |

| Test | Method | Units | Feed Oil | Gas | Naphtha | Gasoil | Heavy Oil | Coke & Solids |
|---|---|---|---|---|---|---|---|---|
| Weight % on Feed | | | 100 | 0.6 | 11.9 | 54 | 29 | 4.5 |
| Density @ 15 C. | ASTM D4052 | g/ml | 0.889 | | 0.752 | 0.862 | 0.931 | 9.0 |
| Molecular Weight | | g/mole | | 37.6 | | | | |
| Water | STM D1533 | Volume % | 0.7 | | | | | |
| Metals | Digestion & ICP-IS | ppm Weight | 86.9 | | | 0.04 | 61 | |
| Sulphur | LECO S32 | Weight % | 0.63 | | 0.03 | 0.26 | 0.88 | 2.63 |
| Halogens | Oxygen Bomb Combustion | ppm Weight | 470 | | 190 | 84.5 | 45.2 | 219 |
| Viscosity @ 40 C. | ASTM D445 | cSt | 33.6 | | | 1.89 | 66.3 | |
| Copper Strip Corrosion | ASTM D120 | | | | | | 3b | |
| Sediments | ASTM D2276 | mg/ml | 0.14 | | | 0.6 | 0.05 | |
| Flash Point | ASTM D92 | C. | 128 | | <0 | 41 | 222 (° C.) | |
| CCR | D189 | Weight % | 3.34 | | | | 0.87 | |
| Ash | ASTM D4422 & ASTM D482 | Weight % | 0.4 | | | | 0.05 | 7.43 |
| pH | | | 4.32 | | | | | |
| Distillation | ASTM D2887 | Weight % | | | | | | |
| IBP | | C. | 162 | | 30 | 144 | 338 | |
| 10% | | C. | 246 | | 45 | 172 | 368 | |
| 50% | | C. | 414 | | 94 | 251 | 431 | |
| 90% | | C. | 528 | | 126 | 335 | 518 | |
| EP | | C. | 592 | | 146 | 400 | 588 | |

The waste oil streams tested contained used lubricating oils as well as other oily streams such as metal working oils, transmission fluids, greases, form oils, and any number of unknown waste oil streams. The oil in this test was taken from the same drums as for examples 3 and 4. However, the analytical data differs a little from the previous examples. This confirms that waste oil feedstocks can change in properties, even when pulled from a single tank.

A dewatered waste oil stream of 24 L/hr. is injected in an indirectly fired rotating kiln, containing metal shavings at 490 degrees Celsius. The seals on the kiln were changed to permit pressures above atmospheric in the reaction zone. There was no steam injection during this test.

As shown on Table 5, a 61% conversion of the 350 degrees Celsius+ fraction into lighter oils, gas and coke was observed. Over 95% of the metals entering the reactor exits with the coke. In this example, the feed rate was increased by 50% over the first two examples, and there was no steam injection. Although the conversion of heavy oil is lower than in the first two examples, 61% of the 350 degrees Celsius+ oil was cracked, the gasoil gain was 28% weight, higher than for example 5, and slightly lower than in example 4. See Table 5. Increasing the feed rate by 50% may also have reduced the secondary reactions but operation of the reactor was difficult because of pressure swings and decreasing temperatures in the steal chip bed.

Example 7 refers to the Table 4—Example 7 for a summary of the operating conditions and feed and products rates and analyses:

TABLE 4

Example 7

| | | |
|---|---|---|
| Reactor Size: | | L = 1.07 m, Diameter 0.47 m |
| Reactor Temperature: | | 500 C. |
| Reactor Pressure: | | 125 KPa(a) |
| Sweep Gas: | | Steam @ 0.5% wt on dry oil feed |
| Heavy Oil Recycle: | | None |
| Oil Feed Rate: | | 6.7 L/hr |

| Test | Method | Units | Feed Oil | Gas | Naphtha | Gasoil | Heavy Oil | Coke & Solids |
|---|---|---|---|---|---|---|---|---|
| Weight % on Feed | | | 100 | 3 | 9 | 70 | 17 | 1 |
| Density @ 15 C. | ASTM D4052 | g/ml | 0.88 | | 0.841 | 0.889 | 1.109 | 2.683 |
| Molecular Weight | | g/mole | | 37 | | | | |
| Water | STM D1533 | Volume % | 0.53 | | | | | |
| Metals (1) | Digestion & ICP-IS | ppm Weight | 92.3 | | 0 | 0 | 81.6 | 78540 |

TABLE 4-continued

| | | Example 7 | | | | | |
|---|---|---|---|---|---|---|---|
| Sulphur | LECO S32 | Weight % | 0.33 | 0.063 | 0.15 | 0.5 | 1.97 |
| Halogens | Oxygen Bomb Combustion | ppm Weight | 367 | 78 | 75 | 199 | |
| Viscosity @ 40 C. | ASTM D445 | cSt | 45.3 | | 1.276 | | |
| Copper Strip Corrosion | ASTM D120 | | | | | | |
| Sediments | ASTM D2276 | mg/ml | 0.25 | | | | |
| Flash Point | ASTM D92 | C. | 91 | <7 | 32.5 | 220 | |
| MCRT | ASTM D4530 | Weight % | 1.25 | | 0.13 | | |
| Ash | ASTM D4422 & ASTM D482 | Weight % | 0.61 | | 0 | 0.02 | 68.64 |
| pH | | | | | | | |
| Distillation | ASTM D2887 | Weight % | | | | | |
| IBP | | C. | 151 | 25 | 78 | 314 | |
| 10% | | C. | 326.6 | 78 | 138 | 355 | |
| 50% | | C. | 429 | 80 | 209 | 442 | |
| 90% | | C. | 558 | 135 | 315 | 612 | |
| EP | | C. | 750 | | 397 | | |

Note:
Metals in this Table include chromium, copper, iron, lead, nickel and vanadium.

The waste oil streams tested contained used lubricating oils as well as other oily streams such as metal working oils, transmission fluids, greases, form oils, and any number of unknown waste oil streams. This oil was heavier than the feed oil in the previous three examples.

A dewatered waste oil stream of 6.7 L/hr. is injected in an indirectly fired rotating kiln, containing metal shavings at 490 degrees Celsius. The seals on the kiln were changed to permit pressures above atmospheric in the reaction zone. Steam was also injected into the reactor at the rate of 0.5% weight on feed.

As shown on Table 5, a 79.5% conversion of the 350 degrees Celsius+ fraction into lighter oils, gas and coke was achieved. The gasoil make was 70% weight, an increase of 57% of the feed oil. Over 95% of the metals entering the reactor exits with the coke.

Table 5 is a summary of the heavy oil conversion and gasoil product gains in the four tests previously described.

TABLE 5

| Heavy Oil Conversion and Gasoil Gain | | | | |
|---|---|---|---|---|
| Example | 4 | 5 | 6 | 7 |
| Heavy Oil - 350 C.+ | | | | |
| % weight in Feed oil | 74 | 74 | 73 | 83 |
| % weight in Products | 20.6 | 22.6 | 29 | 17 |
| % Converted | 72.2 | 69.5 | 61 | 79.5 |

TABLE 5-continued

| Heavy Oil Conversion and Gasoil Gain | | | | |
|---|---|---|---|---|
| Example | 4 | 5 | 6 | 7 |
| Gasoil - 185 C. to 350 C. | | | | |
| % weight in Feed oil | 26 | 26 | 26 | 12 |
| % weight in the Products | 56.5 | 46.8 | 54 | 51.7 |
| % weight Gain on feed oil | 30.5 | 20.8 | 28 | 39.7 |

These examples show that the injection of a sweep gas, in this case steam, results in a more efficient conversion of the heavy oil into gasoil, or wide range diesel fuel. A more stable operation and constant reaction temperature are obtained when the reactor is operating under pressure, instead of a vacuum.

Example 8: Performed on a Larger Kiln with Oil Similar to that Used in Example 7

Please refer to Table 6—Example 8 for a summary of the operating conditions and feed and products rates and analyses.

TABLE 6

| Example 8 | | | | | | | | |
|---|---|---|---|---|---|---|---|---|
| Reactor Size: | | | L = 2.44 m; Diameter = 3.05 m | | | | | |
| Reactor Temperature: | | | 500 C. | | | | | |
| Reactor Pressure: | | | 50 KPa(a) average | | | | | |
| Sweep Gas: | | | 0 | | | | | |
| Heavy Oil Recycle: | | | 350 L/h | | | | | |
| Oil Feed Rate: | | | 1125 L/h | | | | | |
| Test | Method | Units | Feed Oil | Gas | Naphtha | Gasoil | Heavy Oil | Coke & Solids |
| Weight % on Feed | | | 100 | 2.6 | 7.6 | 51.7 | 35.2 | 2.9 |
| Density @ 15 C. | ASTM D4052 | g/ml | 0.897 | | 0.751 | 0.846 | 0.876 | 1.8 |
| Molecular Weight | | g/mole | | | | | | |
| Water | STM D1533 | Volume % | 14.7 | | | | | |
| Metals (1) | Digestion & | ppm | 3650 | | 2.4 | 1.4 | 10.3 | |

TABLE 6-continued

| | | Example 8 | | | | | |
|---|---|---|---|---|---|---|---|
| | ICP-IS | Weight | | | | | |
| Sulphur | ASTM D808 | Weight % | 0.36 | | 0.07 | 0.09 | |
| Halogens | Oxygen Bomb Combustion | ppm Weight | 350 | | 0.02 | <3 | |
| Viscosity @ 40 C. | ASTM D445 | cSt | | | 2.21 | | |
| Copper Strip Corrosion | ASTM D120 | | | | 1a | | |
| Sediments | ASTM D2276 | mg/ml | 0.6 | 0 | <0.01 | 0.009 | |
| Flash Point | ASTM D93 | C. | 42 | | 51 | 214 | |
| MCRT | ASTM D4530 | Weight % | | | | | |
| Ash | ASTM D4422 & ASTM D482 | Weight % | | | | | 37.1 |
| pH | | | | | | | |
| Distillation | ASTM D2887 | Weight % | | | | | |
| IBP | | C. | 91 | 39 | 134 | 318 | |
| 10% | | C. | 295 | 77 | 173 | 429 | |
| 50% | | C. | 421 | 114 | 269 | 481 | |
| 90% | | C. | 499 | 19 | 370 | 539 | |
| EP | | C. | 571 | 182 | 422 | 689 | |

The waste oil streams tested contained used lubricating oils as well as other oily streams such as metal working oils, transmission fluids, greases, form oils, and any number of unknown waste oil streams. This oil was heavier than the feed oil in the first three examples, but comparable to the oil in example 4. This test was carried out on a larger kiln than for the previous examples.

A dewatered waste oil stream of 1125 L/hr. is injected in an indirectly fired rotating kiln, containing metal shavings at 500° C. The seals on the kiln did not permit pressures above atmospheric in the reaction zone. There was no steam injected into the reactor during this test. The total heavy oil stream of 350 L/hr. was recycled and added to the reactor feed stream. The pressure in the reactor varied between 30 KPa(a) and 90 KPa(a) and it was difficult to keep the temperature stable.

As shown on Table 7, a 58.8% conversion of the 350 degrees Celsius+ fraction into lighter oils, gas and coke was achieved. The gasoil make was 51.7% wt., an increase of 39.7% wt. of the feed oil. Over 99% of the metals entering the reactor exited with the coke. The best separation of the coke from the vapours exiting the reactor was achieved during this test. Over 75% of the sulphur entering the reactor exited the process with the coke.

TABLE 7

Heavy Oil Conversion and Gasoil Gain

| Example | 4 | 5 | 6 | 7 | 8 | Other (1) |
|---|---|---|---|---|---|---|
| Heavy Oil - 350 C.+ | | | | | | |
| % wt. in Feed oil | 74 | 74 | 73 | 83 | 85 | 84 |
| % wt. in Products | 20.6 | 22.6 | 29 | 17 | 35 | 9 |
| % Conversion | 72.2 | 69.5 | 61 | 79.5 | 58.8 | 86.9 (2) |
| Gasoil - 185 C. to 350 C. | | | | | | |
| % wt. in Feed oil | 26 | 26 | 26 | 13 | 12 | 12.5 |
| % wt. in Products | 56.5 | 46.8 | 54 | 70 | 51.7 | 63.2 |
| % wt. Gain on Feed oil | 30.5 | 20.8 | 28 | 57 | 39.7 | 50.7 |

(1) "Other" is the average obtained by operating the larger kiln over 5000 hours with between 0 and 10% wt. (on dry oil feed) steam injection.
(2) During these runs, about 30% of the heavy oil make was recycled back to the reactor feed.

The average results from some 5000 hours of subsequent runs on this kiln are shown in the "other" column of Table 7. They achieved an average 86.9% conversion of the heavy oil fraction entering the reactor in the dry waste oil feed. The wide range diesel oil fraction in the feed oil of 12.5% wt. became 63.2% wt. at the reactor exit, an increase of 50.7% wt. on dry oil feed.

Some embodiments of the invention may have only one of these advantages; some embodiments may several advantages and/or may have all of them simultaneously.

The following two examples illustrate how the heavy oil, produced from used lubricating oil treated with the process, surprisingly proved to be effective in cleaning fouled equipment.

Example 9

Used lubricating oil was being treated in a unit with a rotating kiln and heat exchangers became plugged. The exchangers were too hot to open or to treat with acetone. It was decided to try back washing the exchangers using the heavy oil, directly from the bottom of the wash column, because that oil, at 350 degrees Celsius, was hot and the pump could develop up to two atmospheres in pressure. The heat exchangers were unplugged and clean in a matter of minutes. The fouling material, along with the heavy oil, were routed back to the dehydration vessel where they mixed with fresh used oil feed and became reactor feed oil.

Example 10

When the same heavy oil was first tested as a component in flotation oil, although the flotation oil tanks had been cleaned prior to the test, the oil arrived at the flotation cells very dark and containing gums and solids. Although the lines had been flushed before the test, the new oil had cleaned the remaining deposits out of the flotation oil feed system. The new oil proved to be more effective than hot water and steam as a defouling agent.

Advantages of the Process

This waste oil thermal cracking process has many advantages over other waste oil cracking or reuse processes:
1. It is simple and easy to operate.
2. It is flexible and can treat a wide variety of waste oils, not just used lubricating oils from service stations and the like.
3. About 99% of the metals and 75% of the sulphur, present in waste oil, exit the process with the non-leachable coke before the vapours exiting the reactor are condensed. The sulphur and metals do not enter into the finished oil products.

4. All the products from this process are safe and can be sold in current markets. There is no product or by-product to dispose of in incinerators or industrial waste dumps.
5. The heavy oil produced can be used to back-flush and clean heat exchangers and other equipment on site. There is no need to pre-treat the waste oil feedstock to prevent equipment fouling. Therefore, the laboratory analyses and chemicals required by the waste oil feed pre-treating unit are not needed, neither is their spent chemicals disposal.
6. The oil used to clean equipment on site and containing fouling material can be processed in the mobile plant and reused.

This waste oil thermal cracking process has many advantages over other waste oil recycling processes:
1. It is simple and easy to operate.
2. It is flexible and can treat a wide variety of waste oils, not just used lubricating oils from service stations and the like.
3. The products do not need to meet the stringent specifications of lubricating oil base stocks. This eliminates the need for careful selection of feedstocks, leaving most waste oils to be disposed of into the environment.
4. The additives in the waste oil feedstocks are destroyed and about 99% of the metals and 75% of the sulphur, present in waste oil, exit the process with the non-leachable coke before the vapours exiting the reactor are condensed. There is no need to dispose of the heavy oil fraction, containing most of the metals and sulphur.
5. All the products from this process are safe and can be sold in current markets. There is no product or by-product to dispose of in incinerators or industrial waste dumps.
6. The heavy oil produced can be used to back-flush and clean heat exchangers and other equipment on site. There is no need to pre-treat the waste oil feedstock to prevent equipment fouling. Therefore, the laboratory analyses and chemicals required by the waste oil feed pre-treating unit are not needed, and neither is their spent chemicals disposal. The resulting soiled back-flushing oil can be recycled to the dehydration unit, and/or to the reactor, and reused. There is no need to treat waste water and/or to dispose of oily wastes in industrial dumps or landfills.
7. It is viable in smaller plants, with a smaller collection radius and does not need to be subsidized by governments.

Presently water is used to clean ships bunker reservoir, tank farm bottoms and other equipment that is fouled by heavy oils and/or other hydro-carbon residue. This means that the water used has to be separated from the oily residues and then the residues treated or burned in cement kilns. The burning of the oily residues is bad for the environment and a waste of the hydrocarbon resources.

The present invention can take the residues and produce diesels, additives for asphalt and heavy oils that can be used to clean the residues. By using these oils to clean the tank bottoms and other reservoir the cleaning process is more efficient and there is no need to separate water from the residue. All the residue and the oil can then be pumped out and treated.

By having a mobile plant it would be possible to produce the heavy polarized oils to clean the tanks and equipment and then treat the residue and heavy oils to obtain commercial products and more oil to continue the cleaning process. Thus the mobile plant permits more effective periodic cleaning of tank farms and refinery equipment and other places with reduced transport of waste oils which are often classified as hazardous material.

Also a mobile plant can also be used to treat waste oils in regions with low density of population, near out of the way mines or industrial complexes and where the volumes of oils to be treated at any given time is low and the cost of transporting the oils is high or could lead to ecological disasters during the transport. Presently, most of the waste oils in these regions are burned or thrown away which is very bad for the environment. A mobile plant would be transported on a periodic basis in these regions to treat the oils and sell the product in the region.

The mobile plant could be built within a standard 45 feet high cube container and thus could be easily transported by truck, rail or boat.

In summary some of the advantages of the new thermal processing apparatus include:
a steady and controllable reaction temperature,
a specified product slate of consistent quality,
protection of the reactor wall from stress and failure due to thermal shock or hot spots,
preventing coke from depositing and sticking on the reactor walls and internals,
longer run times, shorter shut-downs, less maintenance cost,
safer operation,
a steady and controllable reaction pressure, and
minimizing of the thermal stress on the reactor walls and/or on the internals.

Some embodiments of the invention may have only one of these advantages; some embodiments may several advantages and may have all of them simultaneously.

Advantages of the Process of the Invention

This is a simple process that can treat a wide variety of waste oils and make useful and environmentally friendly products.

This process is in energy equilibrium. When used lubricating oils are processed, the produced gas and naphtha are consumed on site, and there is little or no need to purchase fuel, or to use the more valuable wide range diesel or heavy oil products from the plant. There is also no naphtha to dispose of.

When produced, the wide range diesel is a light amber colour. The produced diesel is unstable and will darken with time or when exposed to air. The diesel deteriorates much faster, within days instead of months, if there is no inert gas injection into the reactor inlet. Injection of inert gas results in a higher yield of diesel oil (from 78% vol. to 82% vol. of the total liquid product) and lower yield of naphtha (from 10% vol. to 6% vol. of the total liquid product).

Depending on the sulphur content in the feed oil, the sulphur in the diesel produced could be below the 0.1% weight, now specified in Europe for home heating oil.

The heavy oil is a low sulphur fuel. It can be sold as bunker fuel, or as specialty oil. It is also used as backwash oil in the process plant. Plants that process waste oils face constant fouling of their equipment. Used lubricating oil re-refining facilities usually pre-treat their feedstock with chemicals to remove as much of the metals and solids as possible. They have to test each truck load entering the plant and must add the purchase of chemicals and the disposal of spent chemicals to their operating costs. Thermal cracking units that treat used lube oils are usually much smaller than re-refiners. They have frequent shutdowns to remove coke deposits and clean heat exchangers. In this process, heat exchangers can be cleaned while the plant is on stream using the backwash oil on site. The solids exit the plant with the coke.

The sulphur and metals, released in the cracking reactions, are attached to the coke. The coke is removed from the vapour oil stream as it leaves the reactor. Therefore the sulphur and metals are not present when the oil is condensed into liquid fuels. This is why the oil products leaving the plant are low in sulphur and metals, when compared to products from other used oil thermal cracking facilities. The metals in the coke are thought to act as catalysts in the deterioration of the oil products. The diesel oil produced with this process is more stables than oils produced in other thermal cracking units. The coke is non-leachable and can be disposed of in landfills. It can also be blended in asphalts or cements.

This is a dry process: there is no liquid level in the reactor. The reactor temperature is not limited to the boiling point of the oil feed. This process can treat a much wider variety of waste oils than the conventional thermal cracking units. As an example: synthetic oils are increasingly used as base oils. They are more stable than conventional base oils and do not need to be changed as often to keep engines in good running order. Less oil changes mean less feedstock to used lube oil plants and the feedstock they get contains more additives and contaminants. In a conventional thermal cracking plant, since the reactor temperature is limited to the boiling point of the oil, the more stable oil will require a longer residence time to crack, which limits the plant throughput and profitability.

The process is very flexible. Since the reactor temperature can be changed to suit, this process can be used to treat waste oils, such as refinery tank bottoms, that are not necessarily used lubricating oils. It can also treat oils that have a high propensity to form coke such as bitumen or marpol.

The reactor in the process is under pressure which results in a more stable operation, and consistent product quality and quantity. A rotating kiln under positive pressure is safer because there will be no oxygen ingress into the reactor, which, if left undetected, could result in an explosion. In the event of a leak, oily vapours would exit into the firebox and would burn in an environment designed to contain flames.

One of the safety features of this process is that there is no vessel containing large amounts of oil in this process. Residence times are low. The only vessel that might contain large amounts of oil is the dewatering flash drum. It is under a steam atmosphere. In an emergency the equipment can be drained within minutes, and steam or another inert gas, is already present in the reaction and product separation units.

The present invention can take the residues and produce diesels, additives for asphalt and heavy oils that can be used to clean the residues. By using these oils to clean the tank bottoms and other reservoir the cleaning process is more efficient and there is no need to separate water from the recovered residue. All the residue and the oil can then be pumped out and treated.

By having a mobile plant it would be possible to produce the heavy oils to clean the tanks and equipment and then treat the residue and heavy oils to obtain commercial products and more oil to continue the cleaning process. Thus the mobile plant permits more effective periodic cleaning of tank farms and refinery equipment and other places with reduced transport of waste oils which are often classified as hazardous material.

Also a mobile plant can also be used to treat waste oils in regions with low density of population, near out of the way mines or industrial complex and where the volumes of oils to be treated at any given time is low and the cost of transporting the oils is high or could lead to ecological disasters during the transport. Presently, most of the waste oils in these regions are burned or thrown away which is very bad for the environment. A mobile plant would be transported on a periodic basis in these regions to treat the oils and sell the product in the region.

The mobile plant could be built within a standard 45 feet high-cube container and thus could be easily transported by truck, rail or boat.

Also cleaning with oil is better for corrosion purposes and leaves no water residues in the equipment, which could become safety hazards when the equipment is put back into service.

Among the products are cracked heavy oils that can be used to dissolve and clean the fouling material deposited in equipment. The cleaning oil, along with the foulants removed from the equipment can be treated in the mobile plant, making useful products.

Example of the Process:

FIG. 1 is a simplified flow diagram illustrating a version of the process.

The waste oil feedstock can contain up to 20% water in an emulsion, and up to 10% naphtha. Free water should be separated at the tank farm. The feed oil can be chemically pre-treated before entering the plant; however, it is usually not required.

The feed oil (100) is filtered (102) and heated to approximately 90 degrees Celsius (103). If necessary, the waste oil feedstock may be filtered again or put through a decanter to remove as much solids (112) as possible before entering the dewatering unit. The feed oil is sprayed into a pre-flash drum (104) where a pool of oil is kept hot by means of a re-boiler heater (105). The water and naphtha in the feed oil are evaporated and exit the flash drum from the top of the vessel. The water and naphtha are cooled and condensed (106) and the water (107), naphtha (108), and possibly the gas (109) are separated and pumped to the tank farm and/or are used as fuel on site. The de-watering system can operate at pressures up to 100 kPa gauge, preferably at pressures up to 90 kPa gauge, and with hot oil temperatures up to about 360 degrees Celsius.

The hot and dry oil from the flash drum is heated (110), either through heat exchange, by direct contact with a hotter stream and/or put into a vacuum column. It is then routed to the reactor. A gas stream (111), representing between 0.1% wt. and 15% wt. of the reactor feed stream, is introduced into the dry waste oil feed stream to the reactor. When used lubricating oils are processed, and the gas used is steam, the steam injection rate should be around 4% wt. on dry feed.

The sweep gas stream is any non-reactive, or a substantially non-reactive, gas that is introduced with the reactor feed stream, or via another injection nozzle, into the reactor via a separate nozzle. Examples of sweep gas streams include water steam, nitrogen and reaction non-condensable gas at normal conditions of atmospheric pressure and 15 degrees Celsius. By performing the process according to the present invention it has been surprisingly found that the sweep gas stream may additionally also serve a variety of functions such as, but not limited to, the following functions:

when injected into the reactor feed line, the sweep gas changes the density of the total feed stream; it changes the flow regimes within the feed line and/or nozzles, which results in lower incidence of fouling and plugging of the piping and spray nozzles, and in improved spray patterns; further, the sweep gas favours atomization of the oil stream before the oil reaches the reaction sites on the hot plates, and/or if introduced into the liquid feed at temperatures above that of the hydrocarbon liquid stream, it will increase the feed stream temperature and reduce the energy, or heat, provided by the kiln, and/or it reduces the oil's residence time in the reactor, by sweeping the hydrocarbon vapours out of the reactor soon after they are formed, thereby reducing the incidence of secondary reactions, or over-cracking, resulting in higher liquid yields and more stable liquid product oils, and/or the sweep gas present in the reactor reduces the liquid oil's partial pressure, and favours the vaporization of the lighter oil fractions, such as the gasoil and naphtha, in the feed and products; this also reduces over cracking in the gasoil fraction and increases the stability of the hydrocarbon liquid products, and/or the sweep gas helps to stabilize the pressure in the reactor, and/or the sweep gas helps to keep the velocity of the vapours exiting the reactor stable, improving the solids-vapour separation efficiency in downstream equipment;

when steam or nitrogen are used, the sweep gas reduces the risk of fires in the event of a leak in the reactor or in the downstream equipment; it will disperse the oil escaping and, hopefully, keep the oil from igniting, even if it is above its auto-ignition point, and/or it can also be part of the stripping gas stream in the product distillation unit.

The combined oil and gas stream is introduced into the reactor through one or more spray nozzles (114) within the rotating kiln (113) as described in the Canadian Patent Application 2,704,186. The kiln rotates within a combustion chamber (115) which is fired by temperature controlled burners (116). The rotating kiln has internals and is kept at the desired temperature such that the vaporization and thermal cracking of the feed oil takes place before the liquid can reach the kiln wall.

The thermal process produces hydrocarbon vapours and small solid particles that contain most of the sulphur, all of the excess carbon, some of the halides and almost all of the metals that were in the feed oil.

The reactor operates at a positive pressure up to 100 KPa(g). The kiln operating temperature is determined by the quality and quantity of the reactor feedstock, and by the quality and quantity of the desired products, and by the reactor volume or residence time available. It can vary between 380 degrees Celsius and 4600 degrees Celsius for used lubricating oils feeds, and up to 550 degrees Celsius, when bitumen or heavy oils are treated.

The hydrocarbon vapours and the coke particles exit the reactor and enter a box and/or cyclone (117) separators where the solid particles are removed from the hydrocarbon vapours. In a preferred mode, the vapour-solids separators are in a heated chamber (118) or heat traced to prevent dew point condensation and plugging of the equipment. The coke (131) and other solids drop by centrifugal force and gravity; they are cooled (130) and sent to storage. Normally, the coke and other solids exiting the reactor are non-leachable.

The hydrocarbon vapours enter a flash drum (119) and self-refluxing condenser, or scrubbing tower (120) assembly, where the remaining coke is removed. The heavy oil from the bottom of the flash drum (129) can be mixed with the distillation column bottoms and/or recycled to the reactor feed and/or used as back flushing oil and/or sent to storage and sold. The vapours from the reactor are partially cooled (132) and enter the product separation unit (121). The vapours exiting the top of the main distillation column are cooled (122) and are separated in a three phase accumulator to yield the product gas (123), naphtha (124) and water (125).

The water is sent to storage or to the water treatment unit. After treatment, it can be re-used in the steam generation unit. Some of the naphtha is used as reflux to the main distillation column, the rest is sent to storage. It may be used as fuel in the plant. The gas is consumed on site as fuel in the plant.

The diesel fraction (127) is pulled as a side cut, possibly through a stripper, cooled (126) and sent to storage.

The column bottoms or heavy product (128) can either be recycled to the cracking vessel, or cooled and sold as de-metalized, low sulphur, heavy fuel oil. When heated the heavy oil is very effective as backwash oil in the plant. It permits on-stream cleaning of fouled equipment and minimises the need for chemical pre-treatment of used oil feeds.

Preferred Embodiments of the Invention

The invention is that of the a process using an indirectly fired rotating kiln (1), represented on FIGS. 1 and 2, having preferably the following dimensions 8' by 20' containing a charge of 1100 metal plates (2) that are lifted, by one or more narrow shelves (3) as the reactor rotates at a speed comprised between 0.5 and 10 rpm. The size of the kiln and the amount and shape of the plates depend on the feed oil and the desired products. The shelves are wide enough to hold two plates: one against the wall, and a second one against the first plate. The plates are flat pieces of metal of regular shapes. The heat (5) coming through the reactor wall heats the plates as they are dragged and lifted against the reactor wall by one or more narrow shelves. As the rotation continues, the plates fall off the shelves or off the plates below them, and flip as they fall, presenting the hot surface to the oil jet (4) projected unto the plates (5) by a Nozzle preferably spraying the oil in a rectangular pattern.

The plates carry the heat from the reactor walls and provide a hot surface where the reactions take place. The plates are lifted and kept against the reactor walls by shelves (3). Depending on the thickness of the plates, the shelves can be designed to hold one, two or more rows of plates. As the kiln rotates, the plates fall off the shelves or off the plates below, presenting the face that was against the reactor wall to the oil spray.

As they slide over each other, the metal plates become a surface that protects the reactor walls from direct contact with the relatively cold oil spray and from the resulting failure due to the thermal shock. Also, as they slide down the reactor, the plates scrape the reactor walls and each other clean of coke and avoid bridging of the depositing coke. The coke released is entrained out of the reactor with the hydrocarbon gas or is removed by the scoops, hopper and solids exit.

Figure 4:
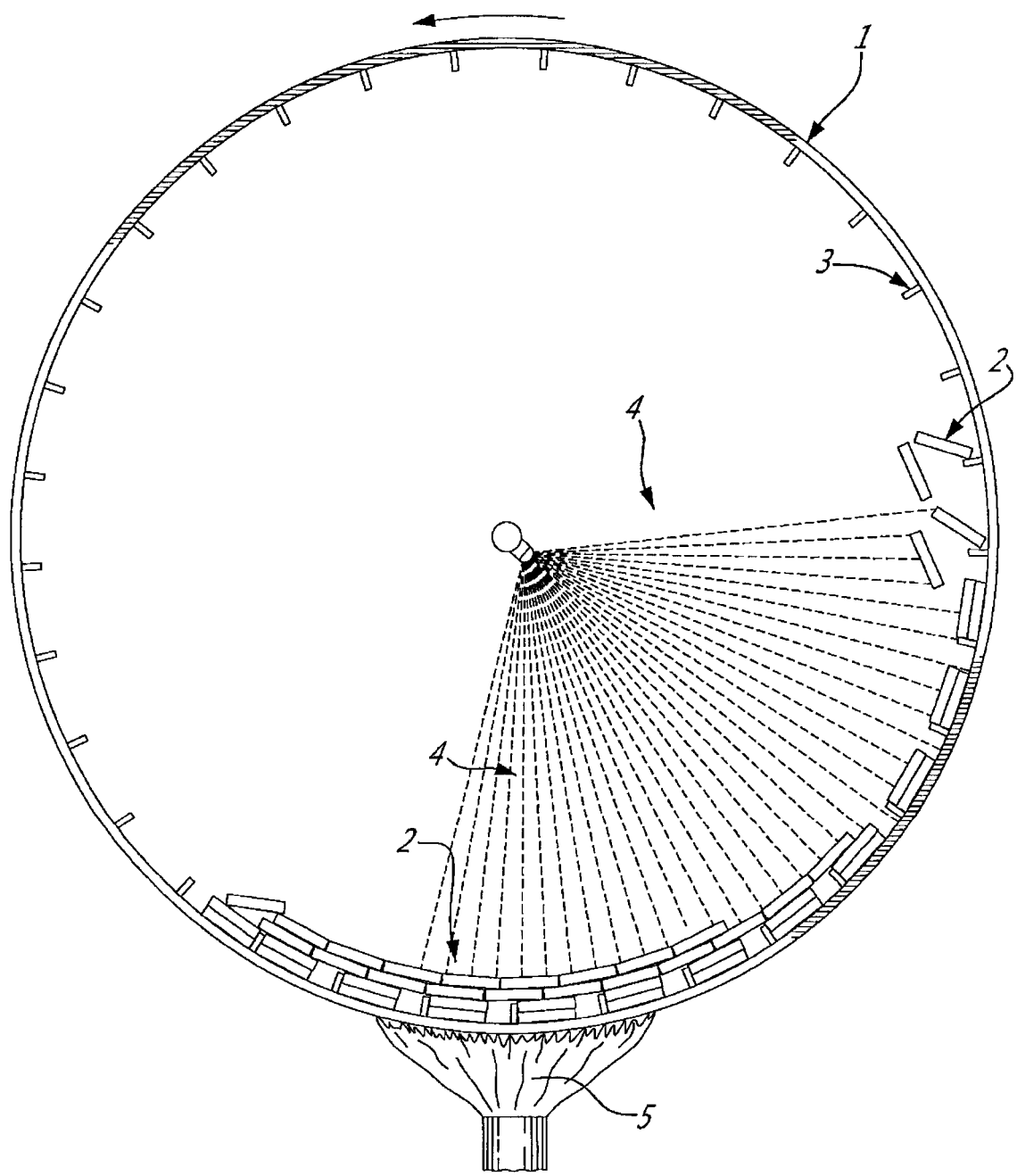
FIG. 4 represents a cross section, according to a plan perpendicular to the horizontal axis, of a reactor and the charge of metal plates and the shelves tacked on the kiln walls of a reactor according to a first embodiment of the present invention wherein the reactor cross section has 34 shelves. In this example, the shelves are spaced to allow for only two rows of plates per shelf, one layer against the reactor wall, the other against the first row.

The shelves are attached to the reactor walls with clamps (6), represented on FIGS. 4 and 5, to reduce stress due to the differential thermal expansion between the reactor walls and the shelves. The clamps are spaced in such a way that, even at the hottest reactor temperature, the shelves are strong enough to support the hot plates on them. Depending on the spacing between the shelves, there may be only one double row of plates per shelf or several rows one on top of each other. Both the plates and shelves increase the heat transfer area from the heat source to the reaction site.

The clamps (6) are shaped like a T as represented in FIGS. 4 and 5. The base of the T (7) is welded to the rotating kiln walls. The cross bar or top of the T (8) is U shaped to receive the shelve (3) ends, leaving room for the thermal expansion of the shelves, both longitudinally and perpendicular to the reactor wall. Bolts (9) close off the U brackets and keep the shelves from falling out of the brackets. The branches of top of the T (6) are wide enough to allow for the thermal expansion of the shelves within them, while providing strength and support for the load of 1, 2 or more layers of the metal plates along the full length of the shelves in the reactor, and as many rows as the spacing between the shelves will accommodate.

Scoops (10) are attached to the kiln wall at the exit end of the kiln to remove heavier coke that may have deposited on the bottom of the kiln. The scoops are pipe sections with one end closed, and the other end cut on a slant, to allow any hydrocarbon vapours to escape before the coke falls into the hopper (11). The scoops are sized small enough so that the metal plates cannot enter with the coke. As the reactor rotates, the scoops turn upside down and dump their load of coke into a hopper mounted on the solids exit tube (12). To ensure that none of the plates block the coke exit from the reactor, the hopper has a metal grid (13) that will deflect any plate towards the bottom of the kiln. The solids exit tube (12) has a screw conveyor (15) to push the coke out of the reactor. The solids exit tube can be above the vapour exit tube (14), within the vapour exit tube, below the vapour exit, or even at separate ends. There must be at least two exits from the kiln to ensure that the reactor exit is never obstructed. In normal operation, the coke will exit the reactor mostly through the vapour exit (14). The scoops are required when the feed to the kiln is interrupted and there is no vapour to carry the coke out, or when there is a surplus of coke, or the coke is wet with oil or heavy.

The reactor is an indirectly fired rotating kiln, heated by the burner (5), and containing a charge of metal plates that carry the heat from the reactor walls and provide a hot surface where the reactions take place. The plates are lifted and kept against the reactor walls by one or more shelves, wide enough to hold two plates. As the kiln rotates, the plates fall off the shelves, presenting the face that was against the reactor wall to the oil spray. The metal plates protect the reactor walls from thermal shock, and scrape the walls and each other clean of coke. The shelves are attached to the reactor walls with clamps to reduce stress due to differential thermal expansion between the reactor walls and the shelves. Both the plates and shelves increase the heat transfer area from the heat source to the reaction site.

In the test apparatus, used lubricating oils or other oils from a collection depot are sprayed into a horizontal or slanted rotating kiln 10' in diameter and 8' long in order to thermally crack and vaporize the oil or the chemicals within it. The kiln has 4" fins welded in continuous spirals, 8" apart, to the inside of the kiln walls. A 1" wide shelf is attached to the fins, and a charge of 4" equilateral triangular metal plates is added.

As the kiln rotates, the shelf pushes and raises the blades along the reactor wall. As they reach just past the 5' height, they flip as they fall at the top of their run, presenting their hot side to the oil being sprayed on them.

Upon contact with the hot plates, the oil is thermally cracked and/or vaporized. The coke formed is either entrained with the vapours out of the kiln or it deposits on the plates. The plates, sliding against the reactor wall or on each other, scrape the coke free, and it is entrained out of the reactor with the vapours. Most of the coke exits the reactor with the hydrocarbon vapours; the residual coke is removed by the scoops, hopper and solids exit.

Four scoops are welded to the reactor wall at the exit end. They are made from 4" piping, 6" long, with one end plugged, and the other end cut on a slant. A hopper protected by a metal cage above it, receives the coke dumped by the scoops. The cage deflects any scooped up plate back into the reactor. The hopper receives the coke and drops it into the coke exit tube. A screw conveyor, on the bottom of the coke exit tube, carries the coke out of the reactor.

When the reactor feed is used lubricating oil, the recovered gas is 5% weight of the feed and has an average molecular weight of 42, the recovered liquid is 92% weight of the feed and has an average specific gravity of 0.83 and the solids are 3% weight of the feed and have a specific gravity of 1.7. These numbers depend on the feedstock composition, and on the reaction temperatures and pressures.

FIGS. 10, 12, 13 and 14 are illustrations of the apparatus adapted for different feedstocks.

Figure 10:
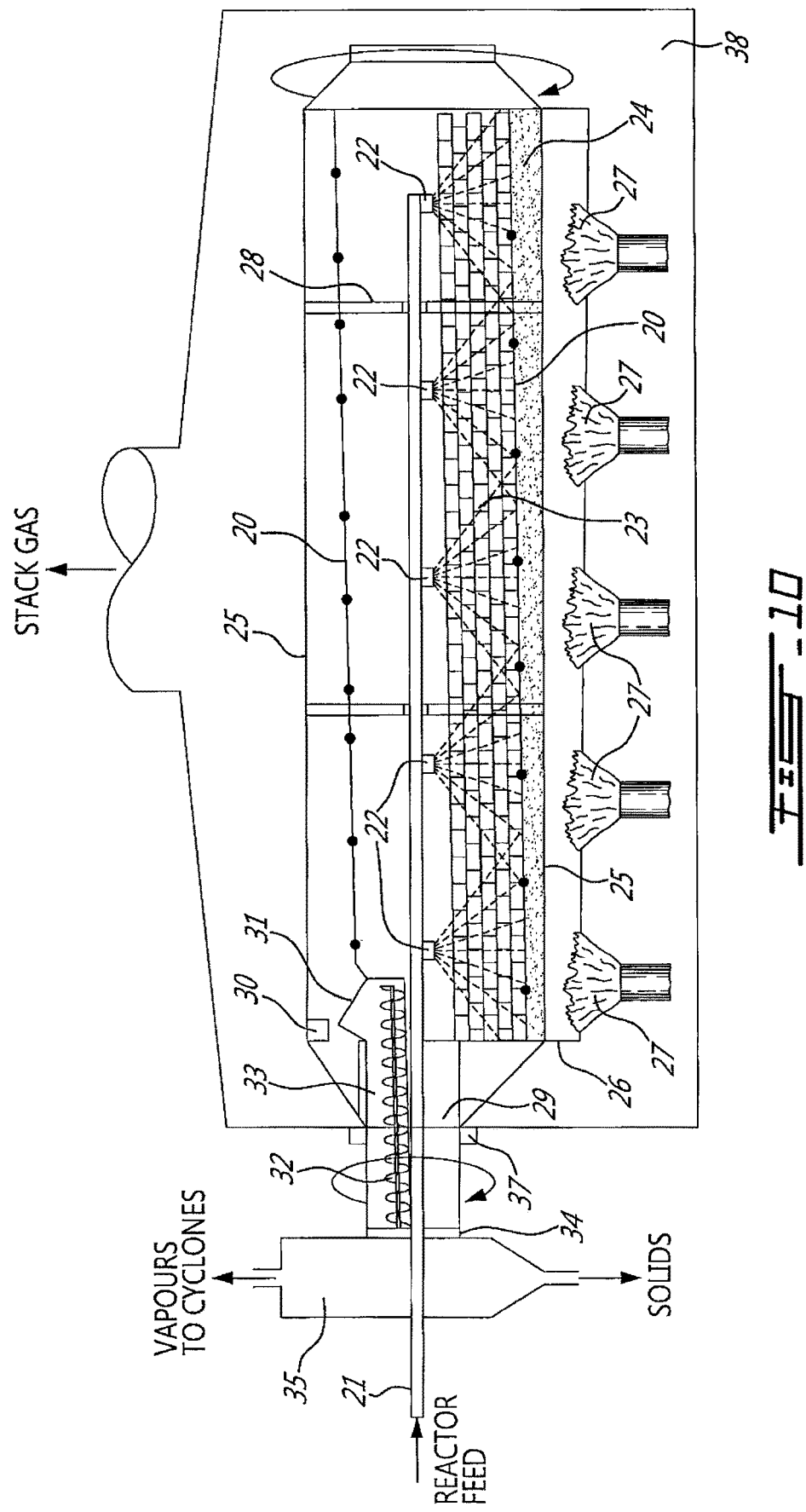
FIG. 10 is a cross section of a reactor, according to an embodiment of the invention, in the horizontal position and wherein the feeding of the material to be treated and the exit of the vapours and the solids produced are both on the left side of the reactor.

FIG. 10 shows a vertical cross section of a reactor in the horizontal position. The reactor actually has four shelves, but only two are shown here (20). The other two shelves would be on the section not shown. The feed enters the reactor in pipe 21, and is projected unto the hot plates (23) by spray nozzles (22). A possible feed for this reactor would be an organic liquid such as waste oils.

The plates are lifted from the plate bed (24) by the shelves (20). In this illustration, the reactor (25) is supported by two horizontal cylinders (26) and is heated externally with gas or naphtha burners (27). The reactor rotates inside a heating chamber, which is stationary (38). There are various options for the heating chamber. It could be a section of a hot stack, where the stack gas needs to be cooled before clean-up, for example. A seal (37) is shown around the rotating kiln and the stationary wall of the heating chamber. It is useful to keep the feed pipe in place with support rings (28), as illustrated on FIG. 8. The gas and entrained coke leave the reactor through the gas exit pipe (29). Accumulated solid coke is scooped up by shovels (30), is dumped into a hopper (31), and is carried out of the reactor with the help of a screw conveyor (32) inside the solids exit pipe (33). There is a seal (34) between the rotating reactor and the product exit box (35). The product exit box is stationary. A first separation of solids and vapours occurs in the product exit box (35).

Figure 11:
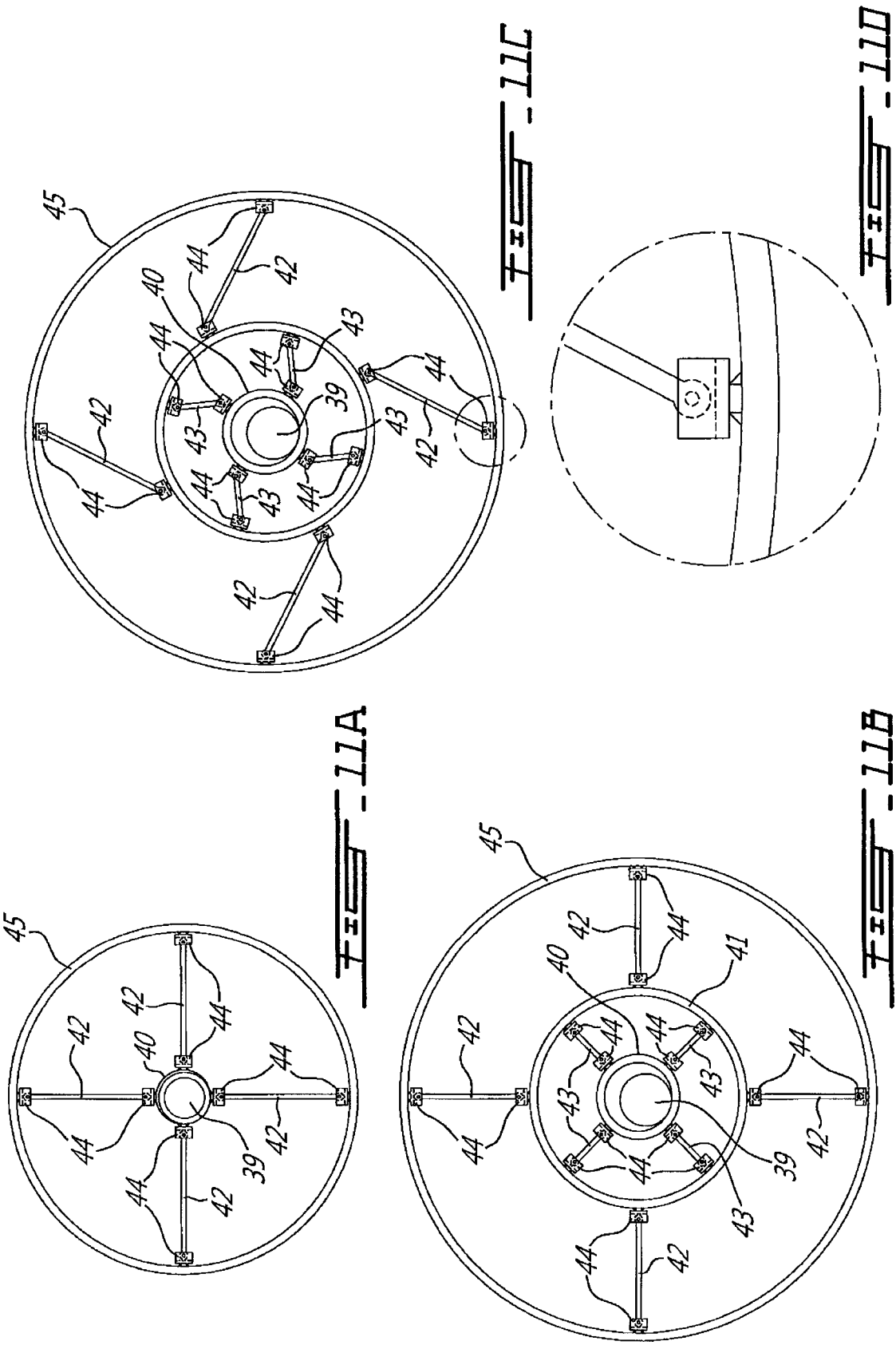
FIG. 11A is a cross view of a first embodiment of the center ring supports for the feed line inside a cylindrical reactor of the invention, when the reactor is cool.
FIG. 11B is a cross view of a second embodiment of the center ring supports for the feed line inside a cylindrical reactor of the invention, when the reactor is cool.
FIG. 11C is a cross view of a third embodiment of the center ring supports for the feed line inside a cylindrical reactor of the invention, when the reactor is heated.
FIG. 11D is a detailed perspective view of the attachments means of the invention that allows the support beams to expand and rotate at their junctions points with the reactor walls and rings, when the reactor is heated.
Figure 16:
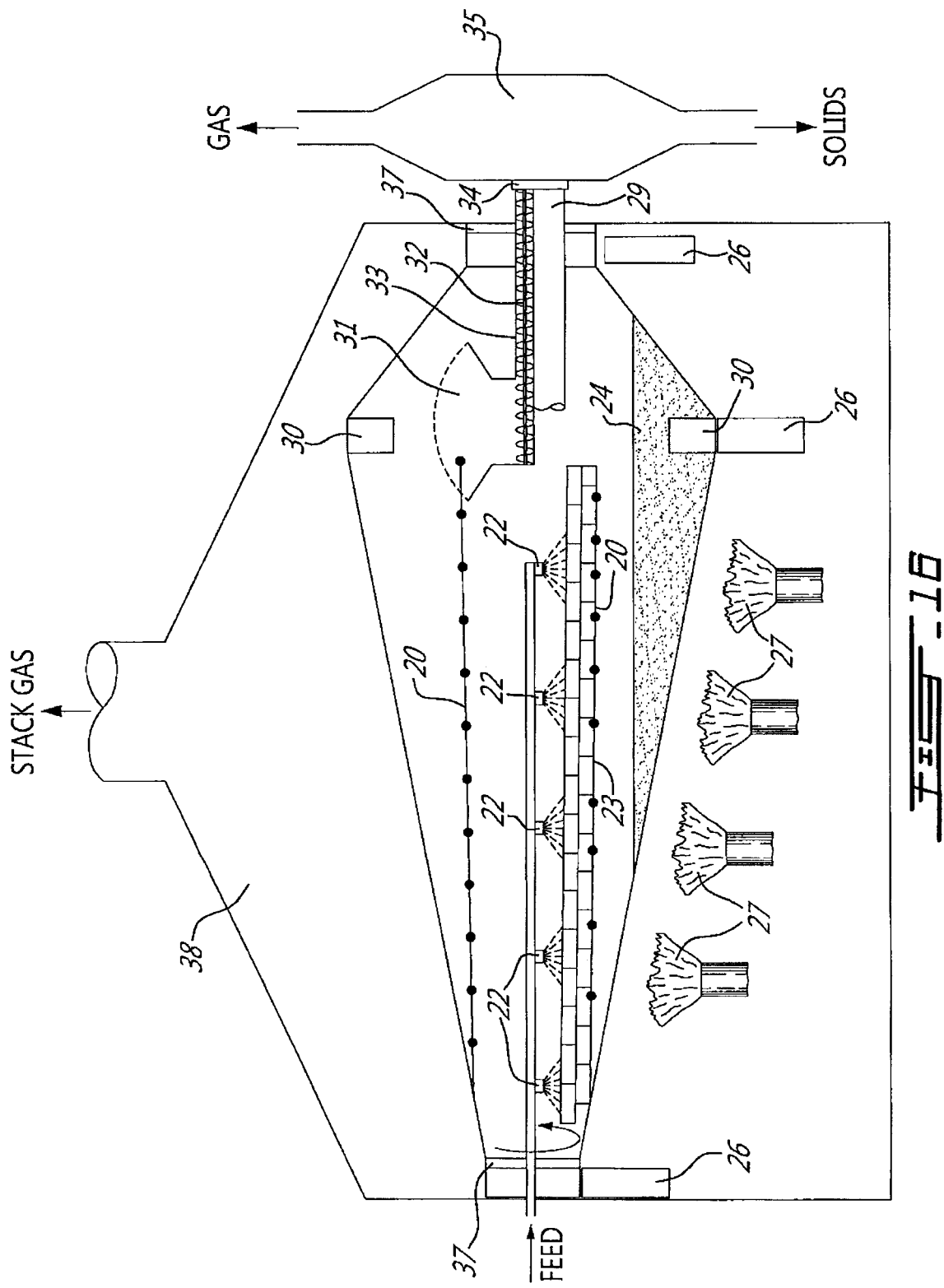
FIG. 16 is a vertical cross section of a reactor of the invention made up of two cones joined at the base.
Figure 17:
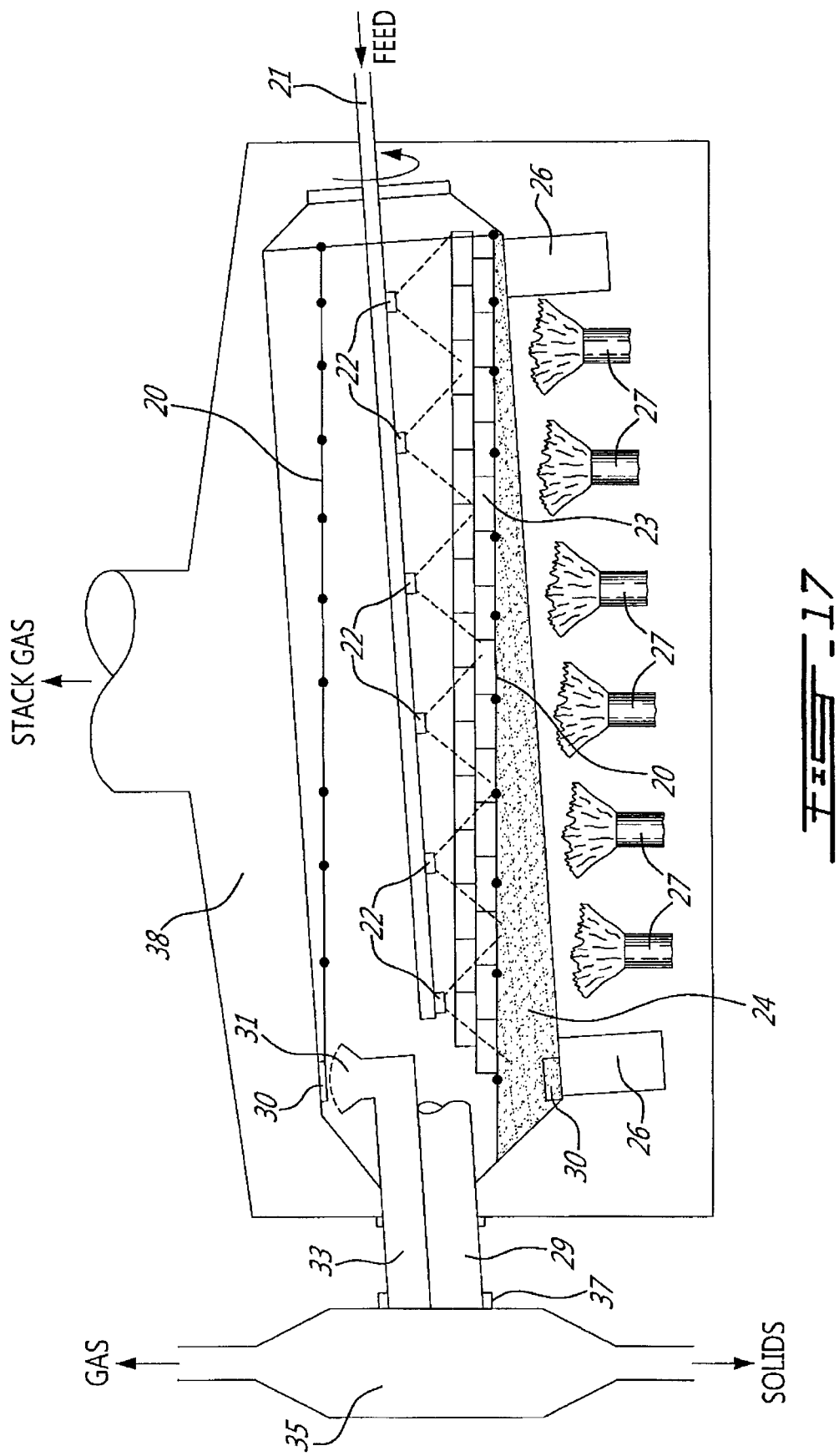
FIG. 17 is a vertical cross section of a reactor of the invention in a slanted position with a configuration particularly suited for treating heavy oils feedstocks that may produce more solids or more cokes or contain sand/or contaminated soils.
Figure 18:
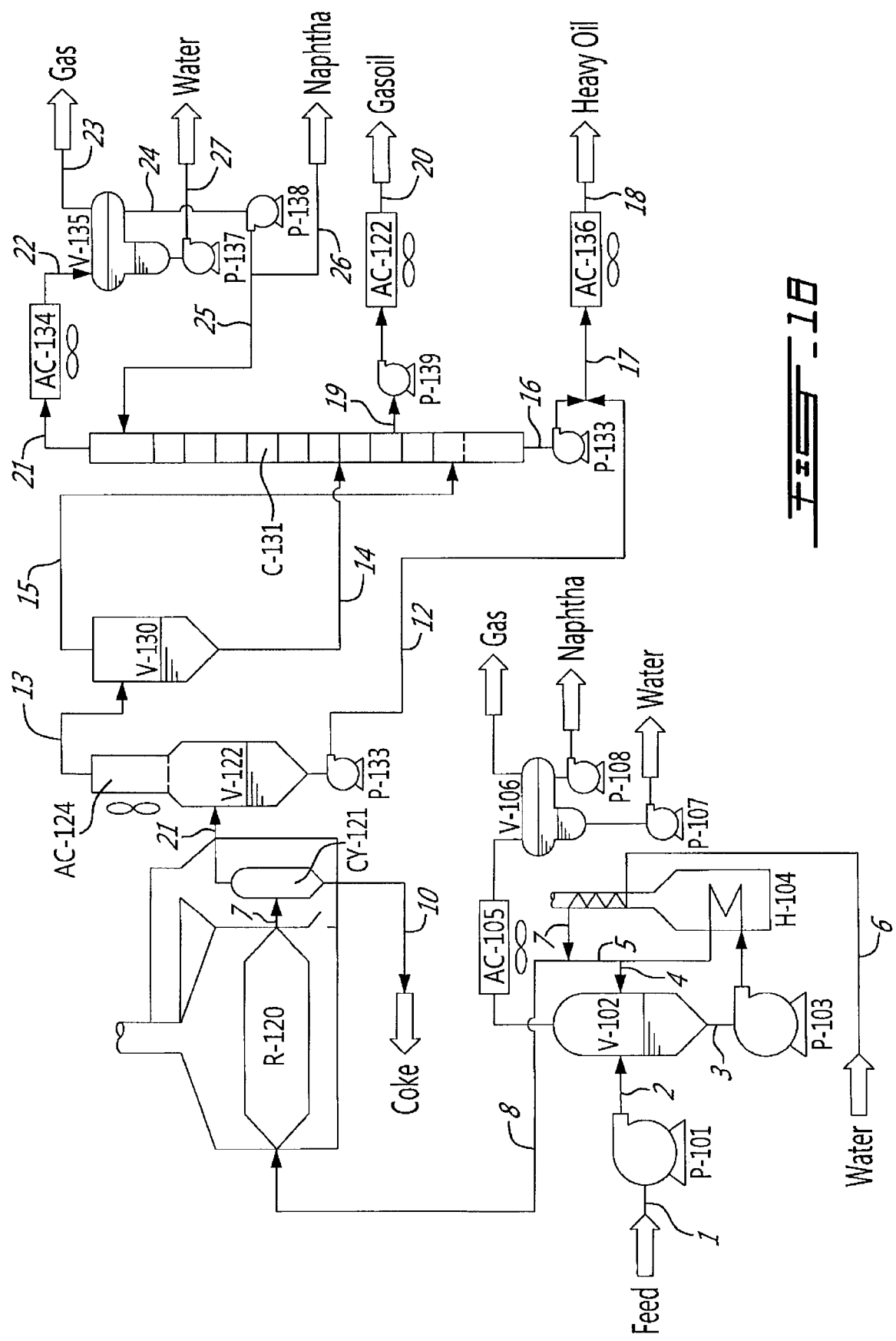
FIG. 18 is a simplified flow diagram illustrating a version of the process according to the present invention in the case of the mobile plant.

FIGS. 11A and 11B are two cases of center ring supports for the feed line (39), shown when the reactor is cool. FIG. 11C is the support rings in FIG. 11B when the reactor is hot. Figure A is for a smaller reactor radius with only one centre ring (40). FIG. 11B is for a larger reactor radius, for which two centre rings (40) and (41) are required to avoid deforming the support legs (42). In FIGS. 16 and 17, in respect of feet 26, there are two sets of support legs: The first (42) hold the larger centre ring (41) in place. The second set of support legs hold the smaller centre ring (40) in place. The smaller centre ring supports the reactor feed pipe (39). The support legs (42) and (43) are attached to the reactor wall (45) and/or centre rings with brackets (44) that permit and/or allow the support beams to expand and rotate at their junction points with the reactor walls and rings.

Figure 12:
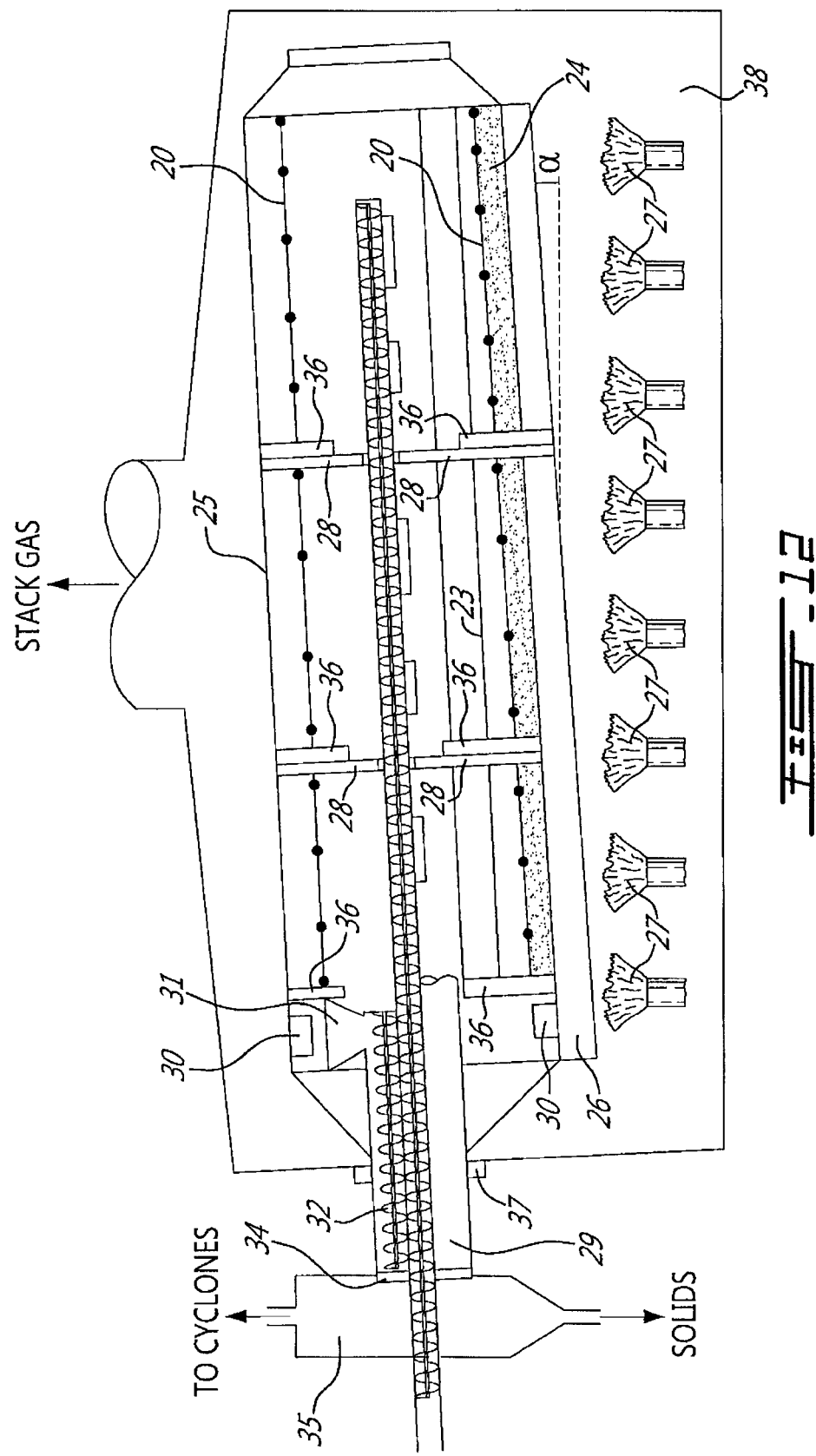
FIG. 12 is vertical cross section of reactor according to an embodiment of the invention in a slanted position.

FIG. 12 shows a vertical cross section of a reactor in the slanted position, about 5° from the horizontal in this illustration. This reactor would be used for feedstocks that contain solids such as sand. The reactor actually has four shelves, but only two are shown here (20). The other two shelves would be on the section not shown. The feed enters the reactor in pipe 21; it is pushed along the feed line with a screw conveyor and is projected unto the hot plates (23) by nozzles, holes and/or slits (22). The plates (23) are rectangular and are about as long as the reactor section where they are installed. The plates are lifted from the plate bed (24) by the shelves (20). In this illustration, the reactor (25) is supported by two slanted cylinders (26) and is heated externally with gas or naphtha burners (27). The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, through the screen (36), and are scooped up by the scoops (30). Accumulated solids are scooped up, along with residual coke, by shovels (30), are dumped into a hopper (31), and are carried out of the reactor with the help of a screw conveyor (32) inside the solids exit pipe (33). There is a seal (34) between the rotating reactor and the product exit box (35). The product exit box is stationary. A first separation of solids and vapours occurs in the product exit box (35).

Figure 9:
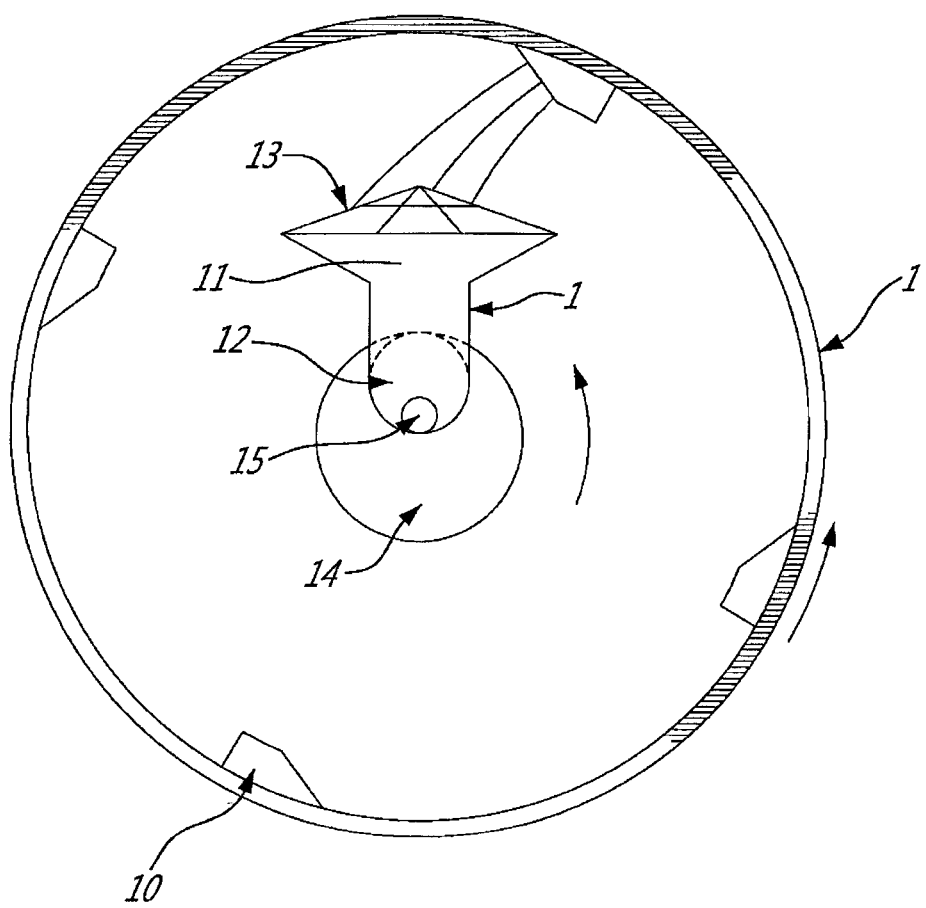
FIG. 9 illustrates an example of the exit end of the kiln represented in FIG. 4 with 4 scoops.
Figure 13B:
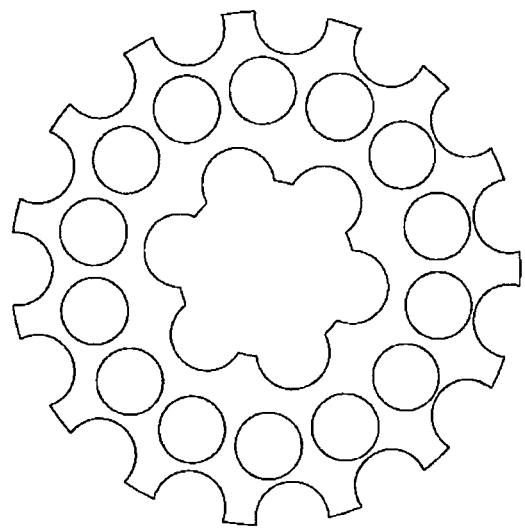
FIG. 13B is a front view of a screen made of a perforated disc.
Figure 13A:
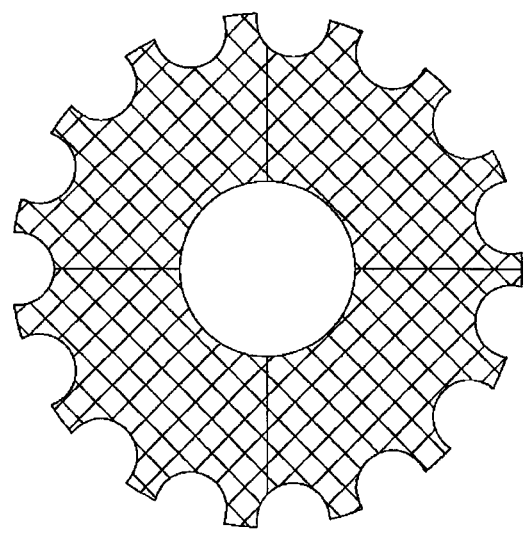
FIG. 13A is a front view of a screen made of wire mesh.

FIG. 13 shows two possible configurations for the screens (36) in FIGS. 7 and 9. FIG. 13A and FIG. 7, is a screen made of wire mesh. FIG. 13B and FIG. 8, is a screen made of a perforated disc. Both screens are tacked on to the reactor wall. Their outer circumferences are scalloped, allowing for different thermal expansions of the reactor walls and the screens with minimal stress on the reactor walls. Both configurations permit both the vapours and the solids to travel practically unimpeded from one end of the reactor to the other. The perforations are calculated so as to avoid movement of the plates from one section to the other. Also, the perforations must be too small for the ends of the plates to enter. The screens will be scraped clean by the plates, as the reactor turns.

Figure 14:
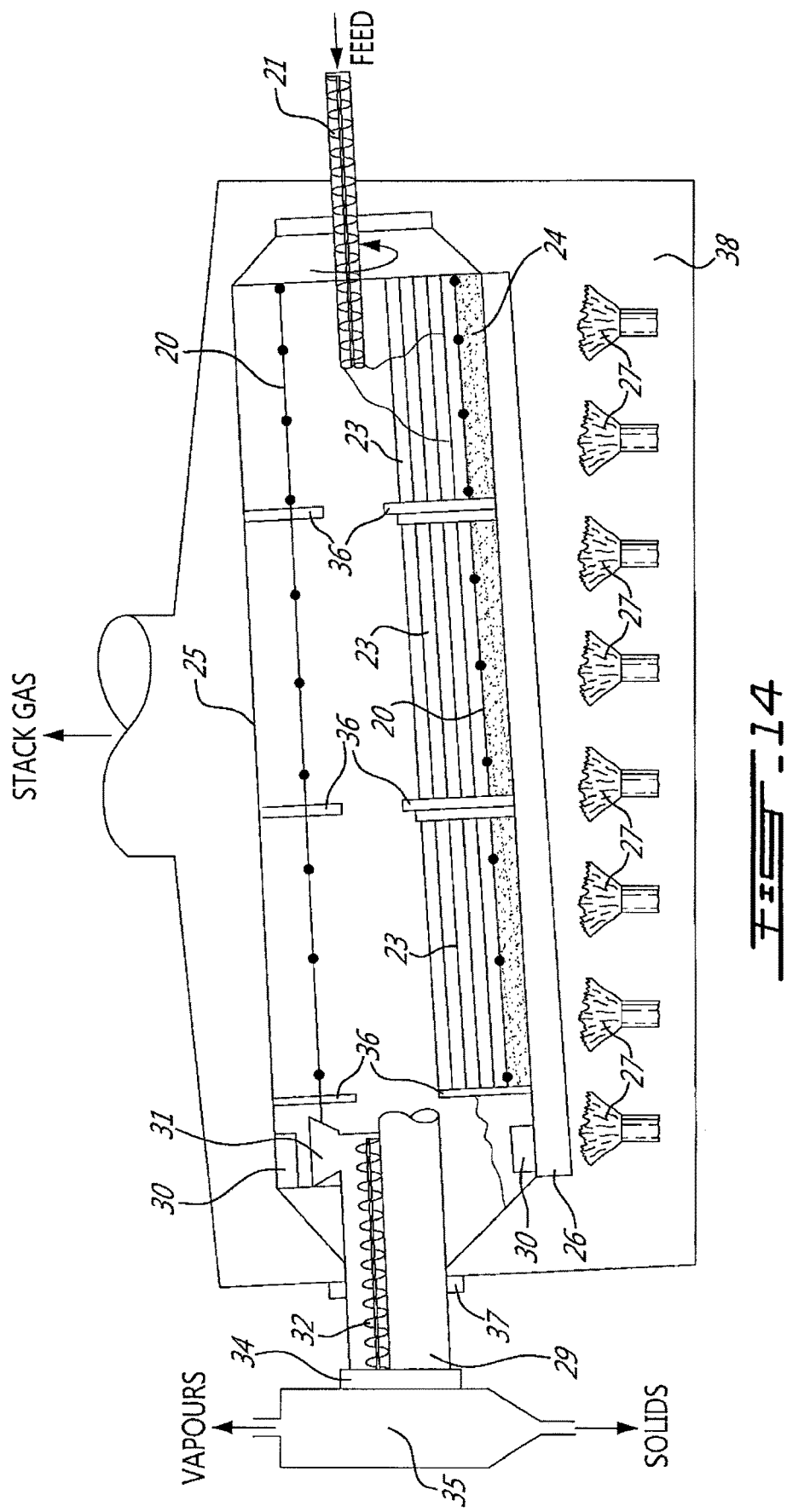
FIG. 14 is a vertical cross section of a reactor according to an embodiment of the invention in a slanted position wherein the feeding of the material to be treated and the exit of the thereby obtained vapours and solids are on opposite side of the reactor.

FIG. 14 is a vertical cross section of a reactor in the slanted position, about 5 o from the horizontal is illustrated here.

This reactor would be used for feedstocks that contain solids such as sand.

The reactor actually has four shelves, but only two are shown here (20). The other two shelves would be on the section not shown. The feed enters the reactor in pipe 21, it is pushed along the feed line with a screw conveyor and is projected unto the hot plates (23) through the end of the pipe or slits in the pipe (22).

The plates (23) are rectangular and are about as long as the reactor section where they are installed when the reactor is heated. The plates are lifted from the plate bed (24) by the shelves (20). In this illustration, the reactor (25) is supported by two slanted cylinders (26) and is heated externally with gas or naphtha burners (27). The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, through the screens (36), and are scooped up by the scoops (30). Accumulated solids are scooped up, along with residual coke, by shovels (30), are dumped into a hopper (31), and are carried out of the reactor with the help of a screw conveyor (32) inside the solids exit pipe (33). There is a seal (34) between the rotating reactor and the product exit box (35).

The product exit box is stationary. A first separation of solids and vapours occurs in the product exit box (35).

FIG. 16 shows a vertical cross section of a reactor made up of two cones joined at the base.

This reactor could be used for liquid feedstocks and/or feedstocks that contain solids such as sand. The reactor actually has four shelves, but only two are shown here (20). The other two shelves would be on the section not shown. The feed enters the reactor in pipe 21, and is projected unto the hot plates (23) through the end of the pipe or spray nozzles (22).

The plates (23) are rectangular and are about as long as the reactor section where they are installed when the reactor is heated. The plates are lifted from the plate bed (24) by the shelves (20). In this illustration, the reactor (25) is supported by two truncated cones and a cylinder (26) and is heated externally with gas or naphtha burners (27). The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, and are scooped up by the scoops (30). Accumulated solids are scooped up, along with residual coke, by shovels (30), are dumped into a hopper (31), and are carried out of the reactor with the help of a screw conveyor (32) inside the solids exit pipe (33).

There is a seal (34) between the rotating reactor and the product exit box (35). The product exit box is stationary. A first separation of solids and vapours occurs in the product exit box (35). This shape of reactor allows the plates to slide back towards the entrance and scrape the walls, other plates and the shelves clean of coke and other deposited solids.

FIG. 17 represents a vertical cross section of a reactor in the slanted position, about 5 o from the horizontal is illustrated here. This reactor would be used for heavy oils feedstocks that may produce more coke or contain sand or contaminated soils.

The reactor actually has four shelves, but only two are shown here (20). The other two shelves would be on the section not shown. The feed enters the reactor in pipe 21, it is either pumped or pushed along the feed line with a screw conveyor and is projected unto the hot plates (23) through spray nozzles or slits in the pipe (22). The plates (23) are rectangular and they not only flip when falling off the shelves, but also slide along the shelves, scraping coke off the shelves and reactor walls.

The plates are lifted from the plate bed (24) by the shelves (20). In this illustration, the reactor (25) is supported by two slanted rollers (26) and is heated externally with gas or naphtha burners (27).

The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, and are scooped up by the scoops (30). Accumulated solids are scooped up, along with residual coke, by shovels (30), are dumped into a hopper (31), and slide out of the reactor through the slanted solids exit pipe (33). There is a seal (34) between the rotating reactor and the product exit box (35). The product exit box is stationary. A first separation of solids and vapours occurs in the product exit box (35).

Advantages of the Use of a Rotating Kiln

In order to understand the advantages of the invention, it may be useful to explain why the invention was necessary and how it progressed.

In the kiln above, at first, the oil was sprayed on a charge of ceramic balls. For the reaction to occur, the kiln had to be over heated because the charge impeded heat transfer to the reaction sites. Furthermore, the ceramic balls were too smooth and light to scrape the coke off the reactor walls. The balls exploded into dust because of the thermal shock between the cold oil and the hot reactor wall. The reactor had to be shut down to remove the coke and ceramic dust that caked the reactor wall and bottom. The reactor runs were less than a day long.

The solids charge was changed to a number of coarse granulated solids charges. They were more effective in scraping the coke off the reactor walls but soon the coke stayed trapped within the charge, again impeding the heat transfer to the reactor sites. The temperature at the reaction site varied as the coke built up within the charge. The run times increased to 3 to 4 days before the reactor had to be shut-down.

The solids charge was replaced by off-spec cultivator blades: equilateral triangles, with 6" sides, made of carbon steel. The blades were effective in keeping the reactor walls clean but the temperature in the reactor continued to vary. A shelf was attached to the reactor wall and the reaction temperature became steady and easier to control, allowing for a specific slate of products of consistent qualities. The reactor walls stayed free of coke and run times increased to 6 weeks or more.

Thermal cracking is an endothermic reaction. Since the oil spray was directed to the hot metals plates, the coke deposited on the metal plates instead of the reactor walls. The blades not only removed the coke that formed on the reactor wall, they protected the reactor wall from coke depositing there in the first place. The shelf pushed the metal plates higher and longer against the reactor wall. The reaction surface area and its temperature could be increased without over firing the kiln.

There was a conveyor to transport the coke from the bottom of the reactor to the exit tube. The conveyor was enclosed, protecting the coke and hydrocarbon vapours from the heat source. This caused the coke to be wetted by the condensing oil, and to agglomerate. This apparatus resulted in the formation of coke-oil plugs that obstructed the exit tube and caused over pressuring of the reactor, failure of the seals, escape of hot oil above its auto-ignition temperature and fires. The enclosed conveyor was replaced with scoops, open to the kiln heat, dumping dry coke into the new coke exit tube. The coke exit tube was separated from the vapour exit to avoid re-entrainment of the fines into the product vapours or plugging of the only exit from the reactor and over-pressurizing the reactor.

Advantages of the Hybrid Process of the Invention

The hybrid process increases the recycling of waste oils and other hydrocarbons in an environmentally friendly way. It includes the recovery of useful and valuable oil products in from the waste feed oils before thermally cracking the rest, containing most of the hazardous components of the feed oil, into useful products. This minimizes the energy needed to treat the waste oils and increases the overall value of the products obtained from the waste oils.

Depending on the feed the separation recovers base oils and/or stable diesel free of most additives and contaminants without the need for pre-treatment as the system is resistant to fouling. The base oils can be used as machine oils or to make lubricant oils. The stable gasoils can be used as fuel.

The lighter portions from the separation which are mostly gas and naphtha are used to provide the energy required by the process.

The rest of the oils and contaminants that cannot be separated are routed to the rotating kiln where they are transformed into diesel and heavy oils by thermal cracking.

This is a simple process that can treat a wide variety of waste oils and make useful and environmentally friendly products.

This process is in energy equilibrium. When used lubricating oils are processed, the produced gas and naphtha are consumed on site, and there is little or no need to purchase fuel, or to use the more valuable wide range diesel or heavy oil products from the plant. There is also no naphtha to dispose of.

When produced in the cracking reactor, the wide range diesel is a light amber colour. The produced diesel is unstable and will darken with time or when exposed to air. The diesel deteriorates much faster, within days instead of months, if there is no inert gas injection into the reactor inlet. Injection of inert gas results in a higher yield of diesel oil (from 78% vol. to 82% vol. of the total liquid product) and lower yield of naphtha (from 10% vol. to 6% vol. of the total liquid product).

Depending on the sulphur content in the feed oil, the sulphur in the diesel produced could be below the 0.1% wt., now specified in Europe for home heating oil.

The heavy oil is a low sulphur fuel. It can be sold as bunker fuel, or as specialty oil. It is also used as backwash oil in the process plant. Plants that process waste oils face constant fouling of their equipment. Used lubricating oil re-refining facilities usually pre-treat their feedstock with chemicals to remove as much of the metals and solids from their feedstock as possible. They have to test each truck load entering the plant and must add the purchase of chemicals and the disposal of spent chemicals to their operating costs. Thermal cracking units that treat used lube oils are usually much smaller than re-refiners. They have frequent shutdowns to remove coke deposits and clean heat exchangers. In this process, heat exchangers can be cleaned while the plant is on stream using the backwash oil on site. The solids exit the plant with the coke.

The sulphur and metals, released in the cracking reactions, are mostly attached to the coke when exiting the reactor. The coke is removed from the vapour oil stream as it leaves the reactor. Therefore the sulphur and metals are not present when the oil is condensed into liquid fuels. This is why the oil products leaving the plant are low in sulphur and metals, when compared to products from other used oil thermal cracking facilities. The metals in the coke are thought to act as catalysts in the deterioration of the oil products. The diesel oil produced with this process is more stables than oils produced in other thermal cracking units. The coke is non-leachable and can be disposed of in landfills. It can also be blended in asphalts or cements as a water-repelling additive.

This is a dry process: there is no liquid level in the reactor. The reactor temperature is not limited to the boiling point of the oil feed. This process can treat a much wider variety of waste oils than the conventional thermal cracking units. As an example: synthetic oils are increasingly used as base oils. They are more stable than conventional base oils and do not need to be changed as often to keep engines in good running order. Less oil changes mean less feedstock to used lube oil plants and the feedstock they get contains more contaminants. In a conventional plant, since the reactor temperature is limited to the boiling point of the oil, the more stable oil will require a longer residence time to crack, which limits the plant throughput and profitability.

The process is very flexible. Since the reactor temperature can be changed to suit, this process can be used to treat waste oils that are not necessarily used lubricating oils such as refinery tank bottoms. It can also treat oils that have a high propensity to form coke such as bitumen or marpol.

The reactor in the process is under pressure which results in a more stable operation, and consistent product quality and quantity. A rotating kiln under positive pressure is safer because there will be no oxygen ingress into the reactor, which, if left undetected, could result in an explosion. In the event of a leak, oily vapours would exit into the firebox and would burn in an environment designed to contain flames.

One of the safety features of this process is that there is no vessel containing large amounts of oil in this process. Residence times are low. The only vessel that might contain large amounts of oil is the dewatering flash drum. It is under a steam atmosphere. In an emergency the equipment can be drained within minutes, and steam or another inert gas, is already present in the reaction and product separation units.

In summary some of the advantages of the new thermal processing apparatus include:
  a steady and controllable reaction temperature;
  a specified product slate of consistent quality;
  a protection of the reactor wall from stress and failure due to thermal shock or hot spots;
  preventing coke from depositing and sticking on the reactor walls and internals;
  longer run times, shorter shut-downs, less maintenance cost;
  safer operation;
  no by-products to dispose of in industrial landfills;
  less need for the purchase of chemicals and disposal of spent chemicals;
  a steady and controllable reaction pressure, and
  minimizing of the thermal stress on the reactor walls and/or on the internals.

This waste oil thermal cracking process has many advantages over other waste oil cracking or reuse processes:
  it is simple and easy to operate;
  it is flexible and can treat a wide variety of waste oils, not just used lubricating oils from service stations and the like;
  it allows for the recovery and recycling of lubricating oil from used lube oils, and for the recovery and recycling of wide range diesel fuel from other waste oils;
  it is more energy efficient than other thermal cracking units;
  it does not require a hydrotreating product finishing step for its products;
  about 99% of the metals and 75% of the sulphur, present in waste oil, exit the process with the non-leachable coke before the vapours exiting the reactor are condensed. These sulphur and metals do not enter into the finished oil products;
  all the products from this process are safe and can be sold in current markets. There is no product or by-product to dispose of in incinerators or industrial waste dumps;
  the heavy oil produced can be used to back-flush and clean heat exchangers and other equipment on site. There is no need to pre-treat the waste oil feedstock to prevent equipment fouling. Therefore, the laboratory analyses and chemicals required by the waste oil feed pre-treating unit are not needed, neither is their spent chemicals disposal;
  the products do not need to meet the stringent specifications of lubricating oil base stocks. This eliminates the need for careful selection of feedstocks, leaving most waste oils to be disposed of into the environment;
  the additives in the waste oil feedstocks are destroyed and about 99% of the metals and 75% of the sulphur, present in waste oil, exit the process with the non-leachable coke before the vapours exiting the reactor are condensed. There is no need to dispose of the heavy oil fraction, containing most of the metals and sulphur; and
  it is viable in smaller plants, with a smaller collection radius and does not need to be subsidized by governments.

Some embodiments of the invention may have only one of these advantages; some embodiments may several advantages and may have all of simultaneously.

| Number | Name | Comments |
| --- | --- | --- |
| AC-105 | Flash drum vapour dephlegmator | |
| AC-124 | Reactor product dephlegmator | |
| AC-132 | Gasoil cooler | |
| AC-134 | Distillation column overhead cooler | |
| AC-136 | Heavy oil cooler | |
| C-131 | Product distillation column | |
| Cy-121 | Reactor product cyclone | |
| E-109 | Coke to storage conveyor and cooler | |
| H-104 | Flash drum bottoms heater | Also reactor feed heater and boiler |
| P-101 | Oil feed pump to unit | |
| P-103 | Flash drum bottoms circulating pump | Also Reactor feed pump |
| P-107 | Water to storage pump | |
| P-108 | Naphtha to storage pump | |
| P-110 | Vacuum pump | |
| P-123 | Product heavy oil to storage pump | |
| P-133 | Distillation column bottoms to storage pump | |
| P-137 | Water to storage pump | |
| P-138 | Naphtha to storage or to fuel | |
| P-139 | Gasoil to storage | |
| R-120 | Rotating kiln reactor | |
| V-102 | Feed flash drum | |
| V-106 | Flash drum overhead accumulator | 3 phase accumulator |
| V-122 | Product flash drum | |
| V-130 | Distillation column pre-flash vessel | |
| V-135 | Distillation column overhead accumulator | 3 phase accumulator |

Although the present invention has been described with the aid of specific embodiments, it should be understood that several variations and modifications may be grafted onto said embodiments and that the present invention encompasses such modifications, usages or adaptations of the present invention that will become known or conventional within the field of activity to which the present invention pertains, and which may be applied to the essential elements mentioned above.

The invention claimed is:

1. A continuous thermal process for reclaiming useful products from a waste oil comprising solids, contaminants, and/or additives, the process comprising:
  performing thermal separation on the waste oil in a flash drum by heating the waste oil to a temperature below the cracking temperature of the waste oil and at a pressure below atmospheric pressure, comprised between 0.05 and 0.95 atmosphere, to obtain a first heavy oil vapor fraction and a second light oil gaseous fraction, said second light oil gaseous fraction having, in comparison with the waste oil, a lower content in solids, contaminants, and/or additives that are different from water and from inert gas;

condensing the first heavy oil vapor fraction that exits the flash drum on a cooler surface of a dephlegmator and/or of a self-refluxing condenser directly mounted on the flash drum to provide a condensed liquid that falls back directly into the bottom part of the flash drum, while the second light oil gaseous fraction passes through the dephlegmator and/or of a self-refluxing condenser directly mounted on the flash drum;

separating the second light oil gaseous fraction into a water phase, an oil phase, and gas phase;

adding at least one inert gas or at least one component that may become an inert gas by heating in the waste oil and/or in the flash drum, optionally in an amount that represents 1 to 15% weight of the waste oil;

recovering a first heavy oil liquid fraction at the bottom of the flash drum; and submitting the first heavy oil liquid fraction to a cracking treatment.

2. The thermal process of claim 1, wherein the first heavy oil liquid fraction recovered at the bottom of the flash drum is thermally cracked in a rotating kiln and solids with high hydrocarbon and/or organic chemical content are added in the first heavy oil liquid fraction before being thermally cracked in the rotating kiln.

3. The thermal process according to claim 2, wherein the added solids with high hydrocarbon and/or organic chemical content are waste materials and are mixed in the waste oil, optionally by dissolving them in the heated waste oil.

4. The thermal process according to claim 3, wherein the added solids are soluble in the waste oil, contribute little to plugging of process equipment, and are destroyed, cracked and/or vaporized in the flash drum.

5. The thermal process according to claim 2, wherein the added solids are introduced into the flash drum or mixed with the waste oil to the flash drum, or as a second feedstock directly into the rotating kiln, and are destroyed or vaporized in the rotating kiln.

6. The thermal process according to claim 2, wherein the added solids are in a proportion representing in weight up to 70% of the waste oil.

7. The thermal process according to claim 2, wherein the solids are added to the waste oil at a temperature ranging from 10 degrees Celsius to 450 degrees Celsius, optionally wherein the waste oil is preheated before the addition of the solids at a temperature sufficient to rapidly dissolve the majority of the added solids.

8. The thermal process according to claim 7, wherein the added solids are PVC and the waste oil is preheated at a temperature comprised between 20 degrees Celsius and 390 degrees Celsius.

9. The thermal process according to claim 2, wherein the addition of the solids to the waste oil is performed before feeding in the rotating kiln or after a pre-treatment of the waste oil, optionally wherein said pre-treatment of the waste oil extracts a lubricating part of the waste oil.

10. The thermal process according to claim 9, wherein the added solids are constituted of non-biodegradable compounds and the process thus reduces the amount of garbage that must be stored in dumps or disposed of in incinerators.

11. The thermal process according to claim 10, wherein the added solids comprise a non PVC plastic material, optionally non PVC plastic bags, tar, shingle, coal, spent clays and/or shredded and demetalized tires and/or PVC plastic materials, optionally PCV plastic bags or plastic containers.

12. The thermal process according to claim 2, wherein when no water is present in the waste oil, water is added in the waste oil and/or in the flash drum in an amount that represents 3 to 7% weight of the waste oil.

13. The thermal process according to claim 1, wherein the waste oil is:
a feed oil, said feed oil being chosen from contaminated oils and/or uncontaminated oils, wherein said feed oil comprises synthetic oil, natural oil, vegetable oil, animal fat oil, marpol, heavy oil, oily tank bottoms, used lubricating oil, oily water, emulsions, greases, tires, oily emulsion and/or mixtures thereof;
and/or a liquid oil feed mainly containing a limited amount of solid material, optionally chosen from oil sands, shale oil, tires, plastics, contaminated soils, oily beaches, solids containing oil, asphalts and tars, and mixtures thereof.

14. The thermal process according to claim 1, wherein the recovered first heavy oil liquid fraction is treated in a rotating kiln.

15. The thermal process according to claim 1, wherein when no water is present in the waste oil, water is added in the waste oil and/or in the flash drum in an amount that represents 3 to 7% weight of the waste oil.

16. The process according to claim 1, wherein when no water is present in the waste oil to be thermally processed, water or at least one inert gas or at least one component that may become an inert gas by heating is added in the waste oil and/or in the flash drum in an amount that represents 1 to 15% weight of the waste oil.

17. The process according to claim 1, wherein water is naturally present in the waste oil at a range between 1 and 10% weight of the waste oil.

* * * * *